United States Patent [19]
Fisher et al.

[11] Patent Number: 4,833,625
[45] Date of Patent: May 23, 1989

[54] IMAGE VIEWING STATION FOR PICTURE ARCHIVING AND COMMUNICATIONS SYSTEMS (PACS)

[75] Inventors: Henry D. Fisher; Kevin M. McNeil; Richard Vercillo; Richard D. Lamoreaux, all of Tucson, Ariz.

[73] Assignee: University of Arizona, Tucson, Ariz.

[21] Appl. No.: 883,731

[22] Filed: Jul. 9, 1986

[51] Int. Cl.$^4$ ............................................. G06F 15/68
[52] U.S. Cl. .................................... 364/518; 358/111; 340/728; 340/731
[58] Field of Search ............... 364/518, 523; 358/111; 340/728, 731

[56] References Cited

U.S. PATENT DOCUMENTS

| | | | |
|---|---|---|---|
| 4,598,368 | 7/1986 | Umemura | 358/111 |
| 4,616,319 | 10/1986 | Peters et al. | 358/111 |
| 4,624,989 | 12/1986 | Riehl et al. | 324/300 |
| 4,628,355 | 12/1986 | Dgura et al. | 358/111 |
| 4,636,850 | 1/1987 | Stewart | 358/111 |
| 4,653,112 | 3/1987 | Duimette | 382/69 |
| 4,674,107 | 6/1987 | Urban et al. | 358/111 |
| 4,680,628 | 7/1987 | Wojcik et al. | 378/99 |
| 4,693,373 | 9/1987 | Lamb et al. | 364/478 |
| 4,709,332 | 11/1987 | Morrison et al. | 358/111 |

Primary Examiner—Gary V. Harkcom
Assistant Examiner—Randy W. Lacasse
Attorney, Agent, or Firm—Oblon, Fisher, Spivak, McClelland & Maier

[57] ABSTRACT

An image reviewing station for a picture archiving and communication system (PACS), having two functions of user interface and display of an image wherein base memory, image processor, and display memory architecture is used. The digitized image data at any size from any different modalities is stored in base memory in an original format, and read-out signals are processed appropriately in the image processor responsive to the command signals input by the user. The processed image data is then stored in a display memory before being supplied to a display via a digital-to-analog converter for the display. It provides the user with extensive, concise and easy interactive image manipulation and processing capabilities.

65 Claims, 42 Drawing Sheets

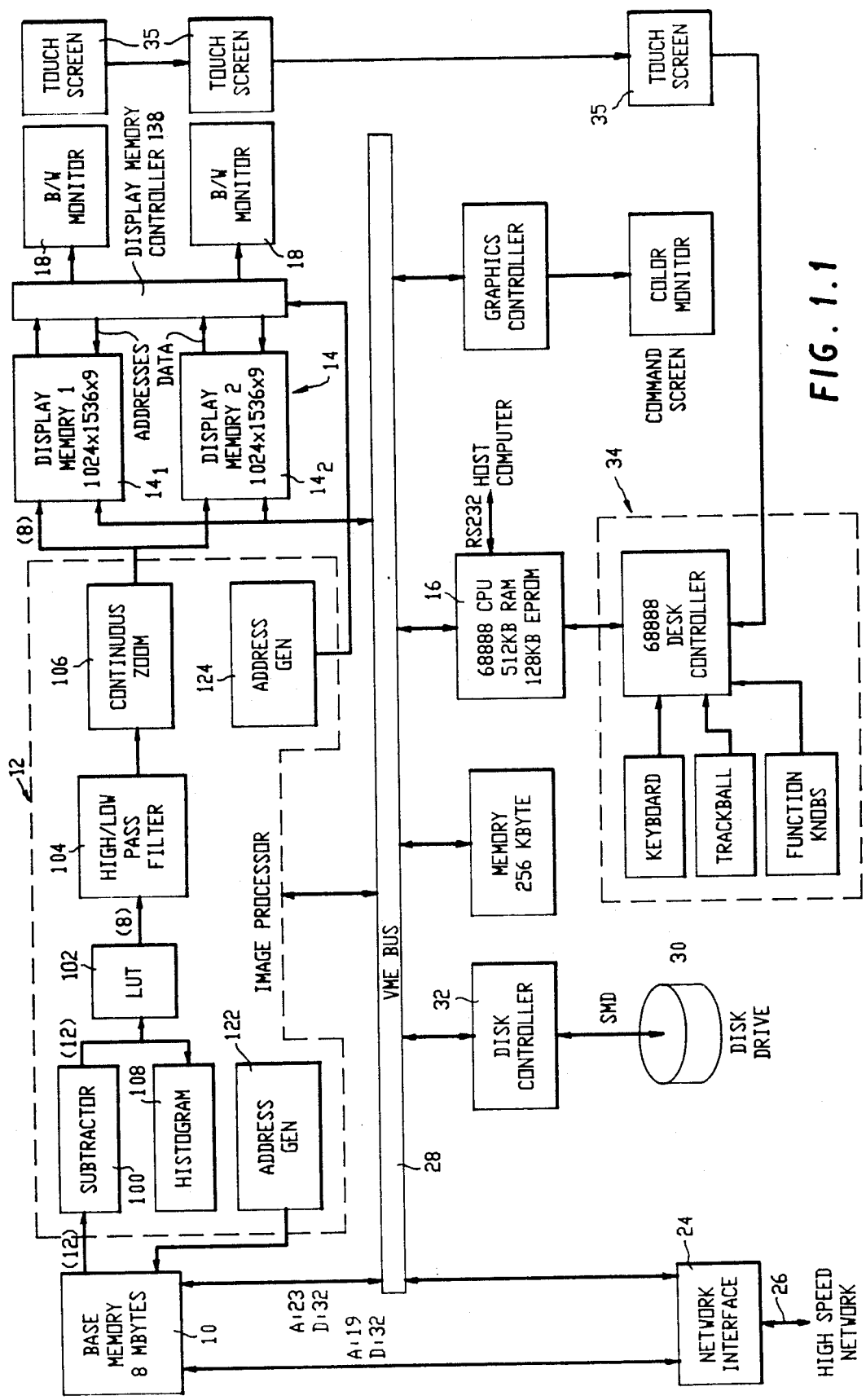
FIG. 1.1

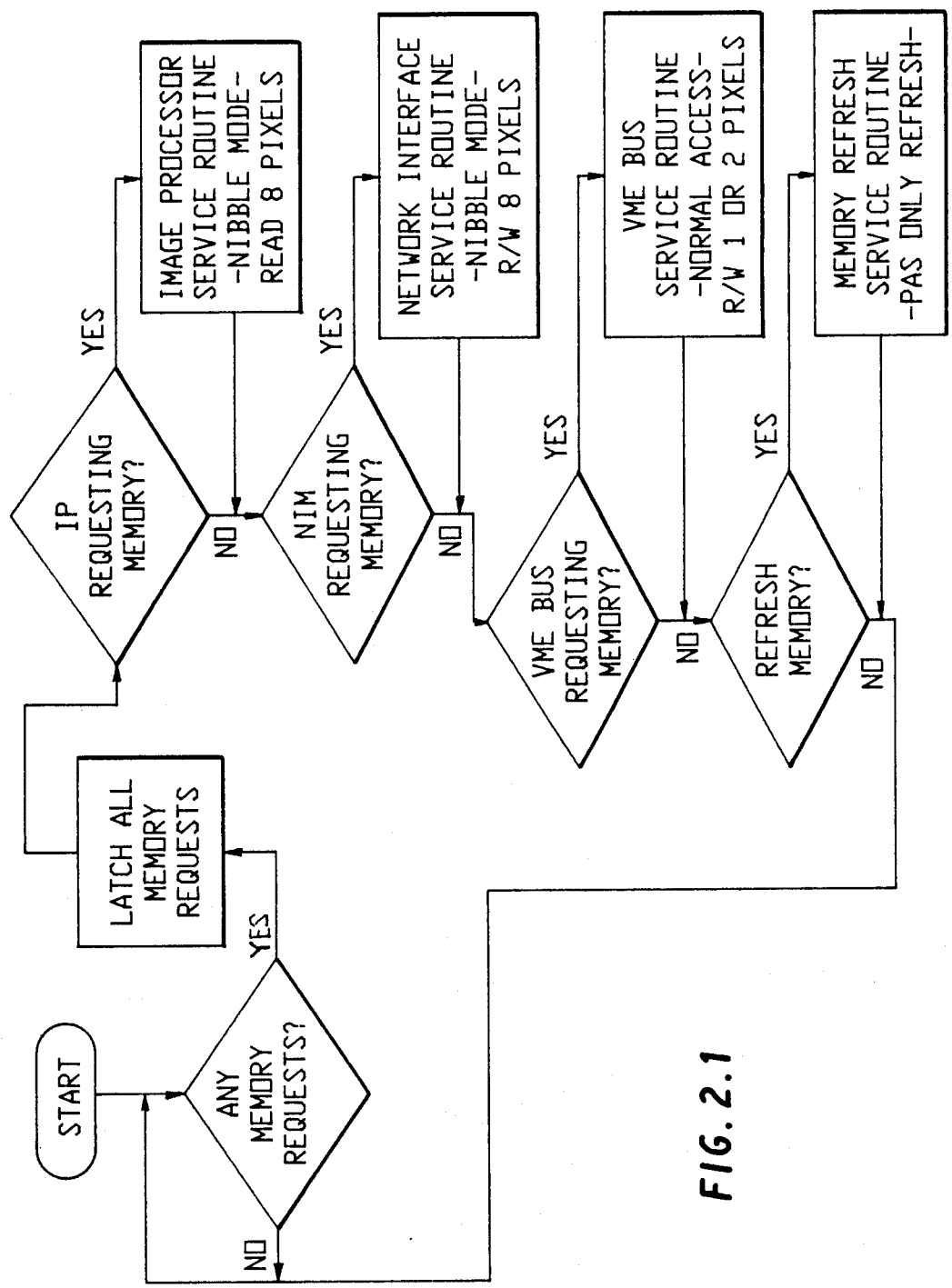
FIG. 2.1

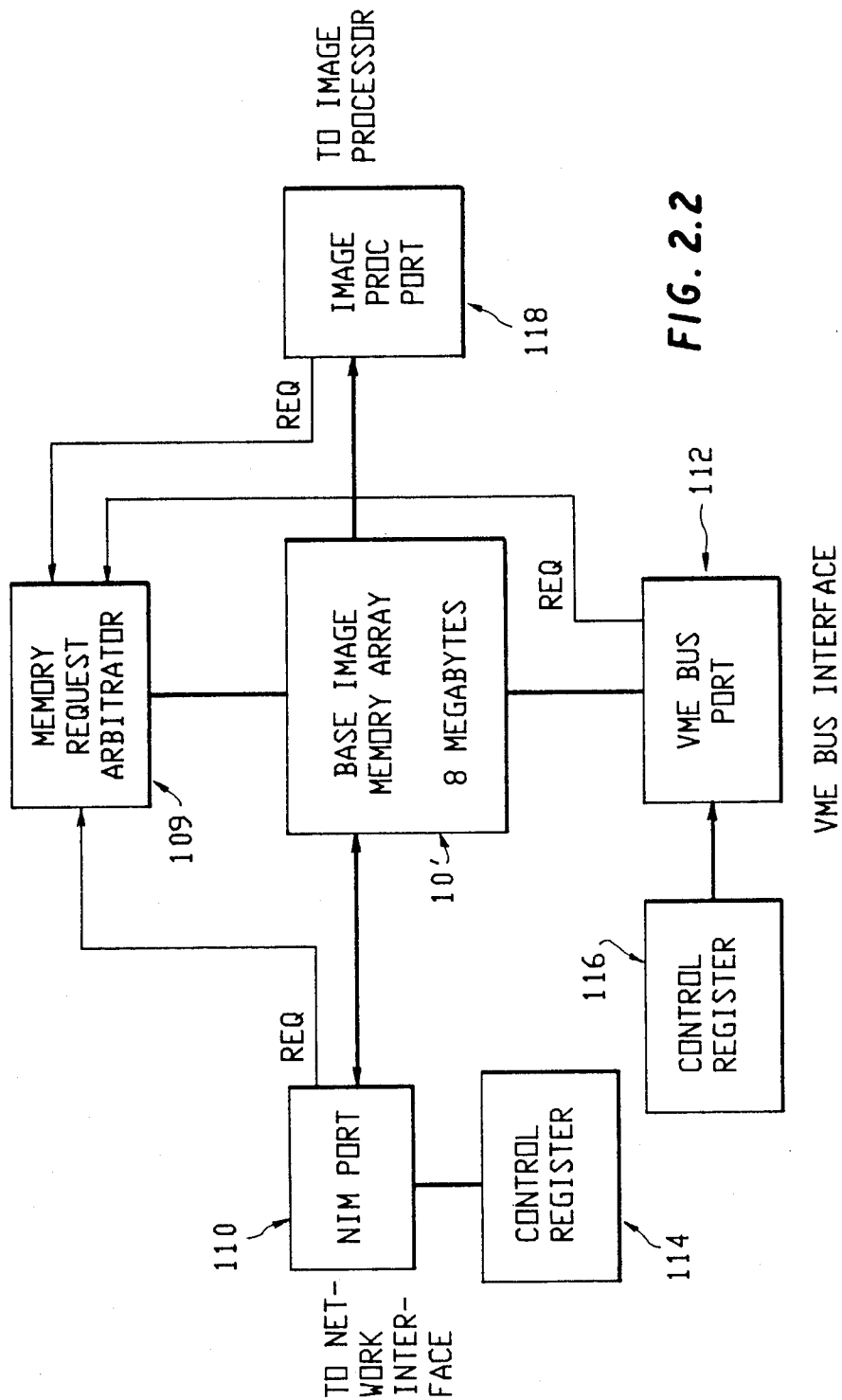
FIG. 2.2

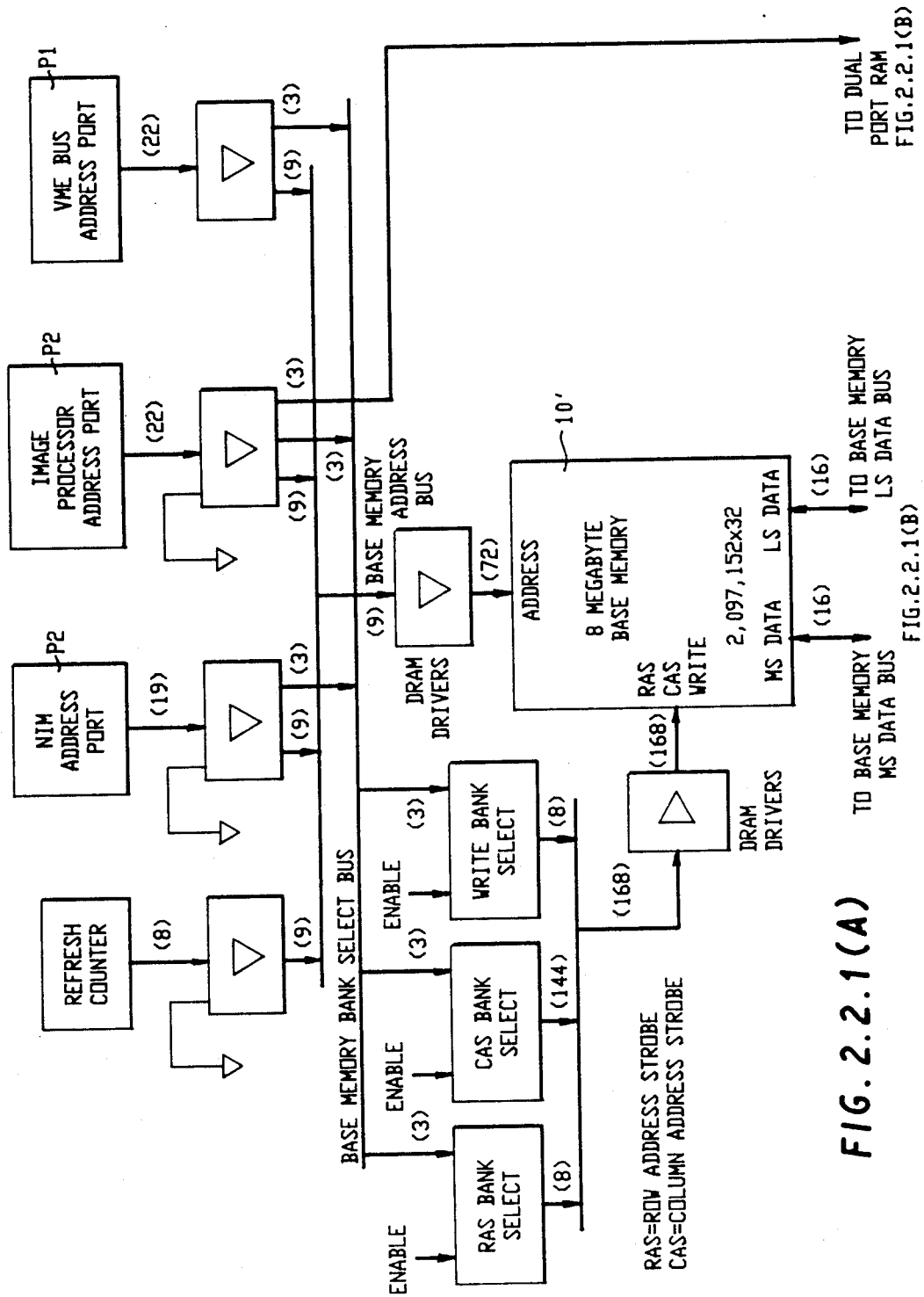
FIG. 2.2.1(A)

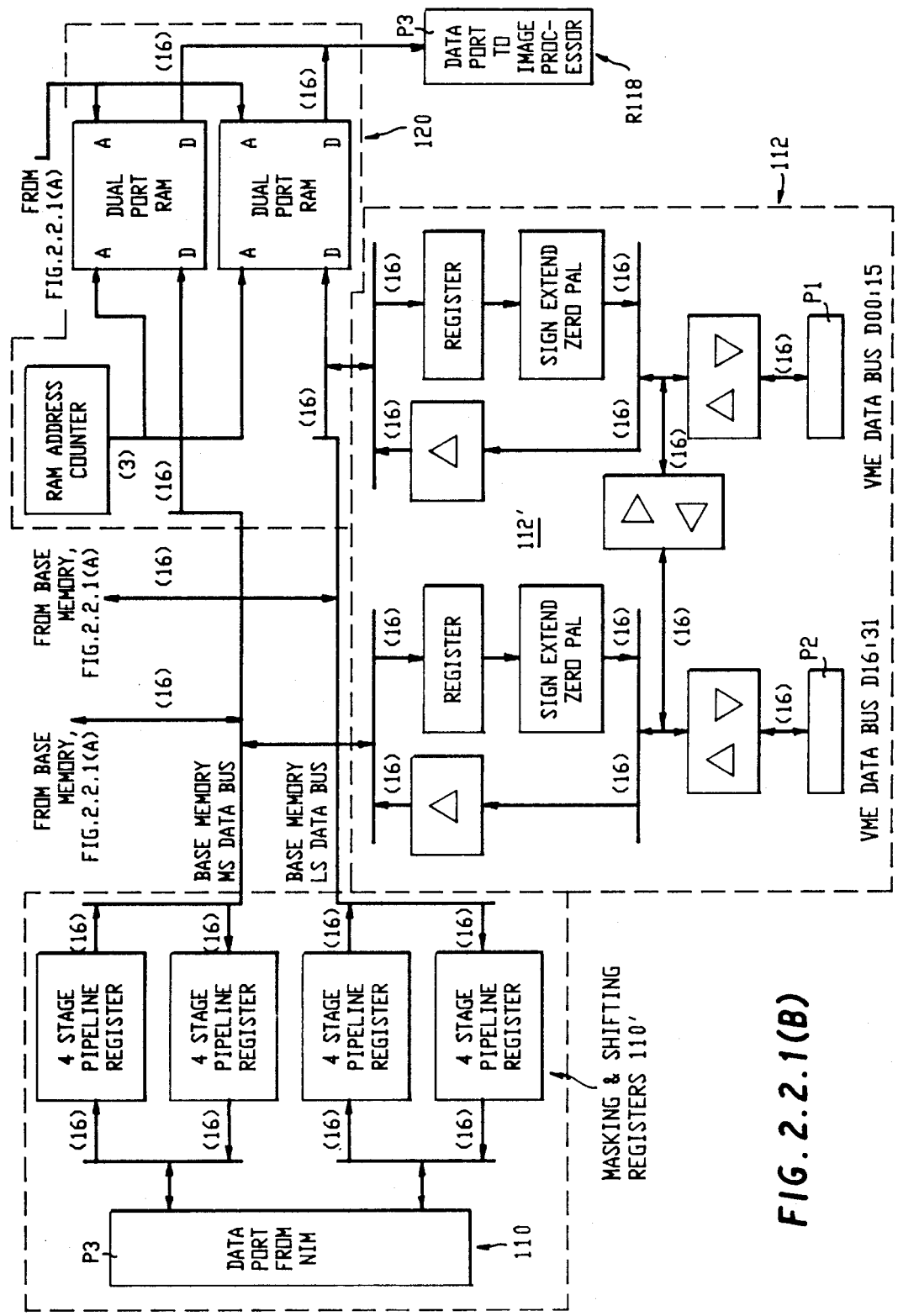
FIG. 2.2.1(B)

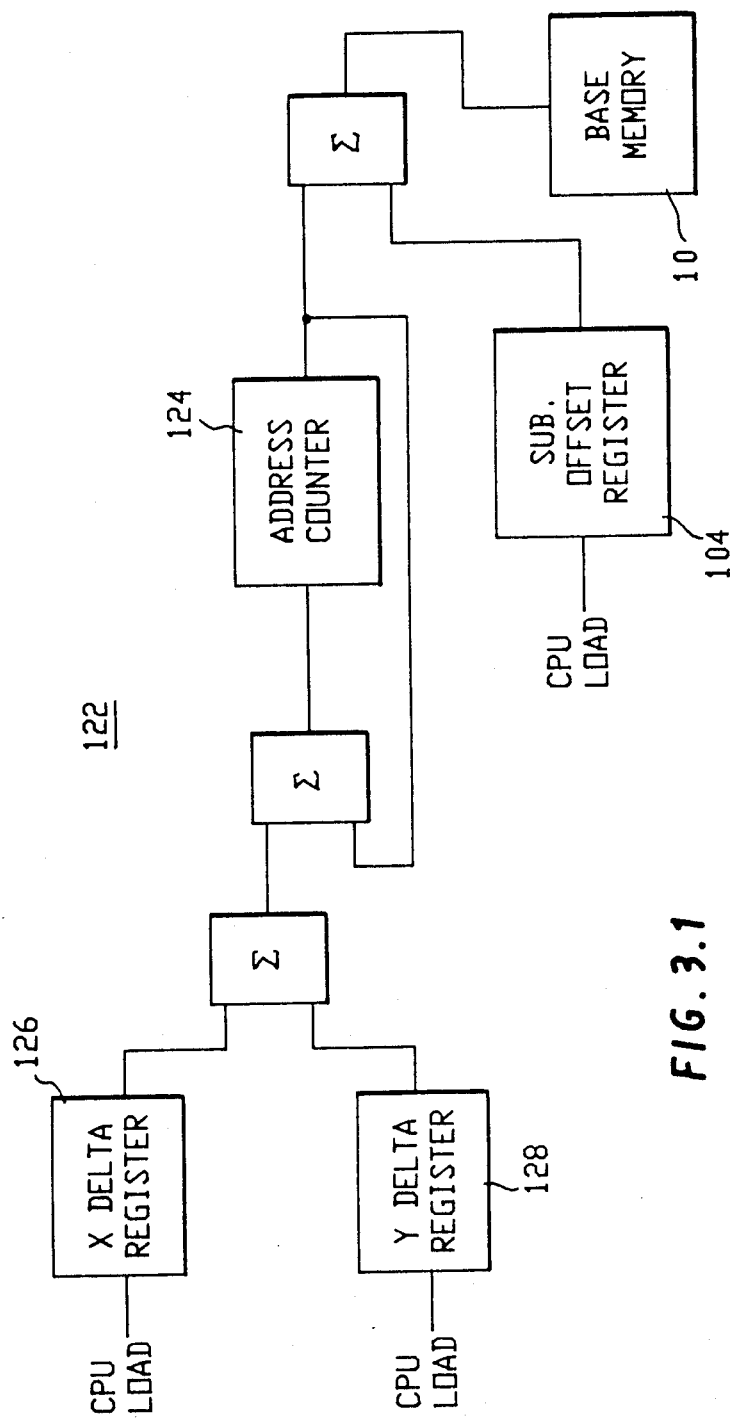
FIG. 3.1

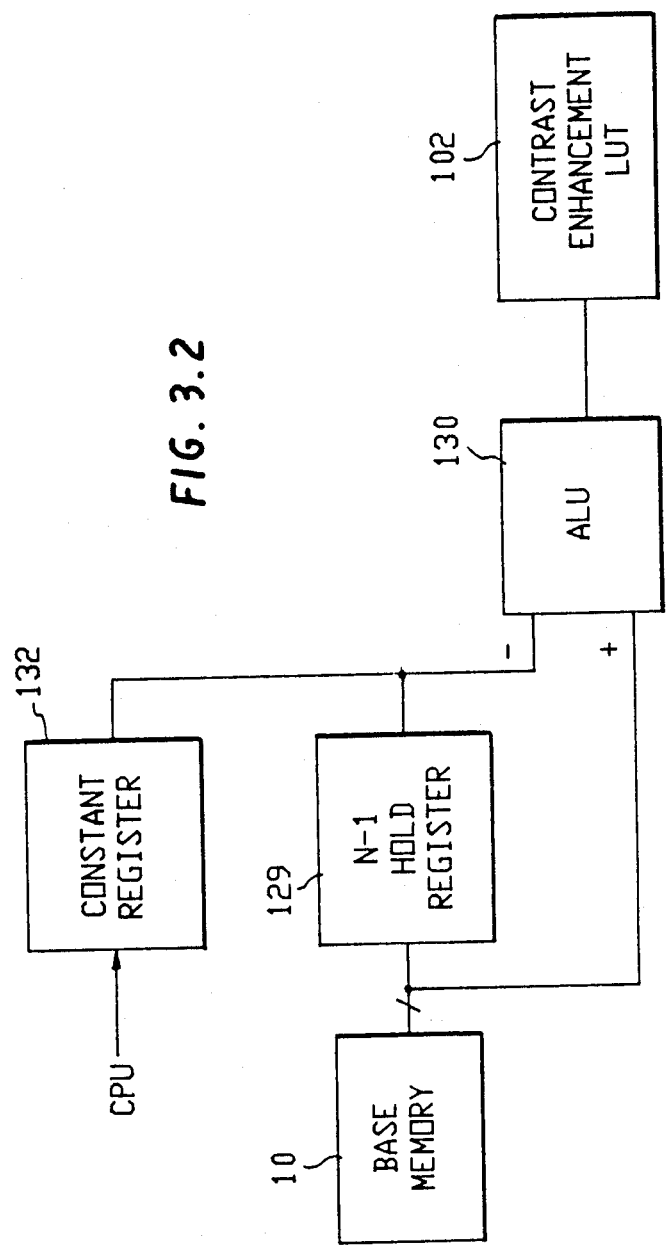
FIG. 3.2

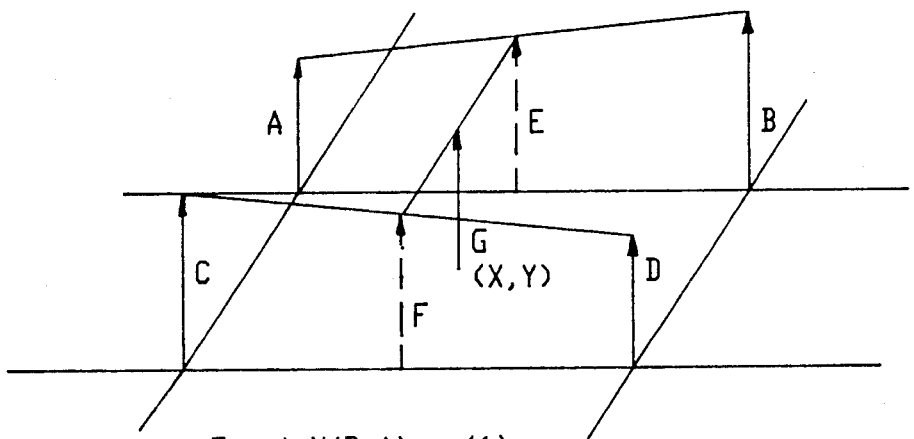
FIG. 3.3

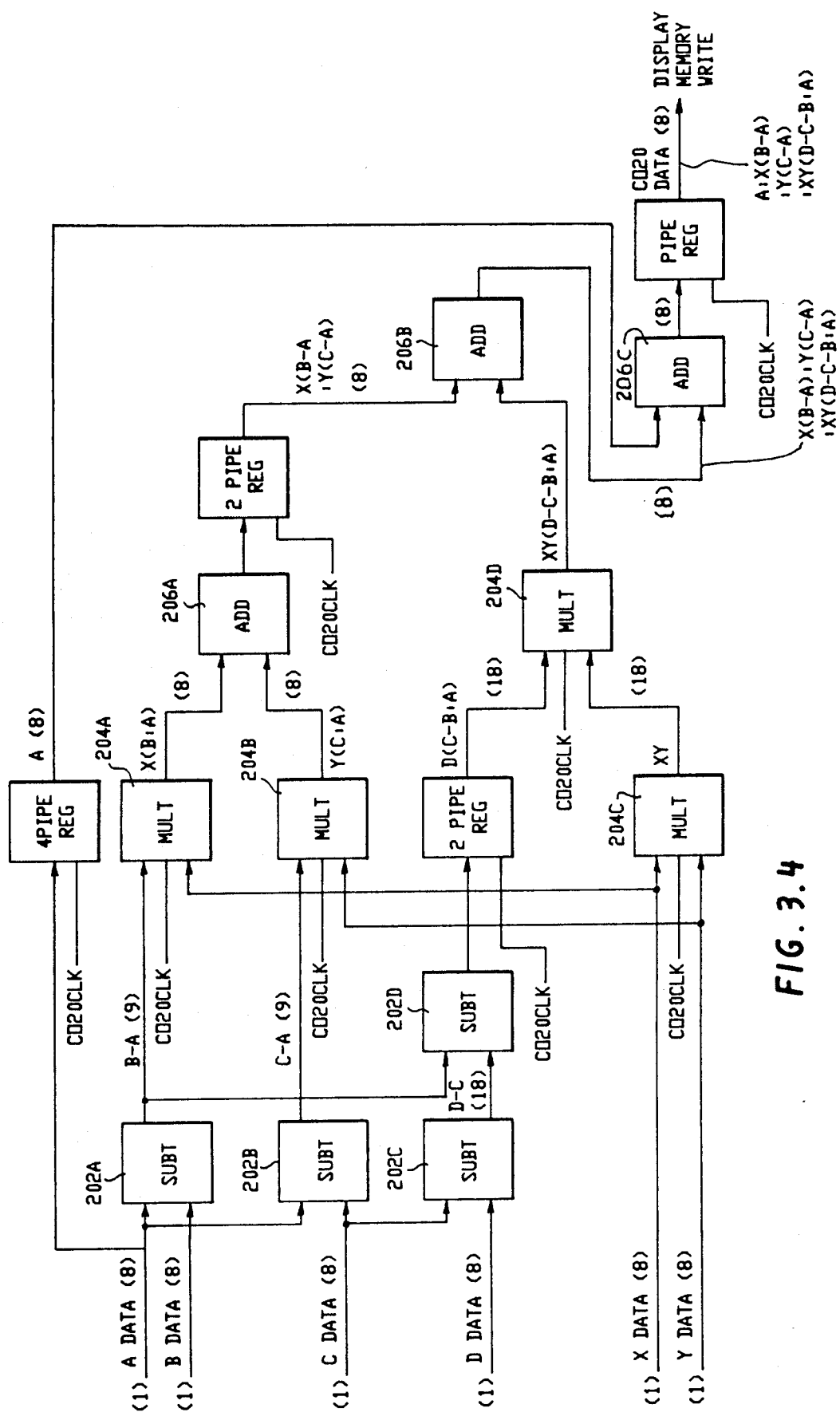
FIG. 3.4

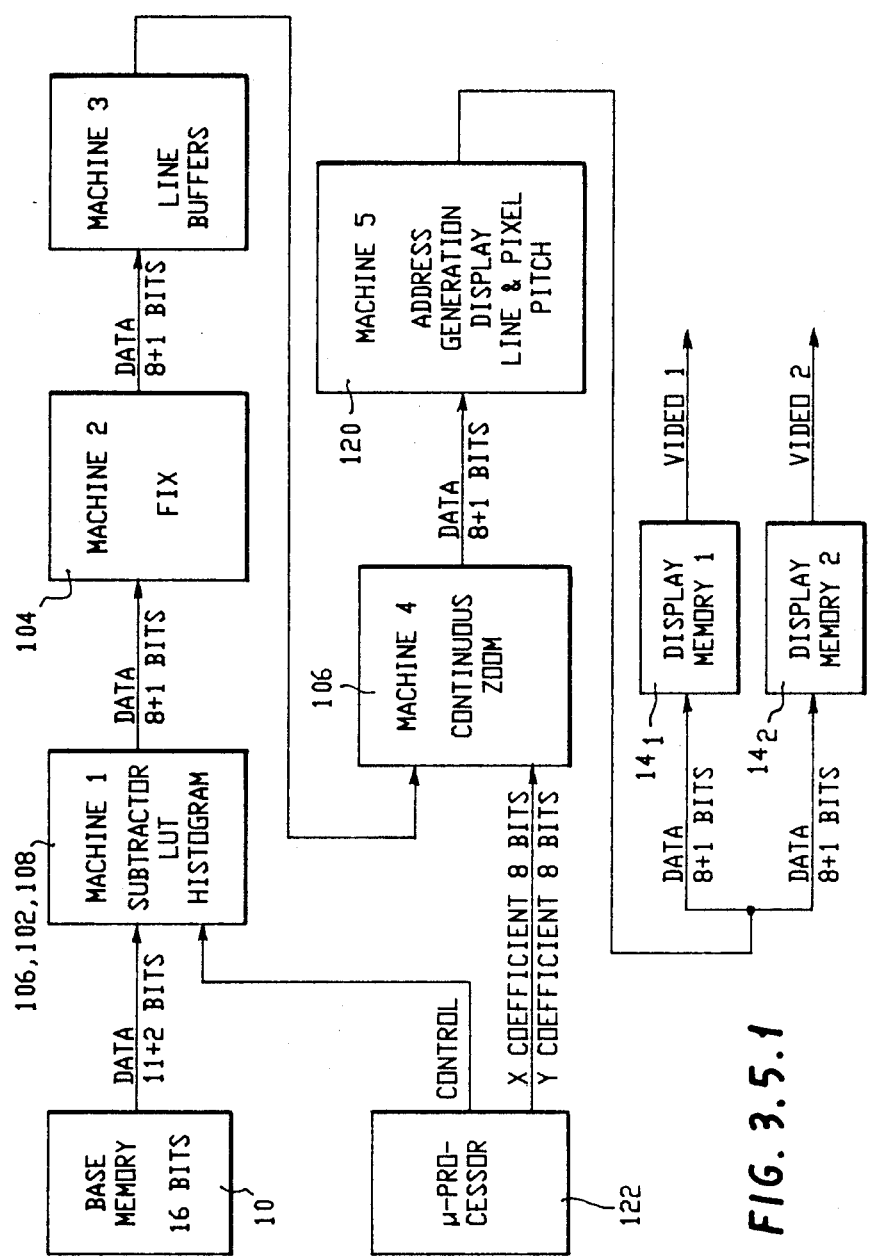
FIG. 3.5.1

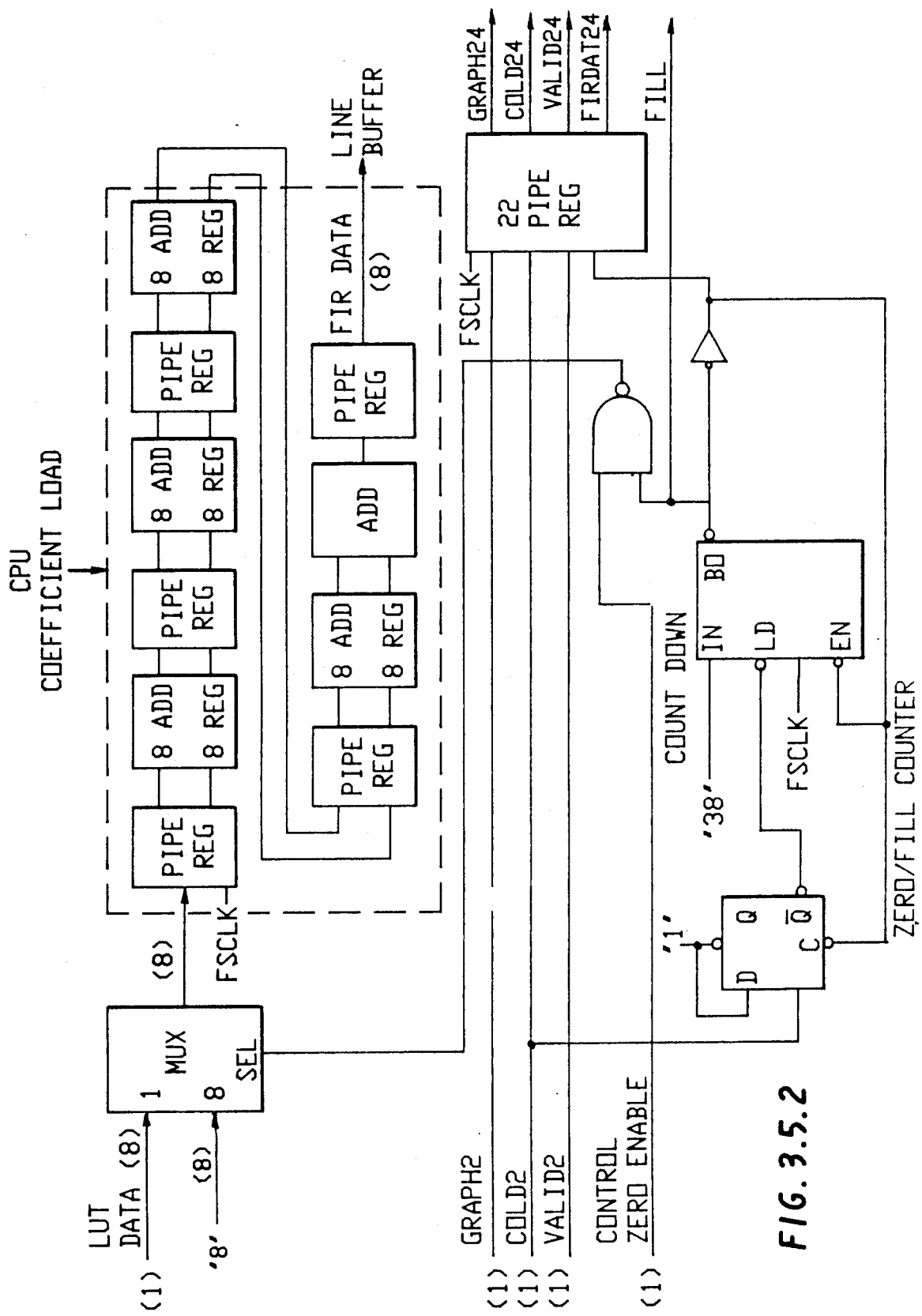
FIG. 3.5.2

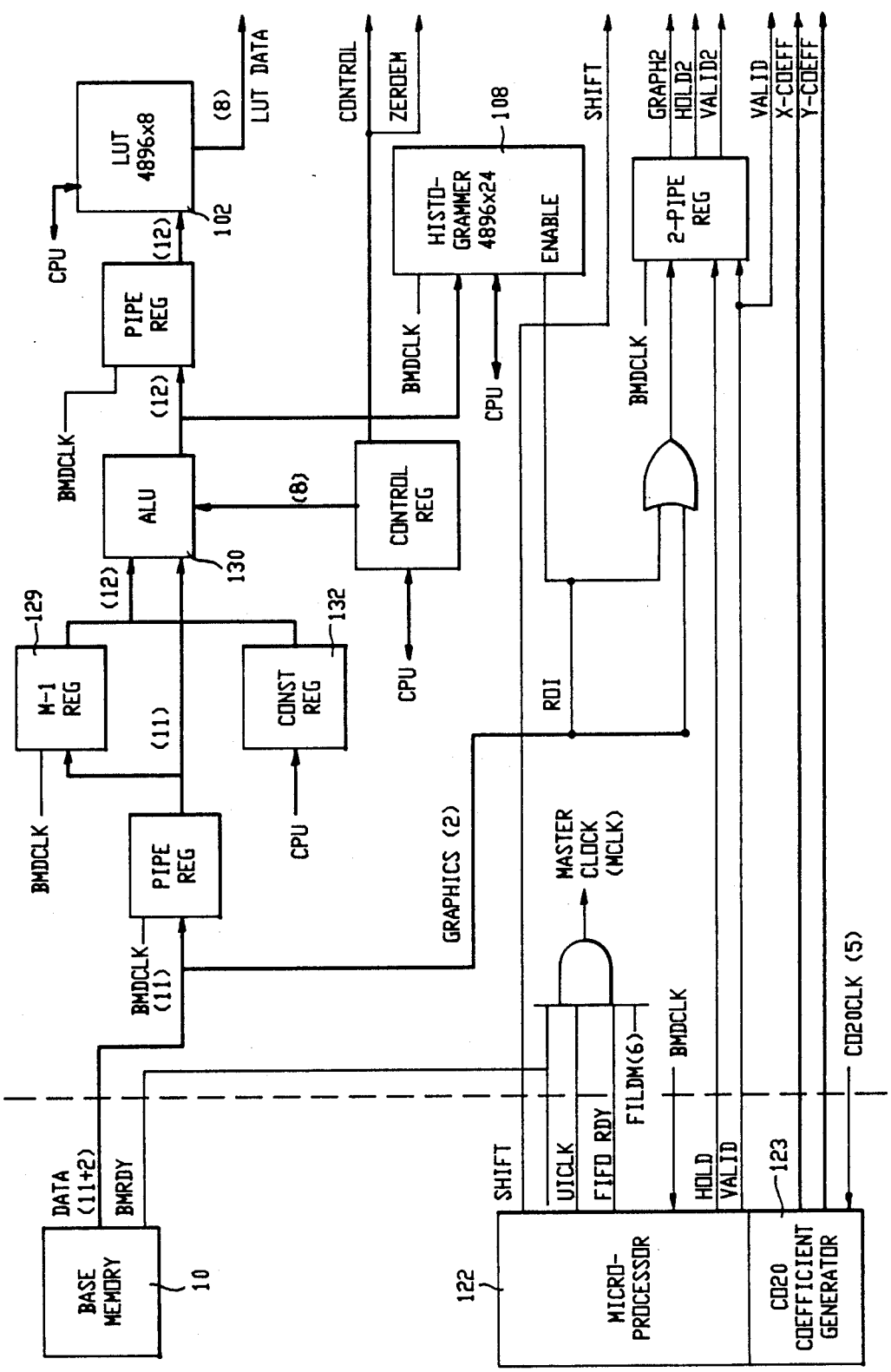
FIG. 3.5.3

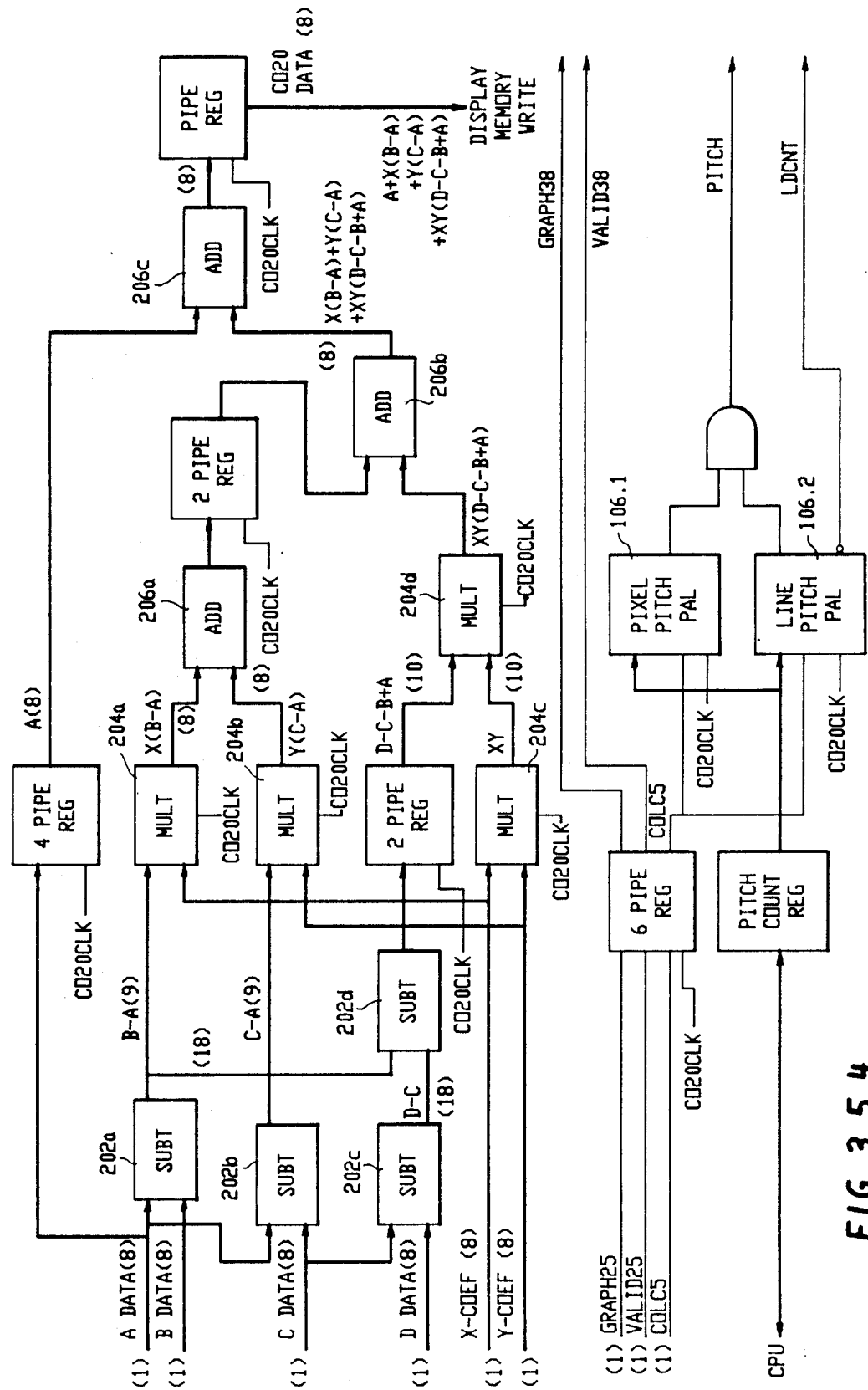
FIG. 3.5.4

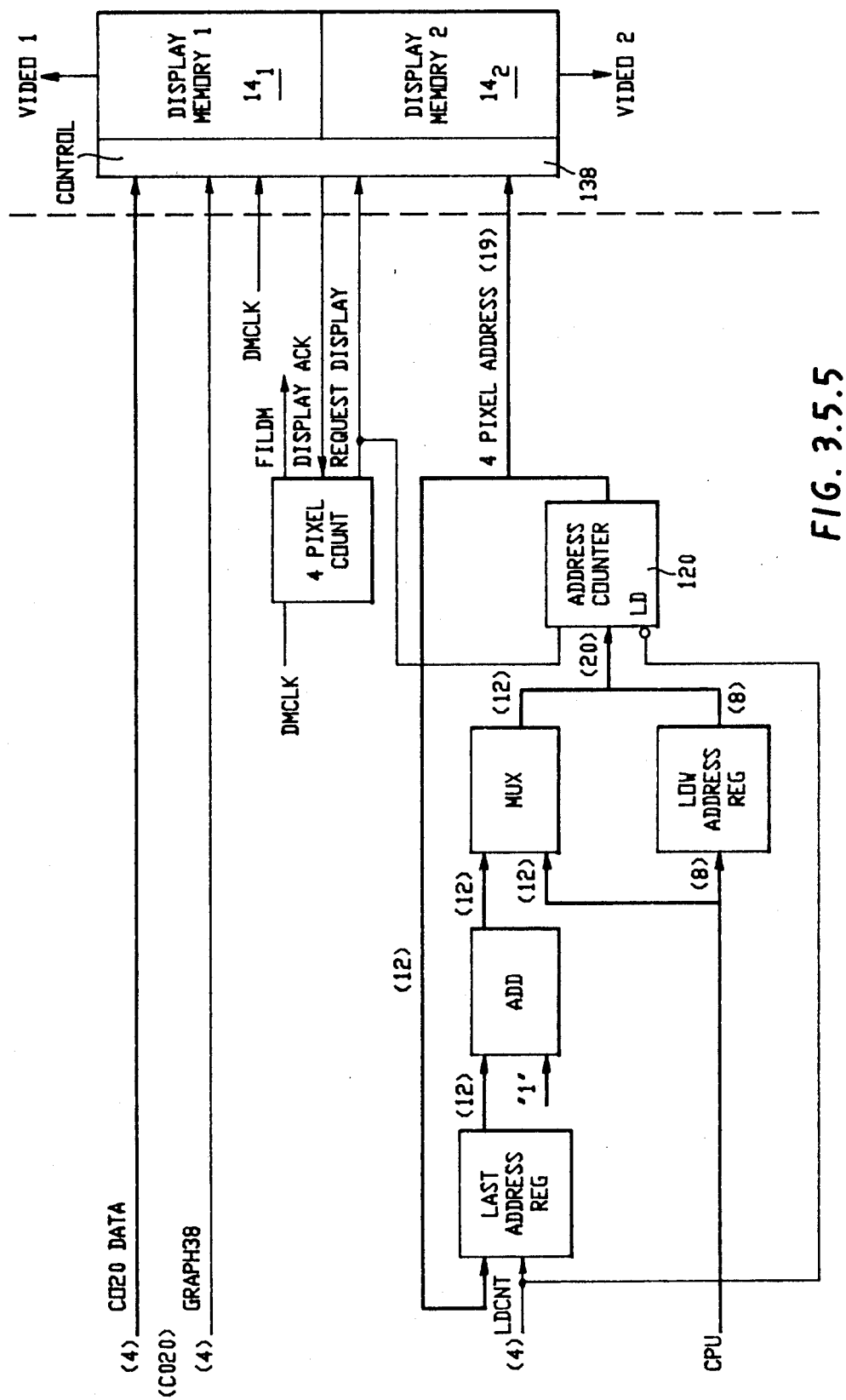
FIG. 3.5.5

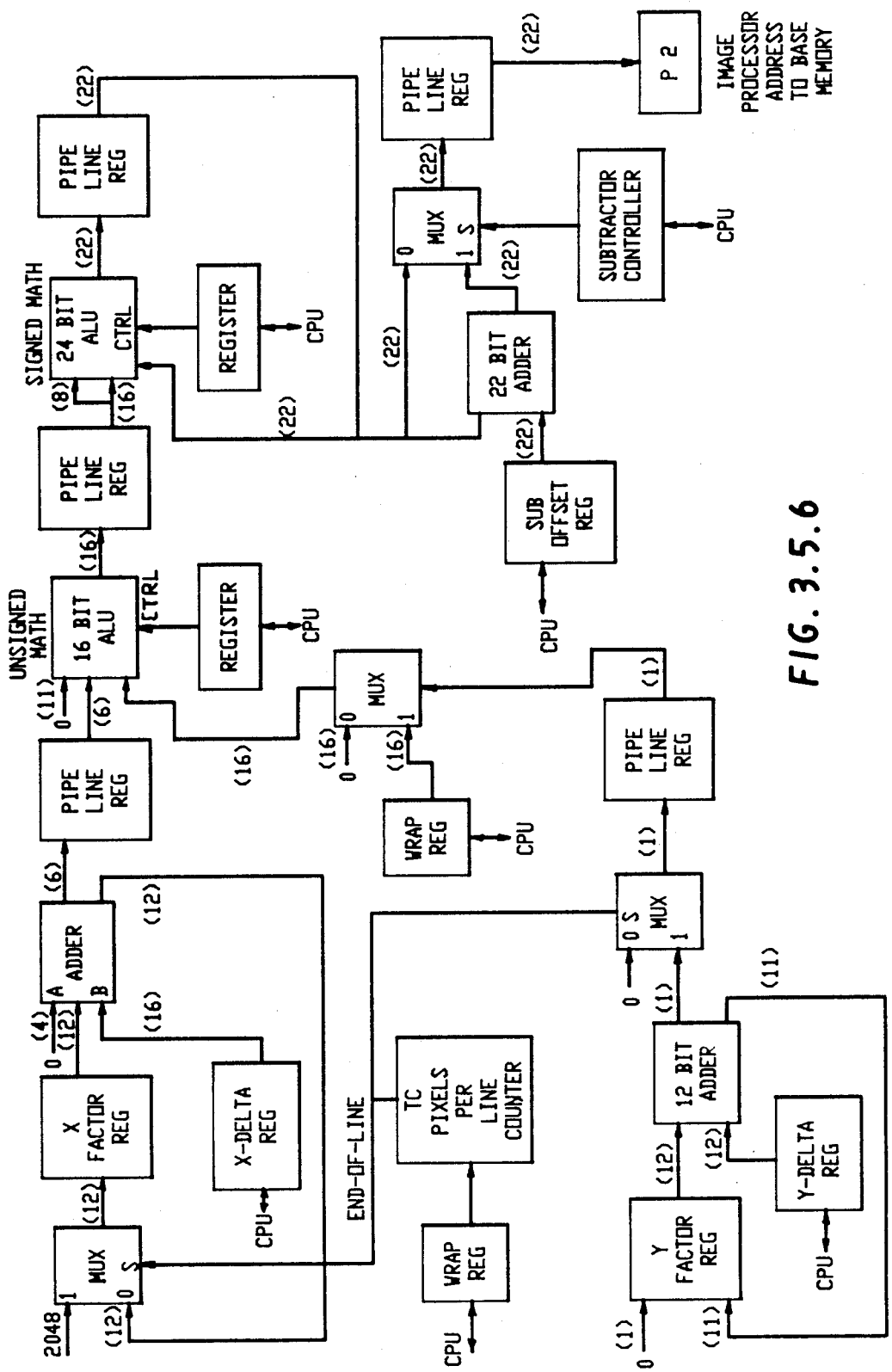
FIG. 3.5.6

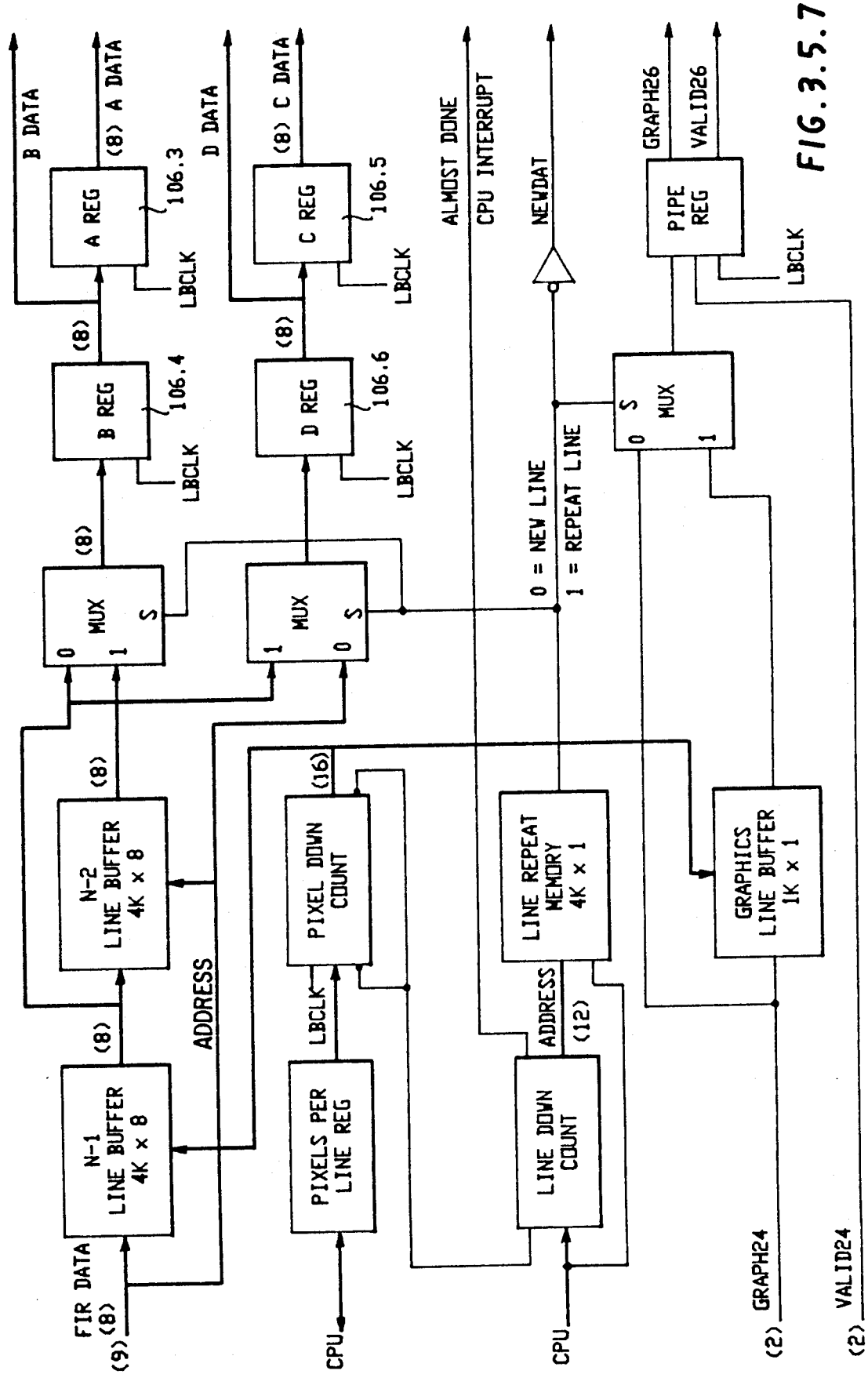
FIG. 3.5.7

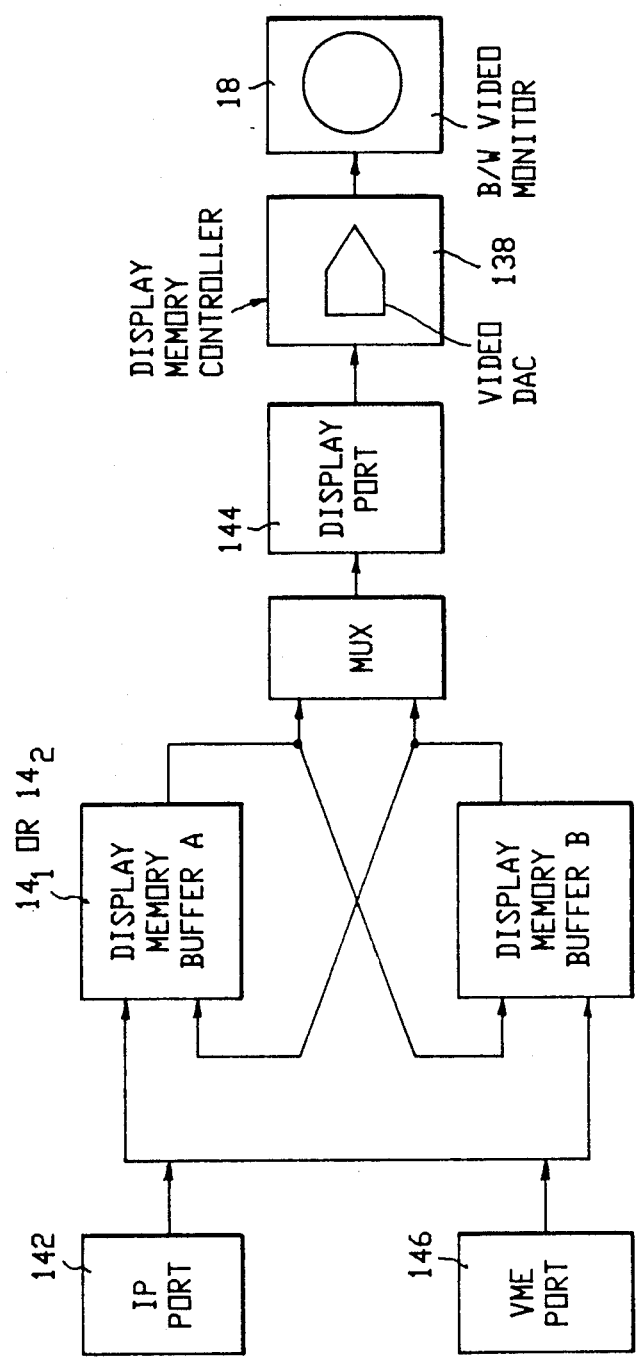
FIG. 4.1

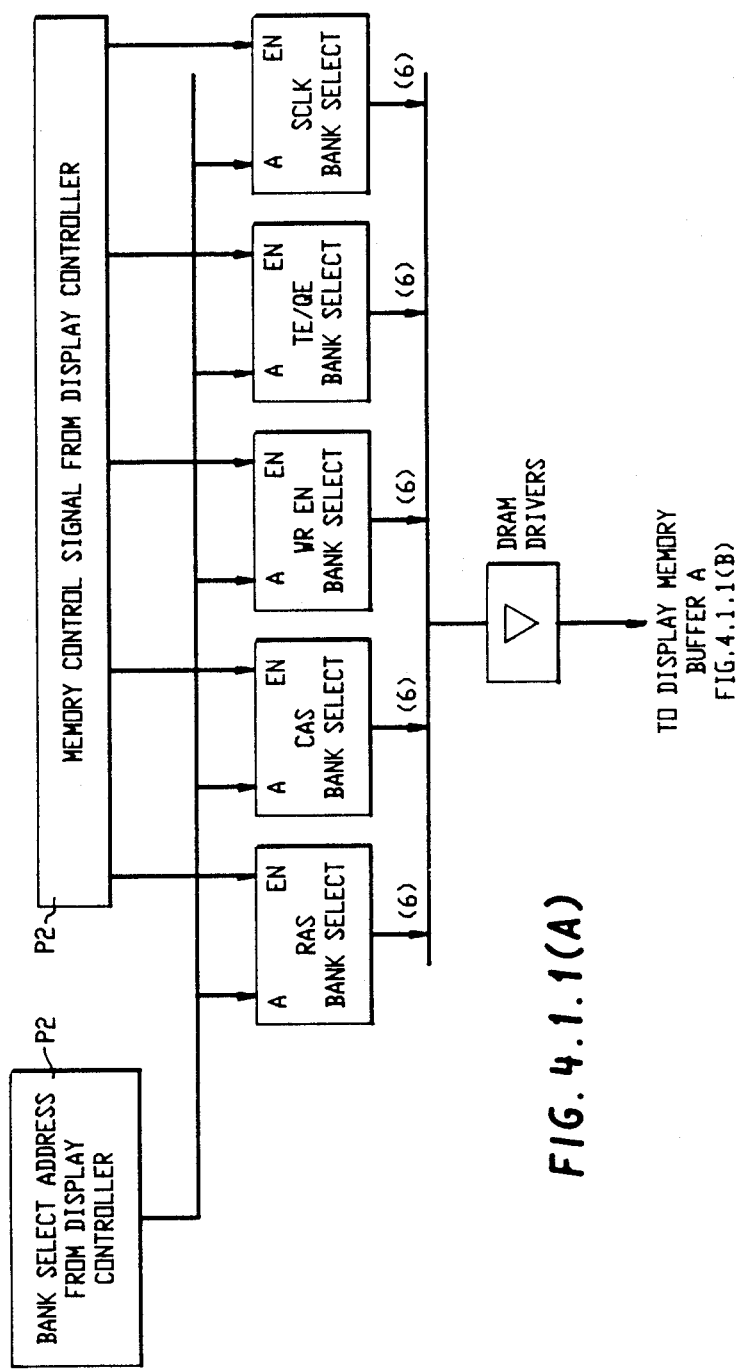
FIG. 4.1.1(A)

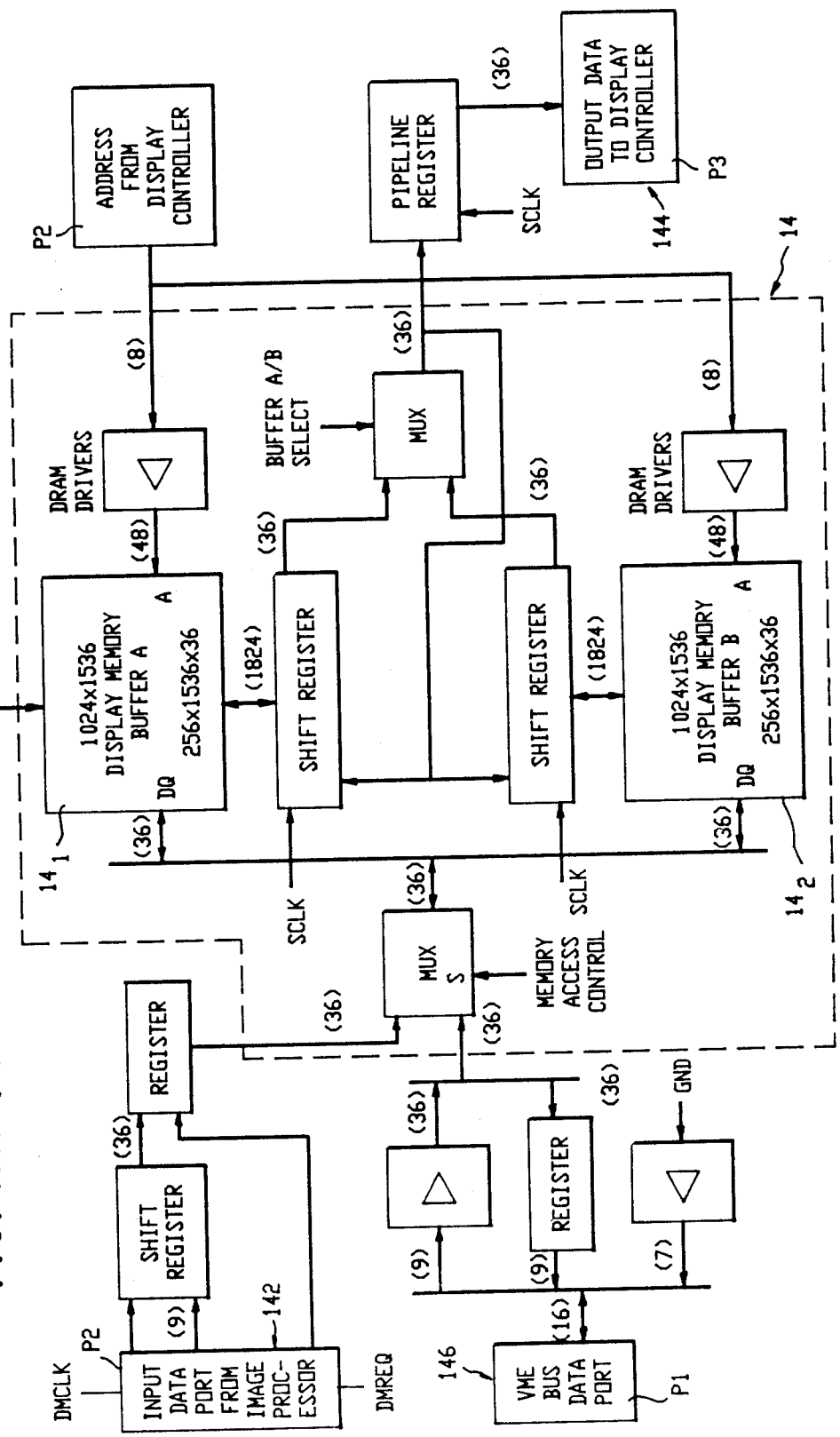
FIG. 4.1.1(B)

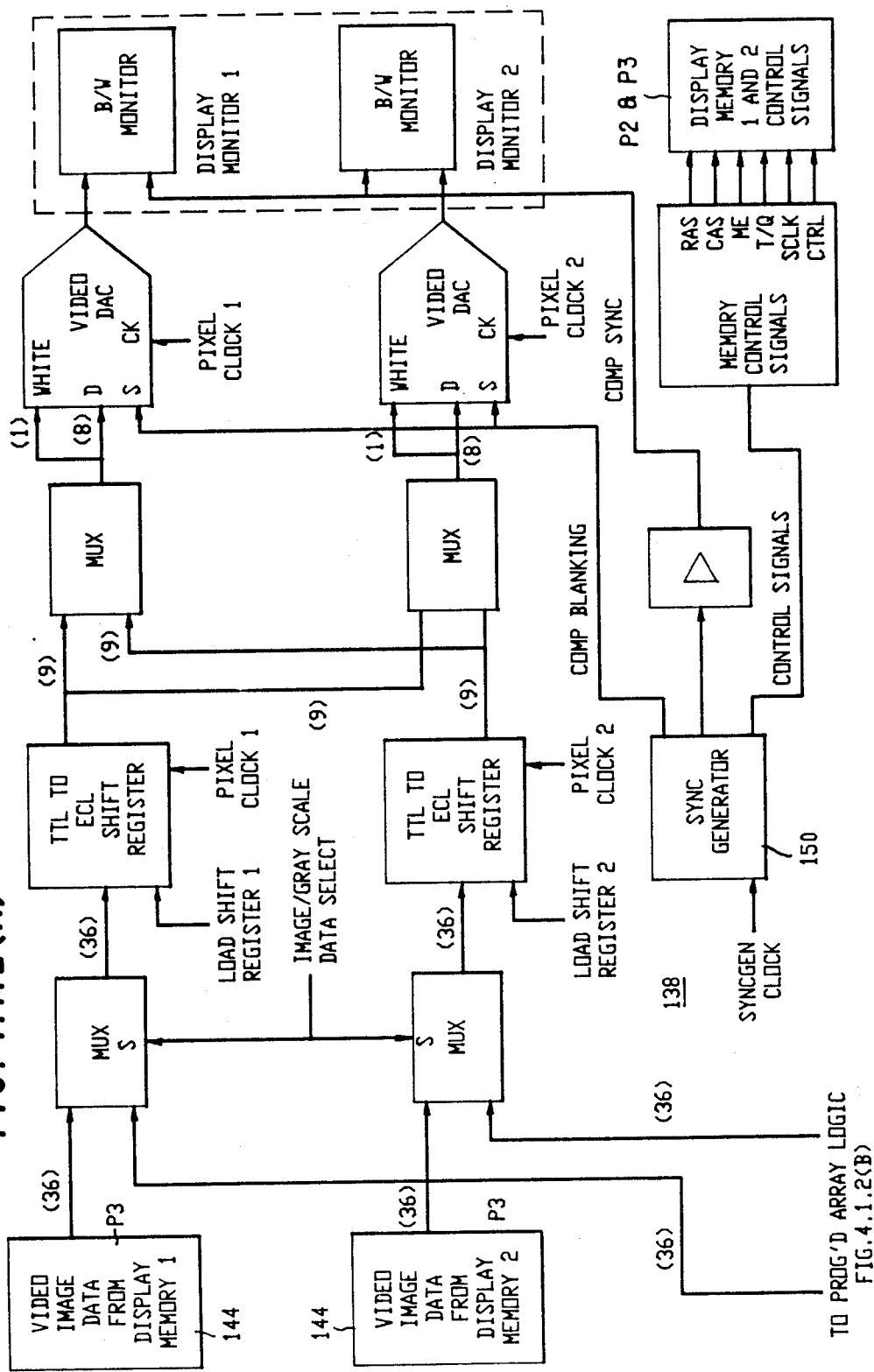
FIG. 4.1.2(A)

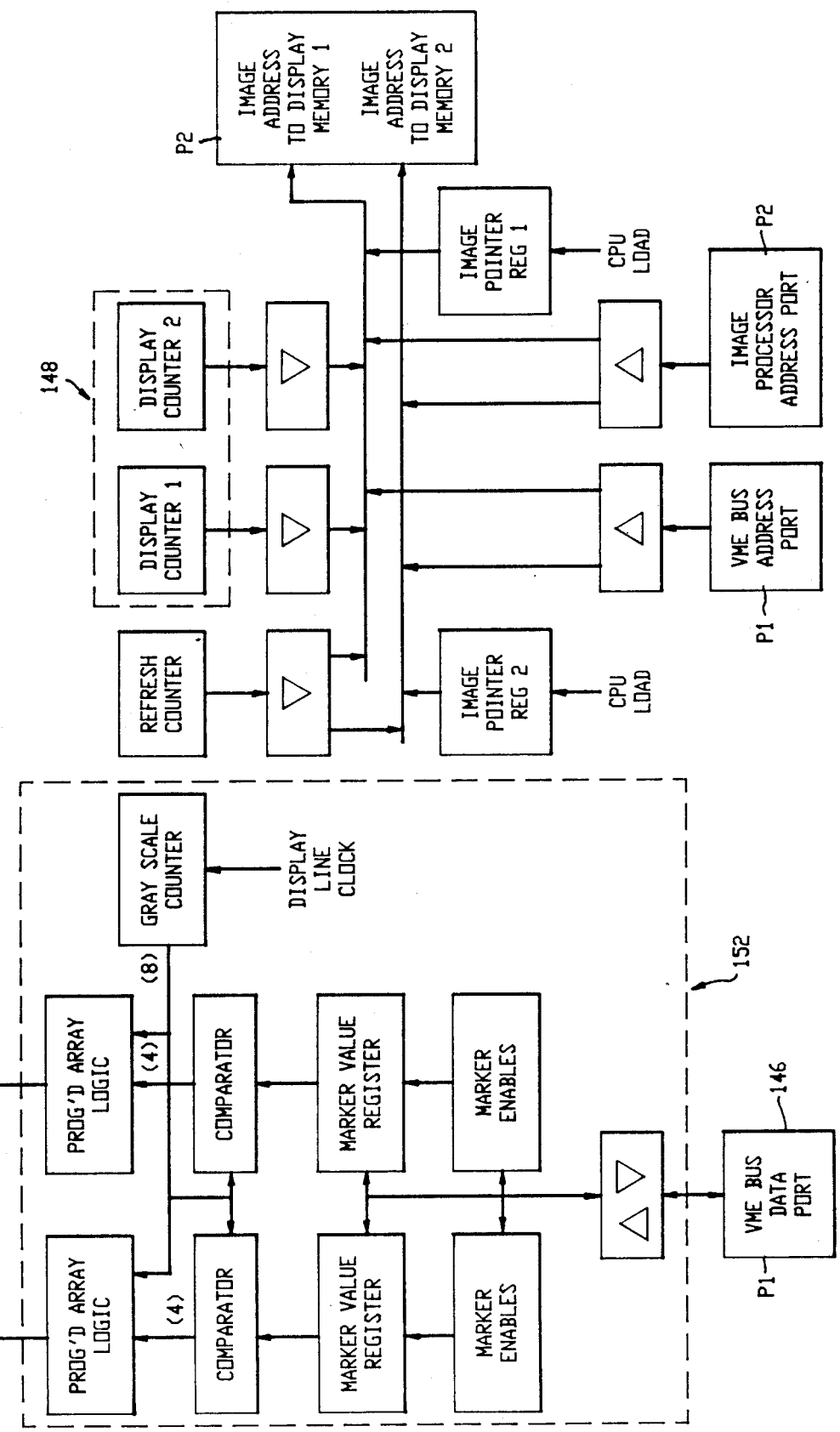
FIG. 4.1.2(B)

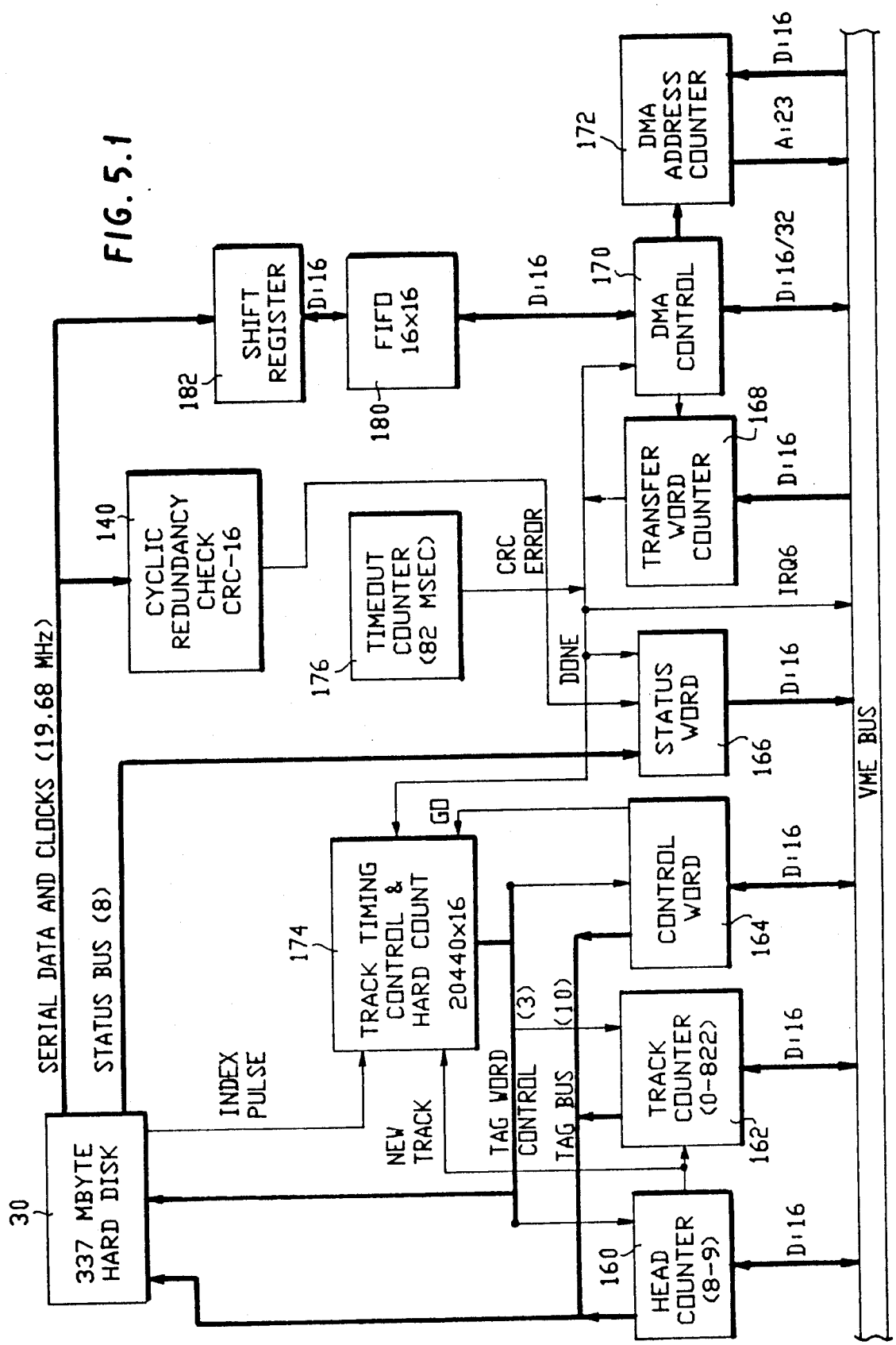
FIG. 5.1

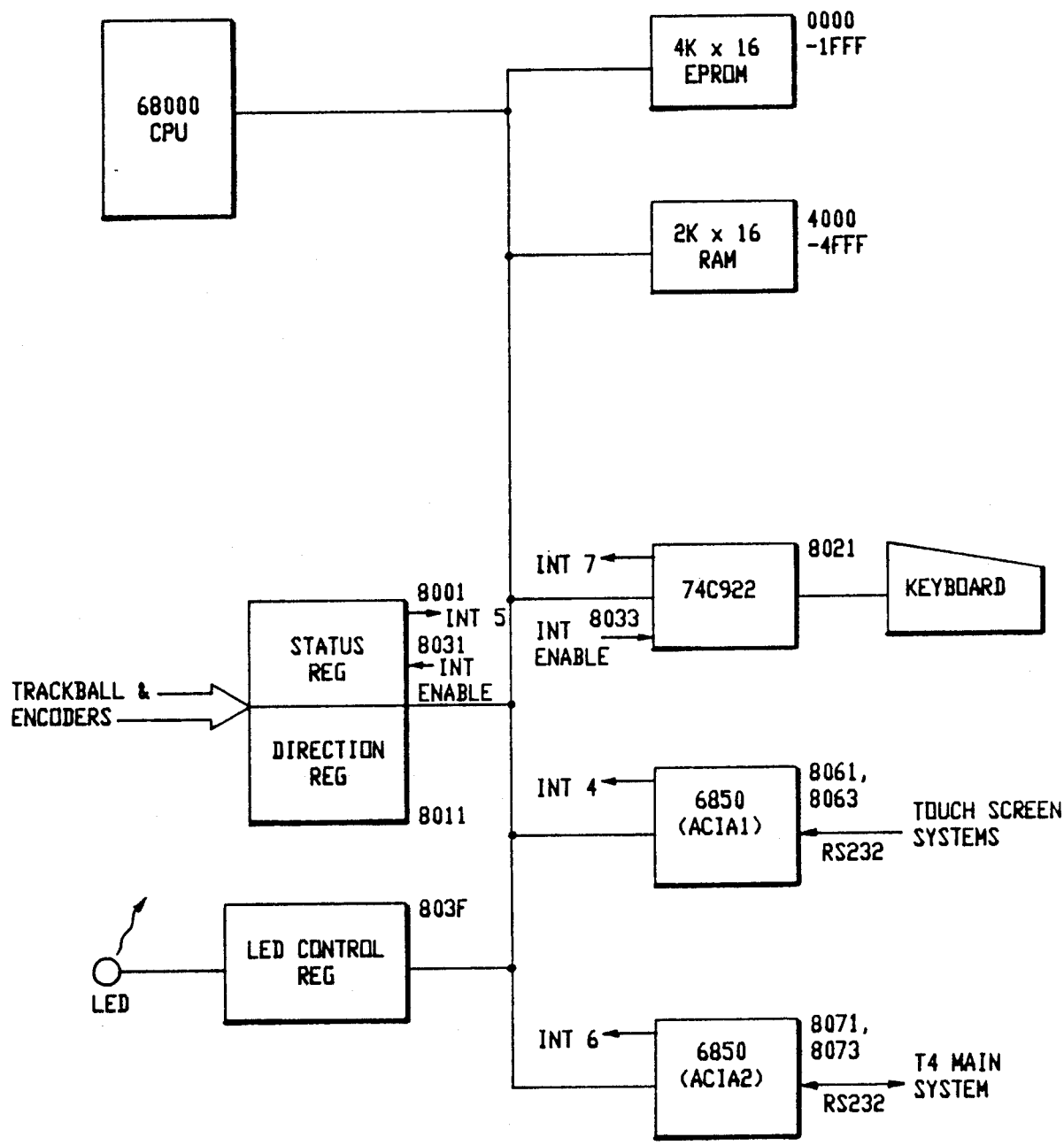
FIG. 6.1

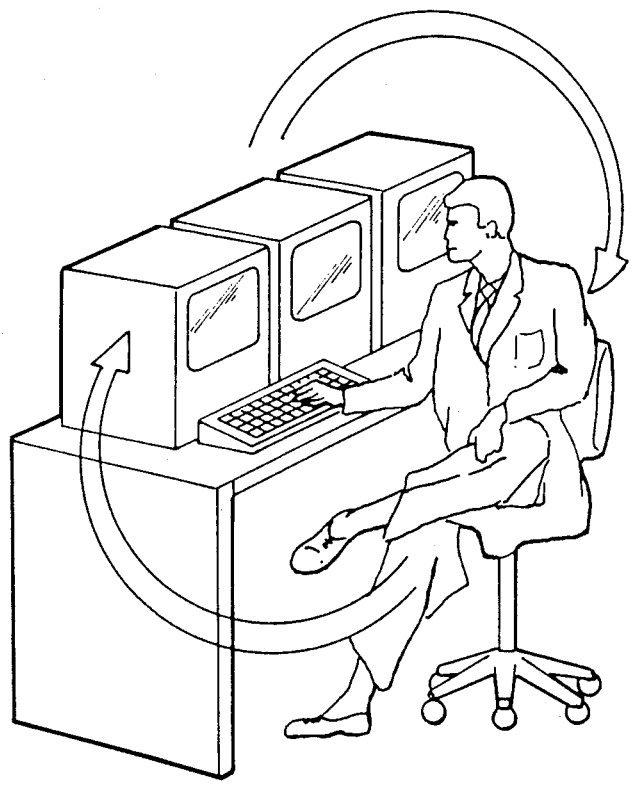
SYSTEM ⟹ USER
- COMMAND MENUS
- TEXT DISPLAY
- IMAGE DISPLAY
USER ⟹ SYSTEM
- COMMAND INPUT
- FUNCTION CONTROL INPUT
- IMAGE TOUCH SCREEN INPUT
*FIG. 7.1*

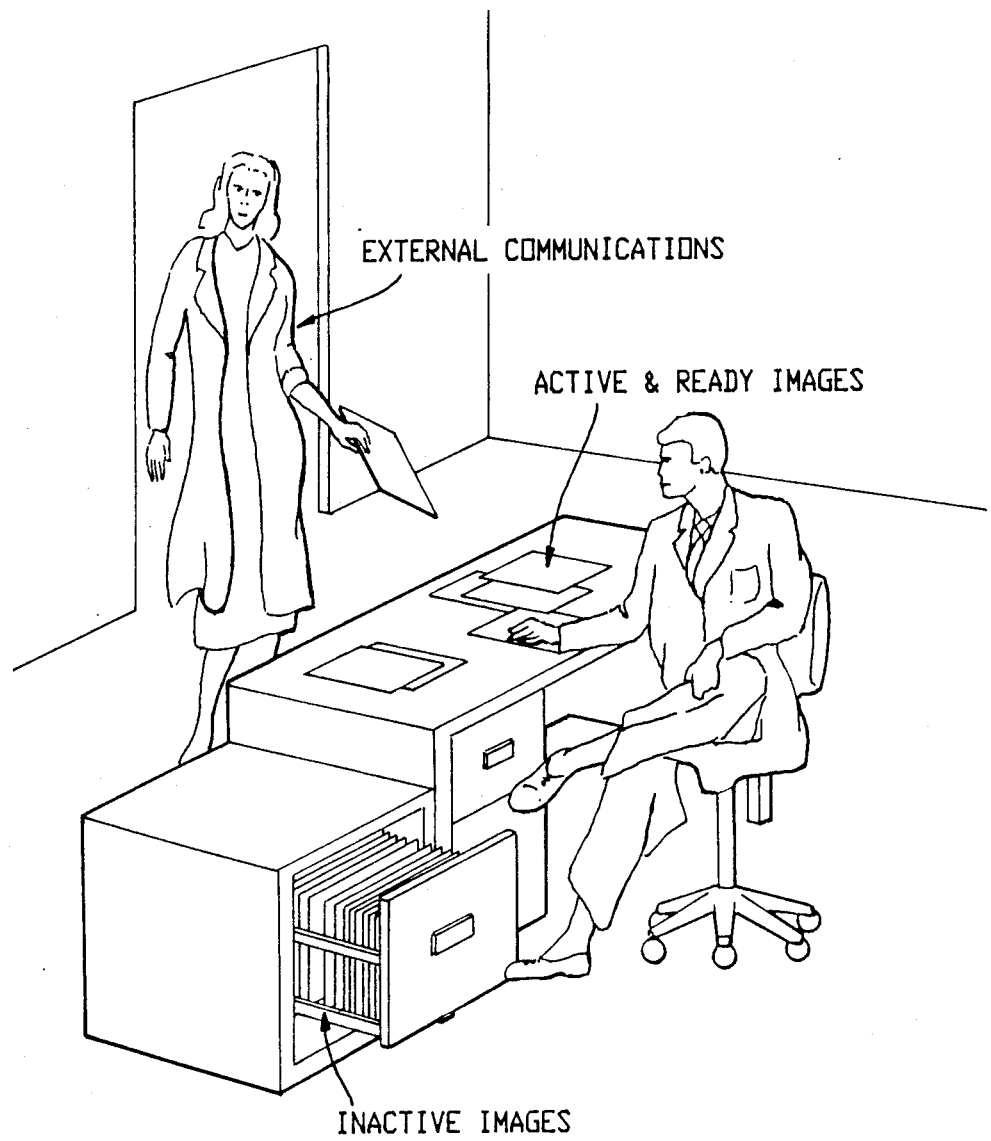
FIG. 7.2

FIG. 7.3
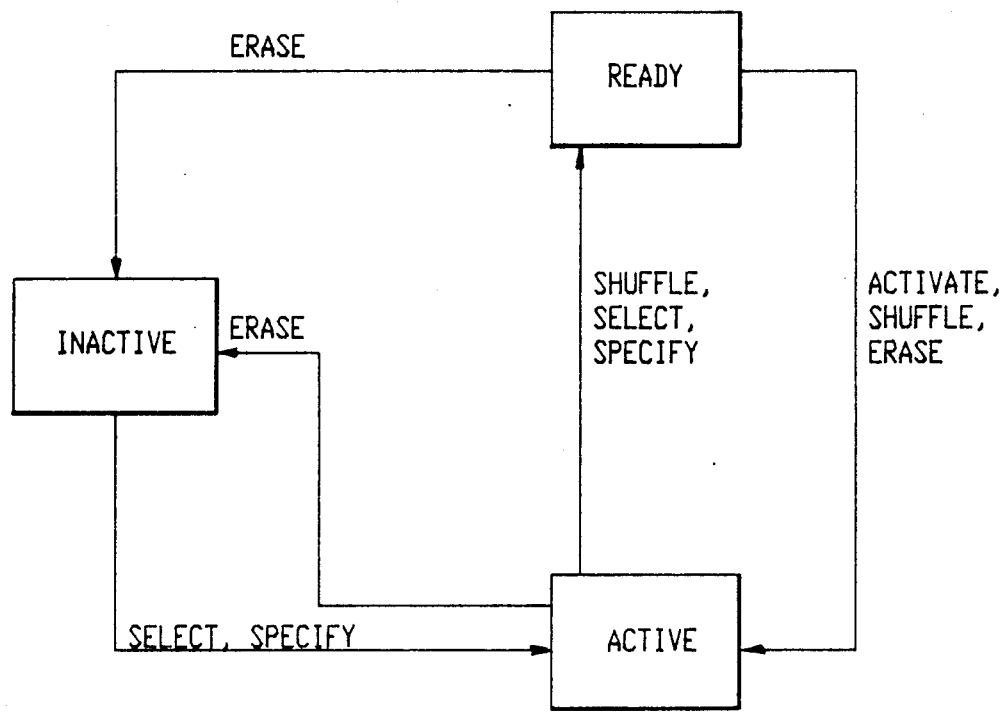

FIG. 7.4
DISK STRUCTURE

| DCT | 206 TRACK SWAP AREA | ICL | PDL | RPL | ICL BACKUP | PDL BACKUP | RPL BACKUP | ADAPTIVE INTERFACE FILES | REPORT TRACKS | PROGRAM STORAGE | IMAGE STORAGE SPACE | DCT BACKUP |
|---|---|---|---|---|---|---|---|---|---|---|---|---|
| 0   1 | 206 | 207 | 208 | 209 | 210 | 211 | 212 | 213   214 | 215   235 | 236   256 | | 8229 |

FIG. 7.5

| WORD | DIRECTORY CONTROL TRACK STRUCTURE | SIZE (BYTES) |
|---|---|---|
| 0 | VALID FLAG 'AA'=> VALID | 2 |
| 1 | I/O ERROR COUNT | 2 |
| 2 | RESERVED | 696 |
| 350 | BASE TRACK # FOR SWAP TRKS | 2 |
| 351 | ICL TRACK # | 2 |
| 352 | PDL TRACK # | 2 |
| 353 | RPL TRACK # | 2 |
| 354 | ICL BACKUP TRACK # | 2 |
| 355 | PDL BACKUP TRACK # | 2 |
| 356 | RPL BACKUP TRACK # | 2 |
| 357 | AI BASE TRACK # | 2 |
| 358 | 20 REPORT TRACK #'s | 40 |
| 378 | REPORT CONTROL LIST<br>20 VECTORS OF THE FORM:<br><1ST FREE BYTE (W), #BYTES (W)> | 80 |
| 418 | REPORT POINTERS<br>511 VECTORS OF THE FORM:<br><INDEXES (W), OFFSET (W), LENGTH (W)> | 3066 |
| 1951 | 20 PROGRAM DIRECTORY TRACK #'s | 40 |
| 1971 | PROGRAM DIRECTORY<br>64 VECTORS OF THE FORM:<br><NAME (12 BYTES), INDEX (W), OF SET (W), SIZE (W)> | 1152 |
| 2547 | IMAGE LOCATION LIST<br>511 TABLES OF 11 VECTORS OF THE FORM:<br><TRK # (W), BYTE (L)> | 33726 |
| 19410 | ALLOCATION BITMAP<br>1 BIT PER TRACK (8230 TRKS) | 1030 |
| 19925 | BAD TRACK BITMAP<br>1 BIT PER TRACK (8230 TRKS) | 1030 |
| | TOTAL | 40880 |

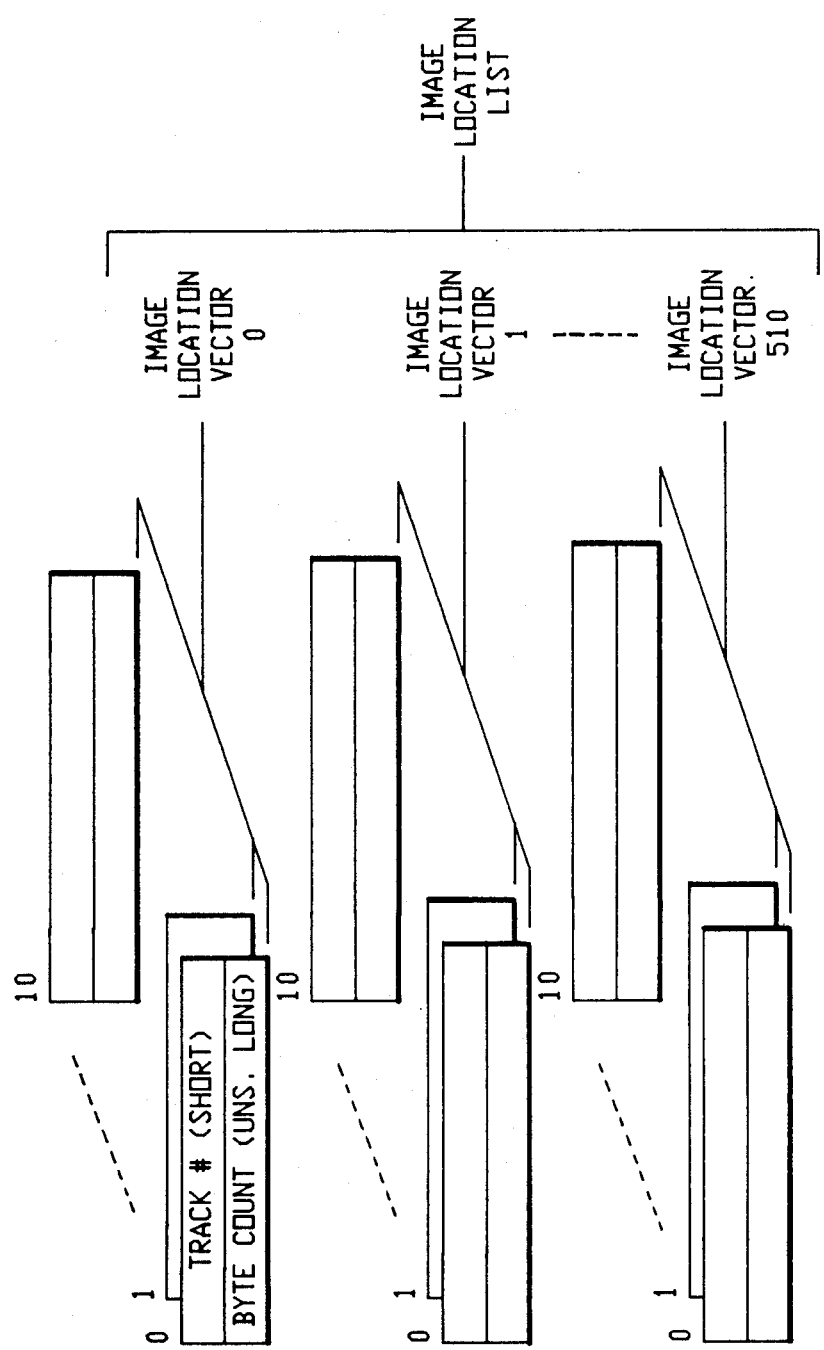
FIG. 7.6

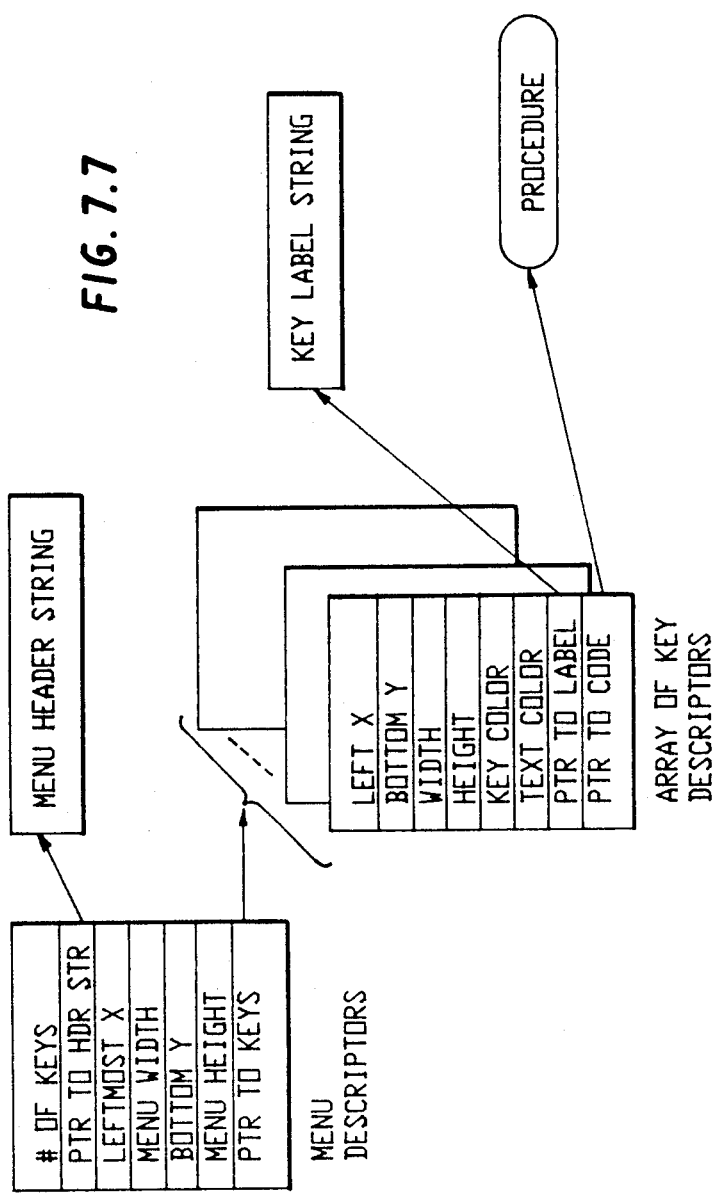

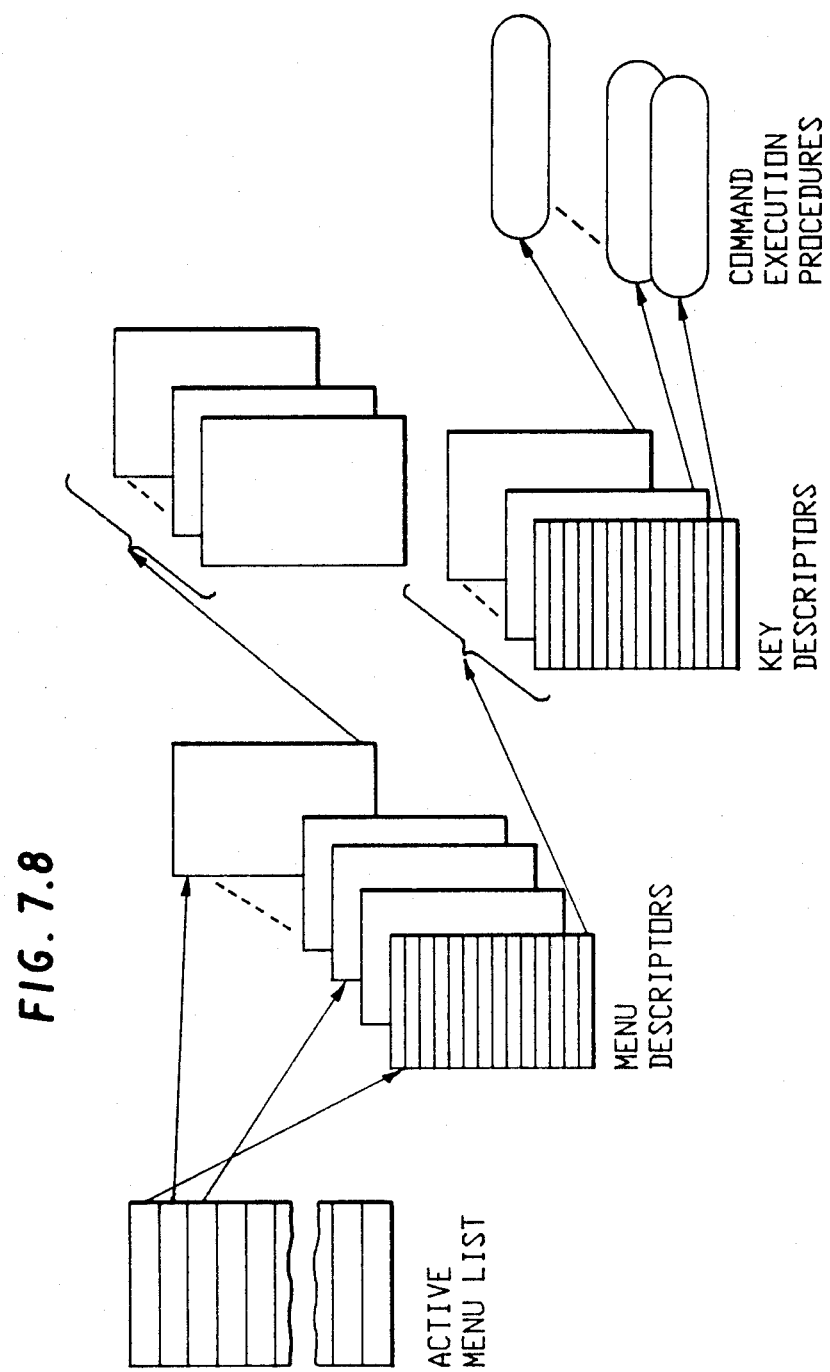
FIG. 7.8

IMAGE PARAMETER BLOCK (IPB)

```
IMAGE REFERENCE NUMBER
IMAGE LAYER NUMBER
USE COUNTER
BASE MEMORY PIXELS/LINE
BASE MEMORY LINES/IMAGE
BASE MEMORY BITS/PIXEL
DISPLAY MEMORY PIXELS/LINE
DISPLAY MEMORY LINES/IMAGE
DISPLAY MEMORY SELECT
STATE FLAGS (32 BITS)
CURRENT WINDOW VALUE
CURRENT LEVEL VALUE
CURRENT MAP TYPE
BASE MEMORY STARTING ADDRESS
BASE MEMORY PROCESSING X OFFSET
BASE MEMORY PROCESSING Y OFFSET
DISPLAY MEMORY PROCESSED IMAGE X OFFSET
DISPLAY MEMORY PROCESSED IMAGE Y OFFSET
DISPLAY MEMORY PROCESSED IMAGE PIXELS
DISPLAY MEMORY PROCESSED IMAGE LINES
BASE MEMORY CURSOR X
BASE MEMORY CURSOR Y
CURRENT FILTER TYPE
CURRENT ZOOM FACTOR
POINTER TP IPB FOR REFERENCE IMAGE
POINTER TO IMAGE LOCATION VECTOR
PDL ENTRY
ICL ENTRY
RPL ENTRY
```

*FIG. 7.9*

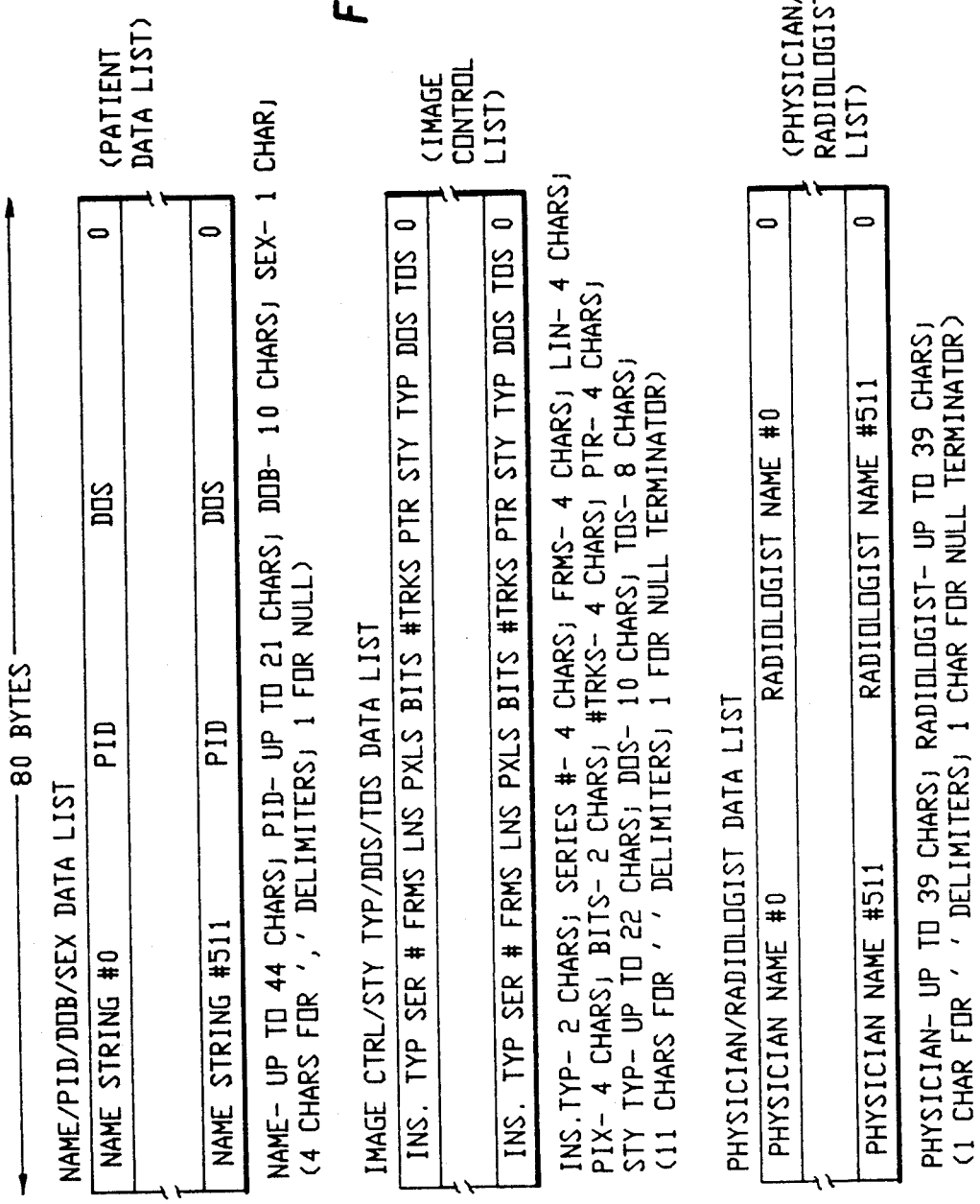
FIG. 7.10

FIG. 7.11

ADAPTIVE INTERFACE FILE

| SYSTEM USER ENTRY |
| USER 0 |
| USER 1 |
| ---- |
| USER 157 |
| RESERVED 176 BYTES |

FIG. 7.12

ADAPTIVE INTERFACE FILE USER RECORD

```
USER LOGON NAME
USER PASSWORD
CONTROL FLAG
USER RECORD INDEX

IMG TYPE 0 - DEFAULT WINDOW
IMG TYPE 0 - DEFAULT LEVEL
IMG TYPE 0 - DEFAULT FILTER
IMG TYPE 0 - DSPLY 1 CURSOR
IMG TYPE 0 - DSPLY 2 CURSOR
IMG TYPE 0 - DEFAULT ZOOM
        ----
IMG TYPE 8 - DEFAULT WINDOW
IMG TYPE 8 - DEFAULT LEVEL
IMG TYPE 8 - DEFAULT FILTER
IMG TYPE 8 - DSPLY 1 CURSOR
IMG TYPE 8 - DSPLY 2 CURSOR
IMG TYPE 8 - DEFAULT ZOOM

RESERVED (272 BYTES)
```

NOTE: TOTAL RECORD SIZE IS 256 BYTES

FIG. 7.13  COMMAND VECTORS

```
VECTOR TYPE              <VECTOR,   POINTER TO >
DIRECT COMMAND              -1      X,Y COORDINATE PAIR
KEYBOARD STR                 0      STRING
SHAFT ENCODER F1             1      STRING OF TYPE ^Aa#####\r
SHAFT ENCODER F2             2      STRING OF TYPE ^Ab#####\r
SHAFT ENCODER WINDOW         3      STRING OF TYPE ^Ac#####\r
SHAFT ENCODER LEVEL          3      STRING OF TYPE ^Ad#####\r
SHAFT ENCODER FILTER         4      STRING OF TYPE ^Ae#####\r
SHAFT ENCODER ZOOM           5      STRING OF TYPE ^Af#####\r
TRACKBALL X,Y                6      STRING OF TYPE ^Ag#####\r,#####\r

COMMAND MONITOR TOUCH SCREEN 7      STRING OF TYPE ^E###,###\r
IMAGE MONITOR 1 TOUCH SCREEN 8      STRING OF TYPE ^FXY\r
IMAGE MONITOR 2 TOUCH SCREEN 9      STRING OF TYPE ^GXY\r
```

NOTE: '#####' REPRESENTS A STRING OF ASCII DIGITS GIVING THE DELTA BY WHICH THE ENCODER OF TRACKBALL CHANGED POSITION. THE STRING IS ALWAYS COMPRISED OF BETWEEN 1 AND 5 DIGITS.

NOTE: '###' REPRESENTS A STRING OF 3 ASCII DIGITS SPECIFYING THE X OR Y COORDINATE (AN INTEGER IN THE RANGE OF 000-999).

NOTE: 'XY' IN TOUCHSCREEN STRINGS REPRESENTS TWO ASCII CHARACTERS WHICH RESPECTIVELY ENCODE THE X AND Y COORDINATES.

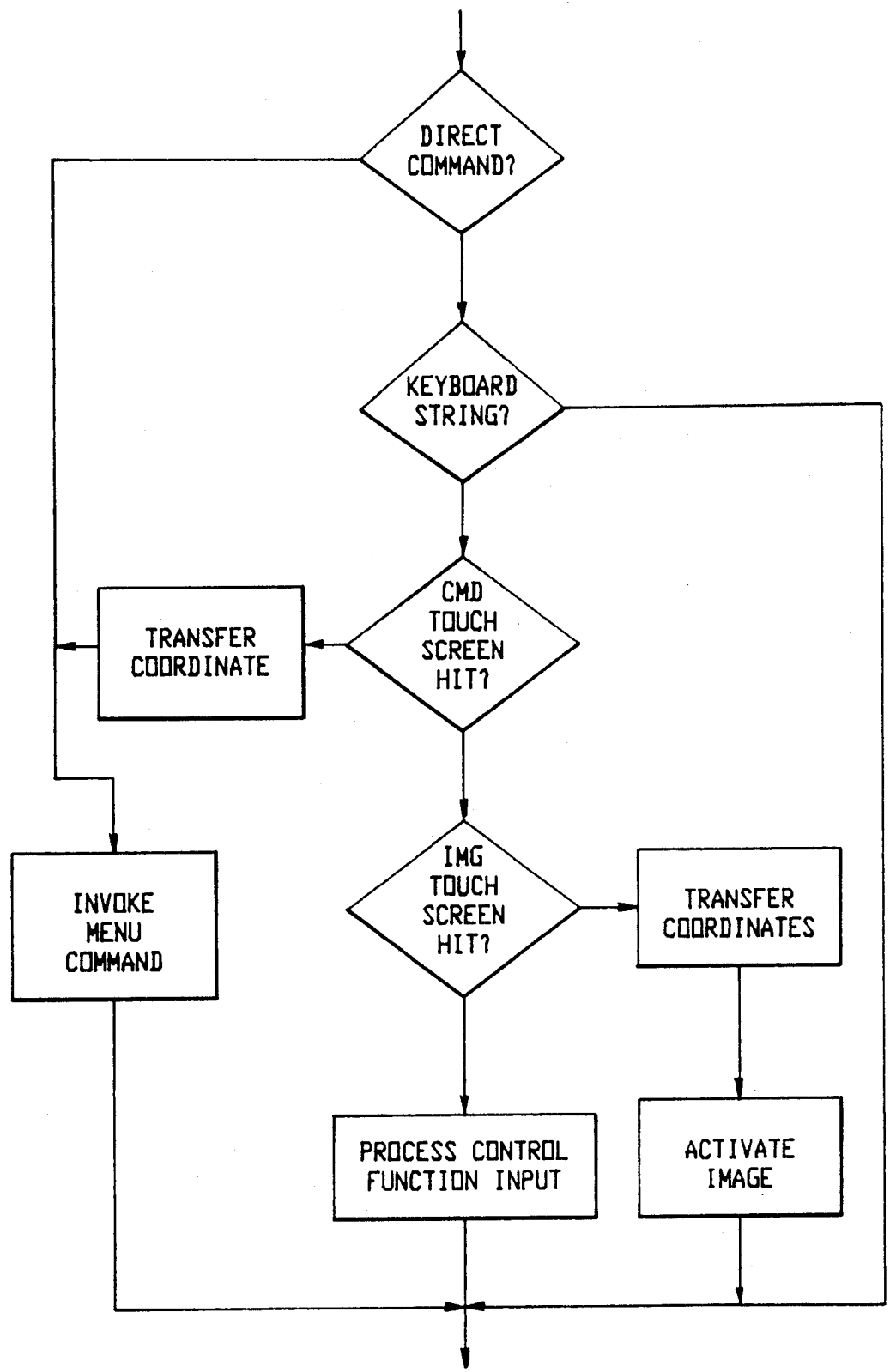
FIG. 7.14

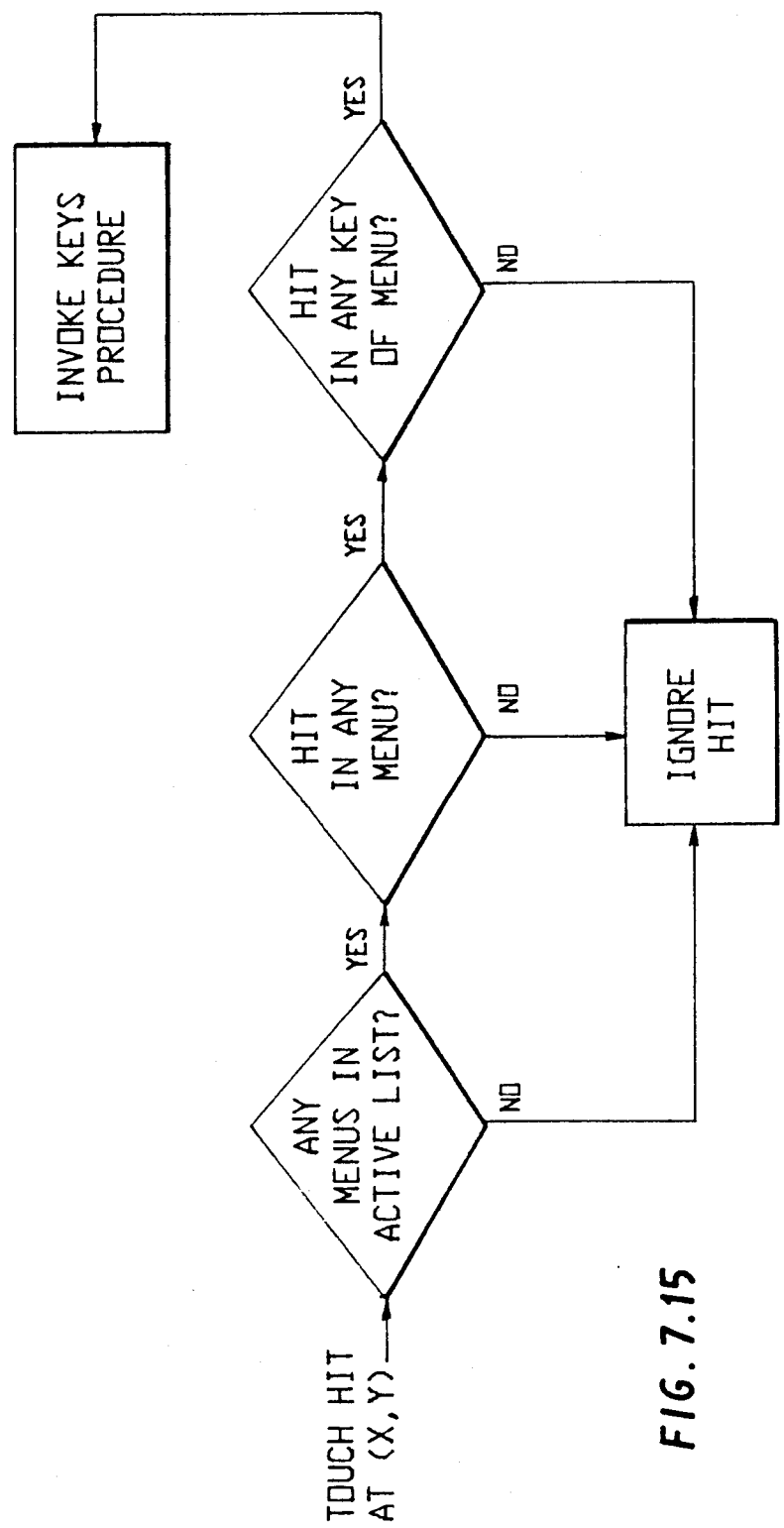
FIG. 7.15

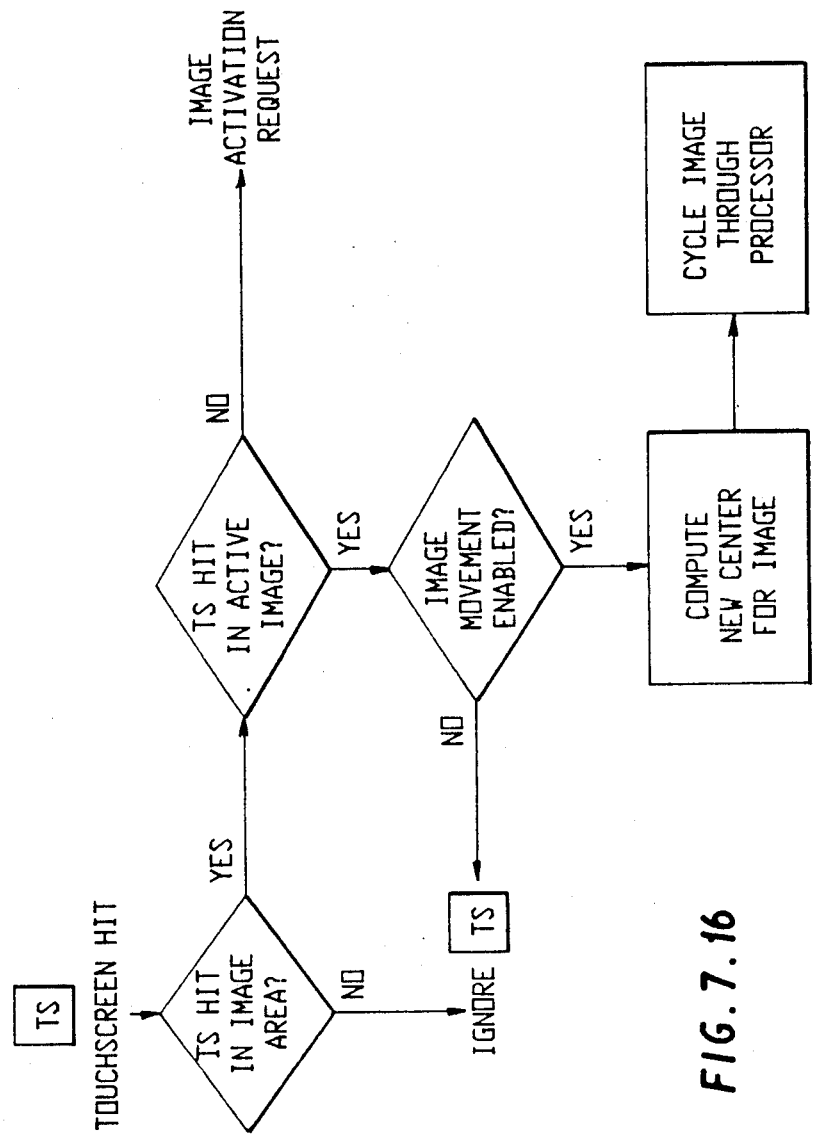
FIG. 7.16

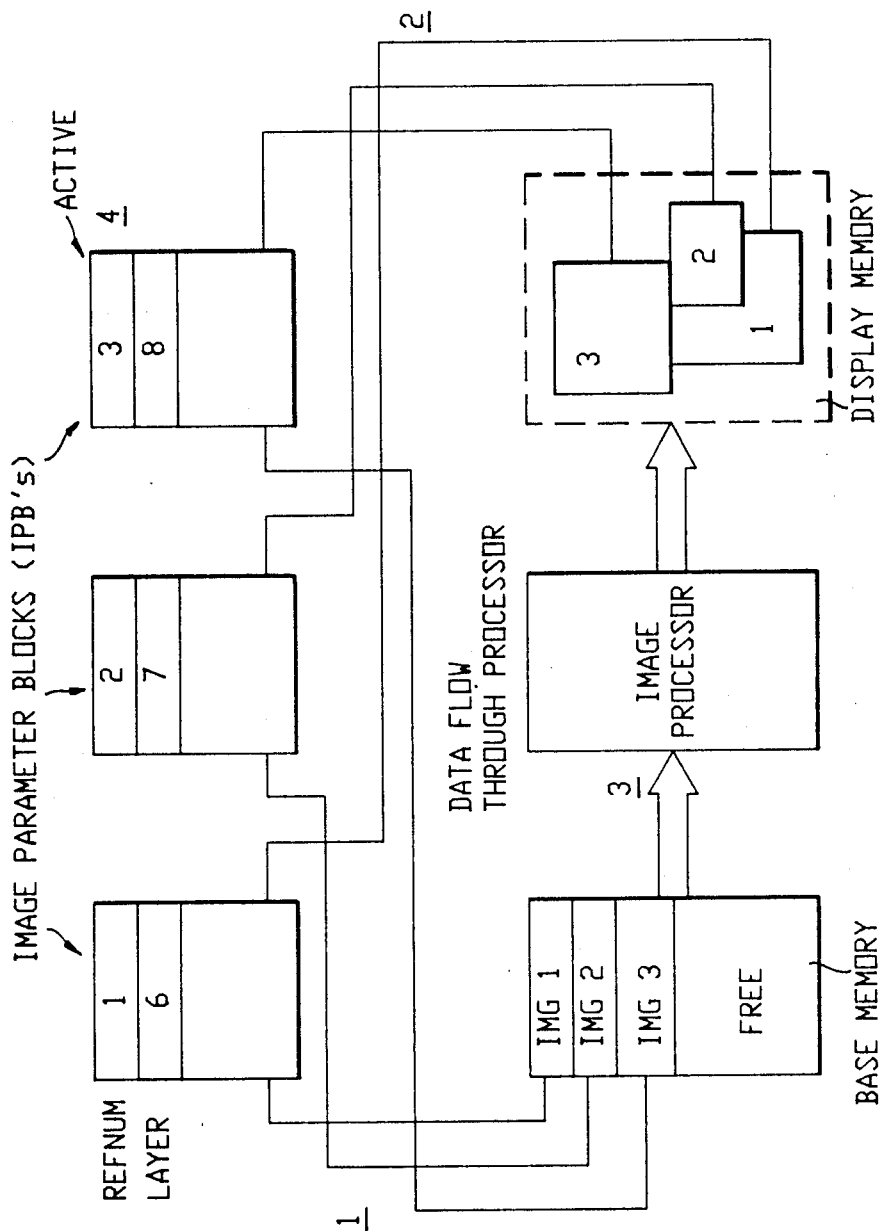
FIG. 7.17

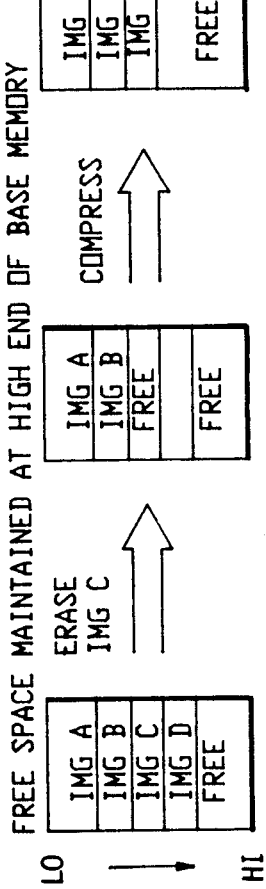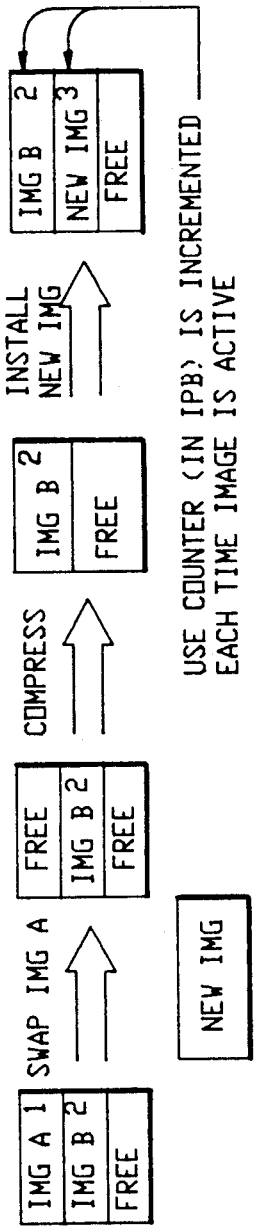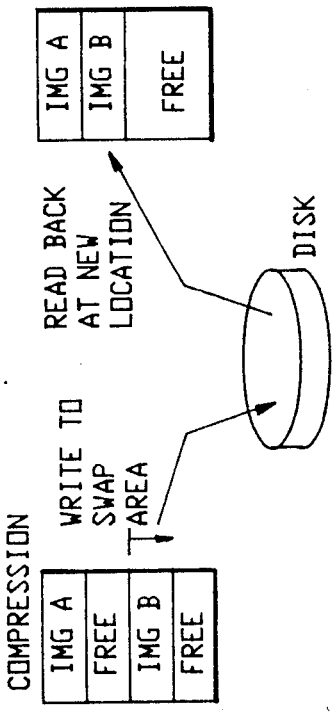
FIG. 7.18

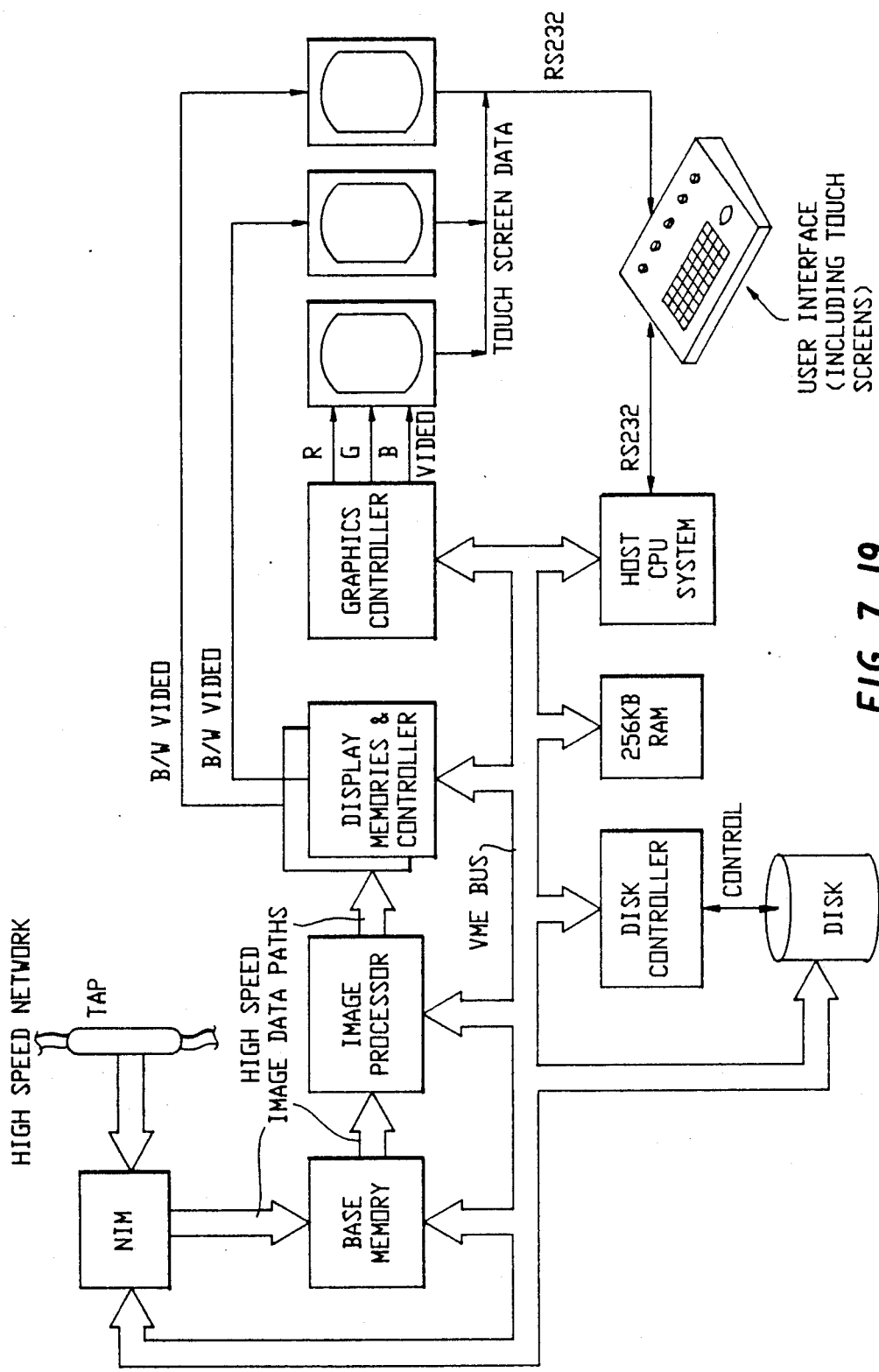
FIG.7.19

IMAGE VIEWING STATION FOR PICTURE ARCHIVING AND COMMUNICATIONS SYSTEMS (PACS)

BACKGROUND OF THE INVENTION

1. Field of the Invention

This invention relates to an image viewing station for picture archiving and communications systems (PACS), and more particularly to such a station for processing and displaying digital diagnostic images.

2. Discussion of the Background

In recent times, escalating health care costs have spurred efforts to make health care delivery systems less expensive and more efficient, particularly in hospitals. This has led to the introduction of computers in many areas of hospital management. Computers have been used for many years in areas such as patient registration and in clinical laboratories. A major new application area is within radiology departments.

Modern radiology systems will consist of two major components. The first component consists of a system to provide management tools such as scheduling and inventory control. The second component is a system to replace the film based imaging systems currently used in radiology departments with their photoelectronic equivalents. This application area is called PACS (Picture Archiving and Communication Systems).

A PACS system can be divided into several subsystems as shown in FIG. 1.0. They are photoelectronic image acquisition 2, image storing or archiving 4, electronic image transmission 6, image display 8, and external communication links 9. The specification of each of these components is a function of the number of images generated, the resolution of these image, and the number of times each image is viewed.

Chest radiographs comprise about 85% of the total case load in a radiology department. They are also the most difficult class of images to handle. These images are characterized by a spatial resolution of at least 2048×2048 pixels with a 60 db dynamic range. Thus, each chest radiograph requires about 40 megabits for representation. To transmit such an image from an archive to a display workstation in 0.5 seconds (time requirements to be discussed below) requires a transmission bandwidth of more than 80 megabits/sec. To display such an image on a video monitor (with a single gun CRT) requires that data be presented at an 2.8 megapixel rate. These requirements underscore the difficulty in processing a chest radiograph within a PACS environment. Since a large percentage of a radiology department's work load involves the generation and diagnostic evaluation of chest radiographs, a successful PACS system obviously must be able to accommodate the vast amounts of image data forthcoming from the chest radiographs.

The first of the PACS subsystems is the photoelectronic image acquisition system 2. Many medical imaging modalities already produce images in digital form. These include Computed Tomography (CT), Nuclear Medicine, Magnetic Resonance Imaging (MRI), Ultrasound and Digital Subtraction Angiography. These images are characterized by spatial resolution 512×512 or less, with 40 to 60 db dynamic range. Until recently there was no photoelectronic system capable of acquiring large format (14×17 inch) images such as those of the chest. Without this large format capability, a PACS system would be of little value since these images comprise such a large percentage of all those taken. The introduction of large format image acquisition systems eliminates the last major PACS specific data acquisition problem.

The second PACS subsystem is image archiving 4. There are many approaches to this problem. The current strategy is to divide the archive into two sections. The first, a short term archive, is designed to handle the active images for patients currently under treatment. It is characterized by rapid access time, read/write capability, and limited storage. The long term archive is non-erasable. Laser optical disks are being proposed for this application. The current technology will provide approximately three gigabytes of storage on a ten inch diameter disk. The combination of these two technologies will provide for both rapid access to active images and compact long term storage.

The third PACS subsystem is image transmission 6. The transmission system must provide bidirectional communication between acquisition systems, display workstations, and the image archive. It is envisioned that this system will eventually become a component of a national network 9 linking together hospitals all across the country. The primary design considerations for the image transmission system are speed and reliability. Speed is being achieved through the use of parallel fiber optic transmission links. Reliability is achieved through redundant data paths. The systems are designed such that a single cable failure will have only local effect.

The fourth PACS subsystem and the subject of this invention, is the digital image viewing workstation 8. This workstation will functionally replace the large panels of light boxes currently used with the film based imaging system.

Radiologists consume information at an incredibly large rate. In a typical situation, six to eight images will be examined and the report dictated in less than a minute. To meet the needs of the PACS system, and to be accepted by the medical community, the viewing workstation must provide image handling no slower than that of the film system it is designated to replace.

SUMMARY OF THE INVENTION

Accordingly, an object of this invention is to provide a new and improved image viewing station for use in the PACS environment which has a multimodality display capability and thus is capable of displaying images of different image modalities characterized by different spatial resolution and dynamic range on the same screen for comparison purposes.

Another object of this invention is to provide a novel viewing station in which image data of different imaging modalities are independently processed and displayed on the same screen.

Another object of this invention is to provide a viewing station as above noted, having multiple high resolution displays.

Yet a further object of this invention is to provide a novel image viewing station capable of performing independent image processing of multimodality image data, including processing functions that mimic manual operations currently performed in the conventional film-based system, including an electronic zoom capability to provide the same function as moving film close to the eye for close inspection, and contrast enhancement which performs the same function as "bright lighting" a film.

A further object of this invention is to provide an image processing capability for an image viewing station which will allow a radiologist to visualize information that is presently not appreciated and will thereby provide a diagnostic enhancement over the film-based system.

Yet another object of this invention is to provide an imaging viewing station for a PACS system which is fully user friendly and which is usable by a physician with only a minimum familiarity of the viewing station.

Yet another object of this invention is to provide in a PACS environment an image viewing station which would be used in the reading room of a radiology department, or in speciality clinics, such as cardiology, in which radiographic images play a major role in diagnosis. In this environment, a physician would log onto the system to view one or more of his patient's images. Possibly, the images to be viewed may have been previously sent from the archive to the viewing station by an operator on the archive system. The physician would use the viewing station to look through a directory and select his patient's images for display. The viewing station of the invention would then display the selected images in an initial state specified by the image parameters in the physician's adaptive interface file entry. If the physician would prefer all bone images white on a dark background, but angiograms black on a white background, the status of the images would be initialized so that they appear that way when first displayed. The station of the invention is capable of calling up several images, allowing some to be placed at a default position and permitting the direct specifying of the positions of others using touch screen controls. These touch screen controls can also be used by a physician to move an image across the display to bring it into juxtaposition with another image comparison. In so doing, the viewing station of the invention enables the physician to adjust the window/level settings to bring out contrast, perhaps using a high pass filter to sharpen edges. Further, the viewing station of the invention enables the physician, after examining a set of CT images, chest and nuclear medicine images, to call up a sequence of cine images as a movie loop, to view coronary arteries. On the other hand, if the user of the viewing station is not a radiologist, he could display the text of the report dictated by the doctor who read the images. The viewing station of the invention is sufficiently flexible such that the archive could be queried for further images which were previously sent. Once finished, the physician could erase the images from the display and move onto other patients or log off the system.

The above objects as well as others, are achieved according to the present invention by providing a new and improved image viewing station having an architecture including a base memory, image processor and display memory which permits multiple images to be displayed on a display monitor for immediate viewing by the user and which allows the processing of various locations of the image independently of the other locations thereof and for the display of the image to be instantly updated in response to the user's commands. According to the invention, the radiologist user sees the image as it is being interactively manipulated and processed by the system as commands are entered via the user interface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1.1 is a schematic block diagram of the image viewing station according to the invention;

FIG. 2.1 is a flow chart illustrating the operation of the physician's review console memory request arbitrator used for servicing requests on a priority basis;

FIG. 2.2 is a block diagram functionally illustrating image data loading into the base memory from the NIM port or by the VME bus port;

FIGS. 2.2.1 (A & B in combination) are a detailed block diagram functionally illustrating the base memory;

FIG. 3.1 is a block diagram illustrating the base memory address generator provided in the image processor;

FIG. 3.2 is a block diagram functionally illustrating the subtractor of the image processor according to the invention;

FIG. 3.3 is an illustration of how fractional zoom bilinear interpolation is performed by the image processor according to the invention;

FIG. 3.4 is a detailed block diagram illustrating the fractional zoom bilinear interpolation performed by the image processor according to the invention;

FIG. 3.5.1 is a schematic block diagram functionally illustrating the image processor;

FIG. 3.5.2 is a detailed block diagram illustrating the FIR filter of the image processor;

FIG. 3.5.3 is a detailed block diagram illustrating the substrator, LUT and histogram component of the image processor;

FIG. 3.5.4 is a detailed block diagram illustrating the continuous zoom (COZO) component of the image processor;

FIG. 3.5.5 is a detailed block diagram illustrating the display address generator component of the image processor;

FIG. 3.5.6 is a detailed block diagram of the image processors base memory address generator;

FIG. 3.5.7 is a detailed block diagram illustrating the line buffer in the image processor;

FIG. 4.1 is a schematic block diagram functionally illustrating the display memory of the invention;

FIG. 4.1.1 is a detailed block diagram functionally illustrating the display memory of the invention;

FIG. 4.1.2 is a detailed block diagram functionally illustrating the display memory controller of the invention;

FIG. 5.1 is a block diagram functionally illustrating the disk controller according to the invention;

FIG. 6.1 is a schematic block diagram of the user interface by which a user interfaces with the image viewing station of the invention;

FIG. 7.3 is a schematic diagram illustrating image state transitions;

FIG. 7.4 is a schematic diagram illustrating the structure of the disk according to the invention;

FIG. 7.5 is an illustration of the directory control track (DCT) which is the primary data structure on the disk;

FIG. 7.6 is a schematic illustration of the image location list (ILL) which is a structure within the DCT used to manage the tracks allocated to image data;

FIGS. 7.7 and 7.8 are schematic illustrations of key descriptors and menu descriptors used according to the invention;

FIG. 7.9 is an illustration of the structure of the image parameter block (IPB) according to the invention;

FIG. 7.10 is an illustration of the image data lists and adaptive interface lists which maintain information about an image to be displayed;

FIGS. 7.11 and 7.12 respectively illustrate an adaptive interface file which provides predetermined information for the initialization of an image parameter block and fault parameter values, respectively, which allows a user interface to be tailored for each user;

FIG. 7.13 is a summary of command vectors which distinguish the various types of inputs which are available to the image viewing station according to the invention;

FIG. 7.14 is a flow chart illustrating command processing of a direct command vector which enables use of the image viewing station even if a command monitor touch screen fails;

FIGS. 7.15 and 7.16 are flow charts illustrating a command displatch routine and image activation and movement routines, respectively, according to the invention; and FIG. 7.17 is a schematic block diagram illustrating the shuffle activation of images according to the invention;

FIG. 7.18 illustrates the management of base memory space;

FIG. 7.19 illustrates the relationship of the user interface with the overall system architecture.

DESCRIPTION OF THE PREFERRED EMBODIMENTS

The primary justification for the development of an image workstation as described above is the requirement for a digital display station to replace currently existing film viewing technology in radiology departments. To be effective such a display station must be easy for the radiologist to use and must provide diagnostic quality images.

Figure 7:
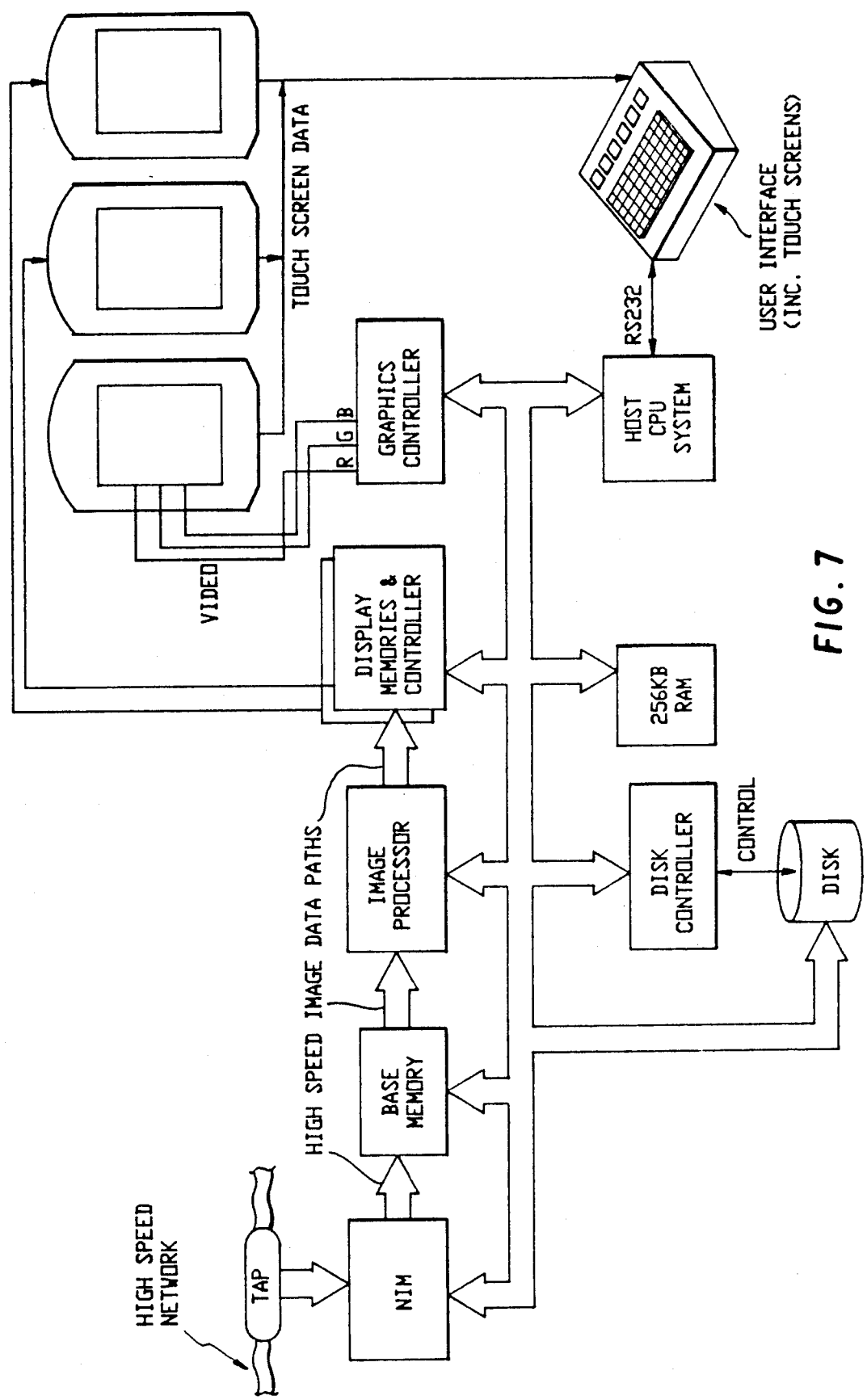
FIGS. 7.1 and 7.2 are illustrations comparing the functional operation of the image viewing system of the invention with the conventional viewing of film images by the radiologist, respectively.

In terms of ease of use, the Hardware/Software architecture of this workstation provides the radiologist with a tool which is much easier to use, and to learn to use, than any previously existing digital device for use in digital radiology. This system provides a simple interface of self-explanatory command menus which eliminate the necessity for typing by the user. Our previous experience developing digital intravenous angiography systems has taught us that radiologists do not like to type, since it slows down their work. The command input path in this system a "see and do" feedback path in which the system displays the commands available to the user and he may simply touch the one he wants to execute (FIG. 7.1). The touchscreen sensors send the location of his touch through the desk to the workstation (FIG. 7.19). The workstation software determines which command menu key was touched by the user and invokes the software to perform that command (FIGS. 7.14 & 7.15). The results of that command action will change either the image displays or the command display, or both. The alteration of information on the displays provides feedback to which the user may respond. Because of this command interface the user is not required to memorize commands. All the user needs to remember is the general action performed by a command, not some cryptic command name or confusing sequence of operations to be typed in from the keyboard. This type of simplified interface is essential to the success of digital radiology.

Another advantage of the architecture embodied in this sytem, and one which is also facilitated by the touchscreens is the manipulation of images directly by touch. This feature is not found in other currently existing digital workstations. When the workstation receives a touchscreen hit location on the image displays it determines which of the images currently appearing on the display was touched (FIG. 7.16). The software then selects that image to be the target of subsequent processing action by the user. This gives the user the capability of switching between images with very little effort. For instance, if the user has two images side by side on one display he may adjust the contrast and brightness of one image, touch the second and adjust its contrast and brightness, touch the first and adjust its magnifications and so on, until he has the two images appearing to his satisfaction. All of this is done without the need for keyboard input. The touch of an image selects it for processing and the adjustment of its contrast and brightness, or magnification, is accomplished by turning a knob on the desk. The only way he could do it with less physical work would be if he could use voice or thought activated commands. The latter is currently not possible and the former suffers from technical limitations (e.g., limited vocabulary, restrictions on pronounciation, etc.). However, should those technologies become feasible the architecture of this sytem would allow their addition with very little difficulty. Of course, the user is not limited to two images for this kind of manipulation, and there is no requirement that an entire image be visible on the screen for it to be selected. As long as a part of the image is visible the user may touch that part to select the image for processing, while images which are completely covered by other images must be selected by the menu activated 'shuffle' command (FIG. 7.16). The user is not limited in the number of images on the display and he is not required to remove images from the display in order to view subsequent images. Another aspect of the users direct interaction with images via the touchscreen is his ability to move images across the screen by "dragging" the image with his finger. This allows the user to juxtapose two images for comparison, or to move an image off to one side of the display, perhaps to prevent it from being covered by other images he may wish to view.

Yet another factor which makes this system easy to use is the software management of the base memory and disk which relieves the user of the burden of managing base memory space. Systems commonly in use for display of digital images generally require the user to keep track of how many images are in the image memory. If that memory becomes full he must remove some image to make room for any new image data he wishes to view. The architecture of the workstation described in this document provides for the automation of this task in a manner similar to virtual memory management in general computer systems. The software determines whether an image will fit in the available base memory space and removes images if necessary. The images removed are those which have been selected for processing, by the user, least recently (FIG. 7.18). This frees the user from tedious image management tasks and makes the system easier to use. If the user should select an image which has been removed from the base memory it is simply brought back into memory, with another image removed to make room for it. Again, all of this takes place transparently to the user. These features which contribute to the ease of system use are made possible by the speed with which images are processed by the system. The transparent management of the base memory is made possible by the 2.4 Megabyte/sec transfer rate between the disk and the display memory, and by the 150 nsec/pixel average processing speed of the image processor. If the user has several images appearing on the display and touches the exposed corner of one image which is overlapped by others, in approximately 2/5 second the system will determine which image he touched, process the image data from the base memory through the image processor and display the processed image on the display monitor (FIG. 7.19). Of course, now the image will appear in its entirety, perhaps overlapping the images which previously covered it. If the selected image happened to have been removed from memory the response time will be slightly longer as the system determines another image to remove and then reads the selected image from disk into the base memory. When the user adjusts the contrast and brightness, or zoom or filter, the desk passes the change of the knob position on to the workstation. That change (or delta) is used to adjust an appropriate parameter (such as window or level, zoom factor or filter coefficients) and the image is reprocessed from the base memory through the image processor and the new processed image appears on the display. Because of the speed of the processor the system gives the appearance of being hardwired (like the contrast & brightness on a TV) and the software is transparent to the user. With these features the system provides the capability for processing multiple, independent images quite easily, with much of the work accomplished simply by turning knobs on the desk console. In fact, there is no specific limitation on the type of image which may be processed by this system, though it was designed for digital radiology. Any black & white image, with 1 to 12 bits of contrast resolution, for which contrast/brightness, filtering and magnification/minification are meaningful could be successfully processed on this system. The images may be unsigned integer data or two's complement (i.e., signed integer) and may range in size from 4 to 4 million pixels.

The capability of this system for displaying high (spatial) resolution images satisfies the requirements for diagnostic quality images. Current psychophysical studies indicate that a minimum spatial resolution of 1024×1024 pixels is required for diagnostic quality images in chest radiology (85% of radiology is chest imaging). The use of two 1024×1536 pixel monitors in this system meets those resolution requirements and provides an aspect ratio similar to that of the 14"×17" film on which chest radiology is most commonly done. This provides an image display which is familiar to the radiologist and makes his transition from film based work to digital radiology much easier. Additionally, there is no limitation in the architecture of this system which prevents the use of more than two image display monitors. The 4 Megapixel base memory, which delimites the largest single image which may be processed by the system, provides the capability for processing a 2048×2048 pixel image. Currently this is about the largest digital image found in radiology and there is some debate about whether any diagnostically useful information is gained by acquiring larger images (i.e., image of higher spatial resolution). Images of this size may be displayed by the system described in this document in a minified form in which the entire image appears on the 1024×1536 display. This minification is accomplished by the image processors continuous (bilinearly interpolated) zoom which is referred to as COZO and which is the single most important, and unique, feature of this image workstation. This feature allows the user to view the entire image at less than full resolution and select the region of the image in which he is interested. That region may then be continuously zoomed, via the zoom knob on the desk console, until it is viewed at full resolution and the beyond and viewed magnified if desired.

The Hardware/Software architecture of the image workstation described in this document provides a unique system with which a radiologist may conveniently, and quickly, view digital images.

Figure 1:
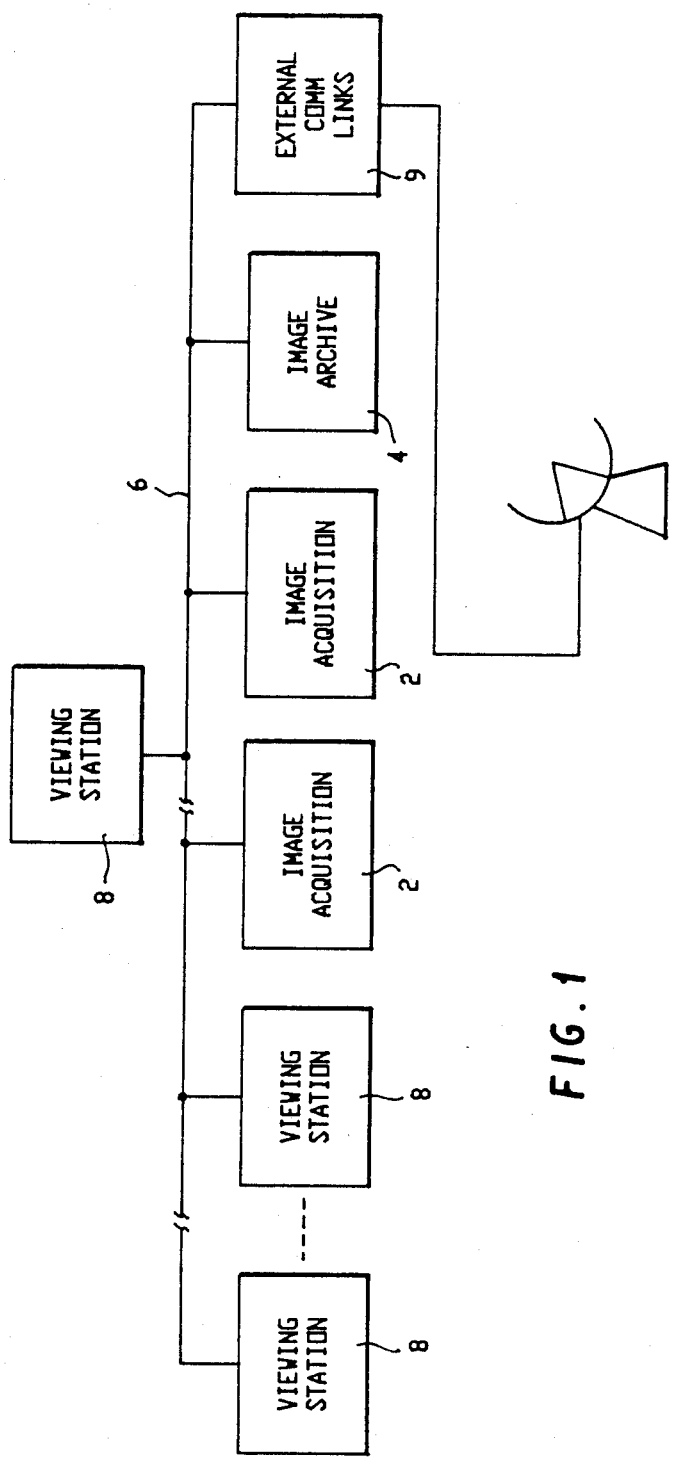
FIG. 1.0 is a block diagram of a PACS system.

Referring now to the drawings, wherein like reference numerals designate identical or corresponding parts throughout the several views, and more particularly to FIG. 1.1 thereof, a digital image viewing station according to a preferred embodiment of the invention is there shown and includes a base memory 10, image processor (IP) 12, display memories 14, disk drive 30 and an associated disk controller 32 for storage of images and data required for the operation of this system, and control processor (CPU) 16. The display memories 14 store processed image data and are connected to conventional cathode ray tube (CRT) devices 18 via a digital-to-analog converter (DAC), not shown. The viewing station further includes a network interface 24 which functions as an interface between the PACS, or other communication network, 26 and an internal (VME) bus 28 connecting the interface 24 with the base memory 10. The internal address/data bus, VME bus 28, is provided for sequential memory data transfer and address transfer between all components constituting the viewing station.

The preferred embodiment of the base memory 10 has 4.2 Mexapixels of dynamic random access memory in which image data may be stored, with up to 12 bits per pixel. This provides capacity for images of up to 2048×2048 pixels, and the base memory 10 may hold multiple images simultaneously. Each pixel element in the memory 10 has an additional 4 bits reserved for graphics planes. These planes are used for performing graphic annotation and plotting which may overlay the image data. As may be seen in FIG. 1.1 and FIG. 2.2, the base memory has three ports 110, 112, 118 that are connected to the IP 12, network interface 24, and VME bus 28. Through the network interface, a network request or data is transferred to or from the base memory 10 via the NIM port 110. The IP 12 reads image pixels from the base memory 10 through the image processor port 118. The VME bus port 112 with its associated control register 116 controls the configuration of base memory data words read from or written to the base memory 10 so as to allow individual graphics bits and/or image data to be accessed. The presence of the disk drive 30 and controller 32 and its high speed connection to the base memory through the internal system bus 28 provides an extension of the base memory to yield a virtual image memory of 170 Megapixels.

The workstation's image processor 22 is composed of high speed pipelined array processors which carry out the functions of intensity (grey level) transformation on the entire image, histogram of regions of interest within an image, spatial filtering, and continuous bilinear interpolated zoom (hereinafter referred to as COZO).

The display memories 14 each have two buffers capable of storing 1024×1536 pixels. At any one time one of the buffers is selected to provide the image currently being displayed. The display memories implement a high speed architecture designed to refresh a 1024×1536 pixel matrix on the display at 40 frames per second (to eliminate flicker). Additionally, the display memories have a replicative zoom (×4) capability to allow the display of 256×256 pixel subimages in a 1024×1024 format, with any of the 24 possible subimages selectable for viewing.

In the preferred embodiment, the image data selected for processing passes first through the subtractor 100, on to the look-up-table (LUT) 102 in which grey level transformation processing is performed. From the look-up-table (LUT) 100 the image data passes through the spatial (high/low pass) filter 104 and then into the COZO 106. The spatial filtering 104 may be adjusted by the user to vary between low pass filtering to high pass filtering, with no filtering of the image data at the midpoint between the two extremes. The COZO 106 is designed to perform fractional zooms computed by bilinear interpolation and provides continuously variable enlargement or minification of the image to be viewed by the user. The operation and principle of COZO 106 is explained in detail below.

As can be seen in FIG. 1.1 the CPU 16 is provided with input equipment 34. The CPU 16 and its associated input equipment 34 may be any of a variety of well known devices capable of responding to input controls and developing corresponding signals for driving one or more sections of the review console in accordance with the preferred embodiment of the present invention, such as keyboard, trackball, function-keys, and function knobs. Coupled to the input equipment 34 are touch screens 35 which provide a particularly user friendly interface for controlling the display of images.

BASE MEMORY

The role of the base memory 10 in the view station is to hold the raw image data and provide a high speed data path to both the image processor 12 and to the network interface 24. Base memory 10 includes a memory array 10' which can store the raw image data of many different imaging modalities simultaneously up to a single 2048×2048×16 image. The triple ported base memory 10 can store variable length image data and assign a variable number of graphics bit planes on an image by image basis. To allow high speed memory transfers, the CPU 16 employs a fast memory request arbitrator 109 to service the requests on a priority basis, as shown in FIG. 2.1.

Referring to FIG. 2.2, data is loaded into the base memory 10 from the NIM port 110 or by the VME Bus port 112. The base memory 10 provides 16 bit per pixel with a variable number of 8 to 12 bits for image data and the remaining 4 to 8 bits for independent graphics planes. When the data is loaded from the NIM port 100 or the VME Bus port 112, a respective read/write control register 114 or 116 governs which bits are image data and which bits are graphics bits and whether or not they can be written to.

The NIM port 110 is an independent bi-directional high speed port which allows eight pixels to be written to or read from the base memory for a single memory request. The image and graphics bits involved during a write operation is governed by the NIM port's read/write control register 114. Such a design allows an existing image in memory 10 to have its graphics data updated without disturbing its image data. This scheme directly improves the efficiency of the PACS system by allowing only the required data needed for the update to be transmitted on the PACS network.

The VME bus port 112 works similar to the NIM port 110 with the only restriction of being able to read/write one or two pixels for a single memory request. However the VME bus port 112 has a unique enhancement in that during a read operation the data that is defined by read/write control register 116 as image data can be sign extended. Thus two's complement data can be further processed by the CPU 16.

Base memory 10 also includes an image processor port 118 which is a high speed read only port that reads eight pixels for a single memory request. All sixteen bits of each pixel are transferred to a dual port Random Access Memory (RAM) 120 at the image processor port, as shown in FIG. 2.2.1. The dual port RAM 120 allows simultaneous image and graphics data transfer from the base memory 10 to the image processor 12 where the image and graphics bits are separated by the image processor 12 on an image by image basis.

The control registers 114 and 116 are 16-bit read/write registers mapped into the CPU's (MC 68000) I/O Page and are accessed through the VME bus 28. These registers provide enhanced bit masked read/write features for both the VME bus interface and the NIM interface.

The VME control register 116 has several functions. First of all it defines which graphics bits and/or image data will be involved during VME Bus read/write operations. Secondly it defines the size of the variable length image data word and thirdly it controls the readback format of the sign extended image data. Accordingly, the 16 bits ($D_{15}$–$D_0$) of the control register 116 are assigned as follows:

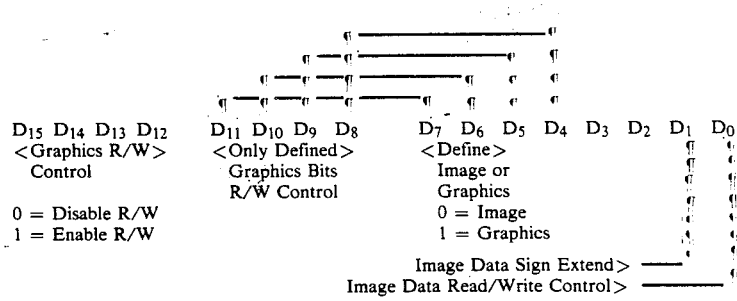

$D_{15}:D_{12}$ are graphics read/write control bits for the independent graphics planes. If any of the bits are set to a "1" then a read operation from the VME Bus will readback that graphics bit. Likewise a write operation will only affect those bit planes whose control bits are set to a "1". If any of the four control bits are "0" then a read operation will readback a zero (0) in that bit position. Similarly a write operation will not affect those bit planes.

$D_{11}:D_8$ are graphics read/write control bits only if the bit positions are defined as graphics bits by the nibble $D_7:D_4$. If any of the bits are defined as graphics bits, their read/write operation is similar to $D_{15}:D_{12}$.

$D_7:D_4$ define which bits in $D_{11}:D_8$ are graphics bits and which bits are associated with the image data word. $D_7$ defines bit $D_{11}$, similarly $D_6$ defines $D_{10}$ and so on. Any bits in $D_7:D_4$ which are set to a "1" will define that corresponding bit in $D_{11}:D_8$ as a graphics bit, likewise any bits set to a "0" will define it's corresponding bit as an image bit. It is important to note that bits which define the data as part of the image data word must be contiguous and start at $D_4$. For example an 8 bit image data word would not have any of the bits in $D_7:D_4$ set to a "0". This now leaves an extra four bits, $D_{11}:D_8$, as graphics bits making a total of 8 graphics bits, $D_{15}:D_8$, available with independent read/write control. A 10 bit image data word would have the bit pattern "1100" in $D_4:D_7$ which defines data bits $D_8$ and $D_9$ as image data bits with $D_{11}$ and $D_{10}$ defined as graphics bits and are available as graphics bit if needed.

| BIT PATTERNS | | | | IMAGE AND GRAPHICS DATA FORMAT | | |
|---|---|---|---|---|---|---|
| $D_7$ | $D_6$ | $D_5$ | $D_4$ | # of Graphic Bits | | # of Image Bits |
| 1 | 1 | 1 | 1 | 8, $D_8:D_{15}$ | 8, | $D_0:D_7$ |
| 1 | 1 | 1 | 0 | 7, $D_9:D_{15}$ | 9, | $D_0:D_8$ |
| 1 | 1 | 0 | 0 | 6, $D_{10}:D_{15}$ | 10, | $D_0:D_9$ |
| 1 | 0 | 0 | 0 | 5, $D_{11}:D_{15}$ | 11, | $D_0:D_{10}$ |
| 0 | 0 | 0 | 0 | 4, $D_{12}:D_{15}$ | 12, | $D_0:D_{11}$ |

$D_3:D_2$ are not used.

$D_1$ is used to sign extend the image data word during a VME Bus read operation only. If the bit is a zero ("0") the image and graphics data are read as a complete 16 bit data word. If the sign extend bit is set to a "1" and $D_0$, the image read/write control bit, is set to a "1" then the variable length image data word will be sign extended to 16 bits. To sign extend the variable length image data correctly the bit in the $D_7:D_4$ nibble must accurately define the length of the image data word. As an example assume that $D_7:D_4$ has the bit pattern "0011" which defines a 10 bit image data word. If $D_1$ and $D_0$ are set to a "1" and a VME Bus read operation takes place the 10 bit image data word will be sign extended to 16 bits and place on the VME DATA Bus. Note that the sign extend function will ignore the graphics data. Also there is no sign extend write function for a VME Bus write operation.

$D_0$ controls the VME Bus' read/write operation on the variable length image data. If $D_0$ is set to a zero ("0") and a VME Bus read operation takes place the variable length image data word will be readback as all zeros ("0"). Likewise a VME Bus write operation will inhibit any variable length image data being written to the Base Memory. If $D_0$ is a "1" and a VME Bus read operation takes place the variable length data word is readback. Similarly a VME Bus write operation will write the variable length image data word into the Base Memory.

VME Bus Read Operation is summarized as follows:

| Graphics | Image | Sign Extend | VME Control Regisbar 116 |
|---|---|---|---|
| 0 | 0 | 0 | All 16 bits will read as zero |
| 0 | 0 | 1 | All 16 bits will read as zero |
| 0 | 1 | 0 | Read only image data, all bits defined as graphics will read as zero |
| 0 | 1 | 1 | Read sign extended image data, graphics bits will be ignored |
| 1 | 0 | 0 | Read all graphics bits that have their R/W bit set, cleared graphics bits and image data will read as zero |
| 1 | 0 | 1 | Same as above |
| 1 | 1 | 0 | Read all graphics bits that have their R/W bits set and image data, cleared graphics bits will read as zero |
| 1 | 1 | 1 | Read sign extended image data, graphics bits will be ignored |

VME Bus Write Operation is summarized as follows:

| Graphics | Image | |
|---|---|---|
| 0 | 0 | No actual write is performed |
| 0 | 1 | Only data defined as image data will be written to memory, the graphics bits will not be disturbed |
| 1 | 0 | Only graphics bits with their R/W bits set will be written to memory, image datat and graphics bits with their R/W bits cleared will not be disturbed |
| 1 | 1 | Only graphics bits with their R/W bit set and image data will be written to memory, graphics bits with their R/W bits cleared will not be disturbed. |

Similarly, the 16 bits of the NIM control register 114 are assigned as follows:

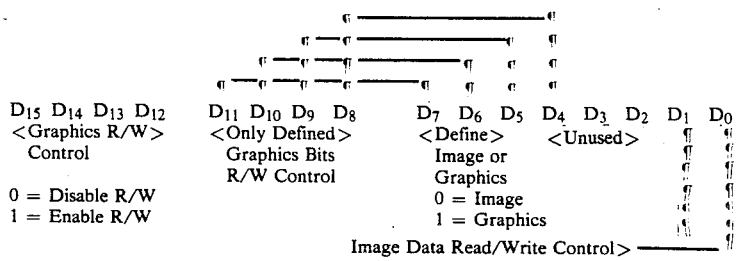

D15 D14 D13 D12  D11 D10 D9 D8   D7 D6 D5 D4  D3 D2 D1 D0
<Graphics R/W>   <Only Defined>  <Define>     <Unused>
Control          Graphics Bits   Image or
                 R/W Control     Graphics
0 = Disable R/W                  0 = Image
1 = Enable R/W                   1 = Graphics
                         Image Data Read/Write Control>

$D_{15}{:}D_{12}$ are graphics read/write control bits for the independent graphics planes. If any of the bits are set to a "1" then a read operation from the NIM will read back that graphics bit. Likewise a write operation will only affect those bit planes whose control bits are set to a "1". If any of the four control bits are "0" then a read operation will read back a zero "0" in that bit position. Similarly a write operation will not affect those bit planes.

$D_{11}{:}D_8$ are graphics read/write control bits only if the bit positions are defined as graphics bits by the nibble $D_7{:}D_4$. If any of the bits are defined as graphics bits, their read/write operation is similar to $D_{15}{:}D_{12}$.

$D_7{:}D_4$ define which bits in $D_{11}{:}D_8$ are graphics bits and which bits are associated with the image data word. $D_7$ defines bit $D_{11}$, similarly $D_6$ defines $D_{10}$ and so on. Any bits in $D_7{:}D_4$ which are set to a "1" will define that corresponding bit in $D_{11}{:}D_8$ as a graphics bit, likewise any bits set to a "0" will define it's corresponding bit as an image bit. It is important to note that bits which define the data as part of the image data word must be contiguous and start at $D_4$. For example an 8 bit image data word would not have any of the bits in $D_7{:}D_4$ set to a "0". This now leaves an extra four bits, $D_{11}{:}D_8$, as graphics bits making a total of 8 graphics bits, $D_{15}{:}D_8$, available with independent read/write control. A 10 bit image data word would have the bit pattern "1100" in $D_4{:}D_7$ which defines data bits $D_8$ and $D_9$ as image data bits with $D_{11}$ and $D_{10}$ defined as graphics bits and are available as graphics bit if needed.

| BIT PATTERNS | | | | IMAGE AND GRAPHICS DATA FORMAT | | | |
|---|---|---|---|---|---|---|---|
| $D_7$ | $D_6$ | $D_5$ | $D_4$ | # of Graphic Bits | | # of Image Bits | |
| 1 | 1 | 1 | 1 | 8, | $D_8{:}D_{15}$ | 8, | $D_0{:}D_7$ |
| 1 | 1 | 1 | 0 | 7, | $D_9{:}D_{15}$ | 9, | $D_0{:}D_8$ |
| 1 | 1 | 0 | 0 | 6, | $D_{10}{:}D_{15}$ | 10, | $D_0{:}D_9$ |
| 1 | 0 | 0 | 0 | 5, | $D_{11}{:}D_{15}$ | 11, | $D_0{:}D_{10}$ |
| 0 | 0 | 0 | 0 | 4, | $D_{12}{:}D_{15}$ | 12, | $D_0{:}D_{11}$ |

$D_3{:}D_1$ are not used.

$D_0$ controls the NIM's read/write operation on the variable length image data. If $D_0$ is set to a zero ("0") and a NIM read operation takes place the variable length image data word will be readback as all zeros ("0"). Likewise a NIM write operation will inhibit any variable length image data being written to the base memory 10. If $D_0$ is a "1" and a NIM read operation takes place the variable length data word is readback. Similarly a NIM write operation will write the variable length image data word into the base memory 10.

Summarizing the design of the base memory 10, it is a triple ported memory including network interface port 110 (19 address lines : 32 data lines); image processor interface port 118 (22 address lines : 16 data lines); and VME bus interface port 112 (24 or 32 address lines (selectable), 32 data lines). The base memory 10 can hold any number of different sized images up to a single $2048 \times 2048 \times 16$ bit image. The image data can be variable from 8 bits to 12 bits, with graphics data in the remaining 4 bits to 8 bits, and simultaneous memory requests are arbitrated in by the arbitrator 109 in 50 nanoseconds.

In operation of the NIM port 110, a single network request transfers 8 pixels to or from the base memory array 10' in 550 nanoseconds. Data transfer during a write operation is controlled by a masking register 110' shown in FIG. 2.2.1, under control of the control register 114, which allows individual graphics bits and/or imgae data to be written to memory.

In operation of the IP port 118 an image processor request reads 8 pixels from the base memory array 10' in 55 nanoseconds.

In operation of the VME bus interface port 112, a VME bus request transfers 1 or 2 pixels to or from the base memory array 10' in 250 nanoseconds. Data read or written to the base memory array 10' is controlled by a masking register 112', shown in FIG. 2.2.1, under the control of the control register 116, which allows individual graphics bits and/or image data to be accessed. During a read operation, 2's complement image data can be sign extended to 16 bits.

The $2048^2$ base memory occupies the upper 8 Megabytes of the MC 68000's i.e., the CPU 16's, address space, starting at 800000 hex to FFFFFE hex. An image pixel stored in the base memory is represented by a 16 bit word.

From the above description, it is seen that the base memory 10 is triple ported with completely separate data and address busses dedicated to each port. The data stored in the base memory 10 is organized with the graphics overlay bits in the upper bits and a variable length image word stored in the lower bits. The image word can be as small as a 8-bit pixel ($D_7{:}D_0$), or as large as a 12-bit pixel ($D_{11}{:}D_0$), or any size in between. With this organization the most significant nibble ($D_{15}{:}D_{12}$) contains four graphics overlay bit planes with independent read/write control. The next most significant nibble's bits ($D_{11}{:}D_8$) can be a combination of graphics data and/or image data.

VME bus data read/write operations can access the base memory 10 in either Word or Longword data formats.

IMAGE PROCESSOR

Next described in more detail is the structure and operation of the IP 12.

The IP 12 is positioned between the base memory 10 and the display memories 14. It is responsible for controlling the transfer of image data from the base memory 10 to the display memories 14. It is also responsible for executing image processing functions on the image data as it passes from the base memory 10 to the display memories 14.

A fundamental requirement for a PACS image display workstation is the multimodality display capability. A multimodality image receiving station must be able to display images of different physical sizes and dynamic ranges. To satisfy this requirement, the image processor 12 is designed to accommodate images of any size, from 4×4 pixels to 2048×2048 pixels. It can read any one of the images present in the base memory 10, and write it at any location on either of the output image displays. In the process of transferring the image, a left to right reversal (X flip) and/or top to bottom reversal (Y flip) ran be performed to compensate for improperly recorded images.

Image subtraction is required to visualize low contrast details that have been obscured by overlaying structures. An example is in angiography, where a pair of images is recorded at exactly the same location. One is recorded before a procedure begins and the second is recorded after a contrast media has been introduced. By subtracting the two images, the obscuring structures that are present in both images are eliminated. The IP 12 includes subtractor 110 to satisfy this requirement.

Contrast enhancement has been provided in many medical electronic display systems. The terms "window" and "level" are used in the medical community to describe this capability. The image viewing station of the invention includes the lookup table (LUT) 102 that is used for contrast modification. It can also be used to reverse the grey scale if desired.

Another aspect of the multimodality display requirement is the ability to simultaneously display images that have different dynamic ranges. The LUT 102 that performs the contrast modification is also used to normalize the dynamic range of all input images to 8 bits (256 grey levels).

Much of the wide dynamic range encountered in medical images is generated by large structures that are not of diagnostic interest. The spatial filter 104 shown in FIG. 3.5.2 has been included in the IP 12 to reduce the intensity of these structures. This will allow more of the diagnostically significant anatomy to be visible simultaneously on the CRT. This filter can also be used to reduce the noise present in some radiographs.

A problem with previous attempts at the electronic display of medical images has been the inability to match the spatial frequency of the image structures to that of the observer's eye. In a film-based system, this match is accomplished by moving either the film or the radiologist's eyes. In early electronic systems hardware, zooms were attempted. These systems could only provide integer zooms, i.e. factors of 2 or 3 etc. An increase in size by a factor of 2, the minimum step for these systems, was more than a radiologist desired. At this point, 75% of the image was not visible. The image viewing station of the invention allows zoom factors from a minification of 1/32 (zoom factor of 0.013) to a magnification of 2048 (one pixel mapped to the entire output screen) in steps of 0.031.

The image data input to the IP 12 consists of 12 data bits and 8 graphics bits. The method of assigning the 16 bits in the base memory 10 to these functions is described above. The image data output from the IP 12 consists of 8 data bits and 1 graphics overlay bit. The control processor (CPU) 16 controls the IP 12 by loading values into IP registers and tables, in particular the LUT 102. These registers and tables appear in the address space of the CPU. The IP is a pipelined architecture that performs the following sequence functions:

1. sequential address generation required to read the source image data from the base memory (FIG. 3.5.6);
2. image subtraction between two images that reside in the base memory;
3. contrast enhancement manipulations on the image data;
4. spatial filtering on the image data;
5. continuous zoom (COZO) to magnify and minify the displayed image (FIG. 3.5.4);
6. sequential address generation required to write the processed image data to either display memory;
7. histogram operation on selected regions of the image identified by the Region of Interest (ROI) overlay bit.

Functions 1 through 6 are concerned with manipulation of the grey scale image data. The last function is to compute the image statistics that are used by the CPU when executing various image processing algorithms. Each of the seven processing functions will be described in detail below following a discussion of their sequencing.

The sequence of processing operations performed by the IP on the grey scale image data is critical for successful operation. The reasons for this sequence are:
1. The subtraction operation must come first. For the subtraction to be successful, it requires the full dynamic range of the source images.
2. The contrast manipulation operation must precede the filtering operation. First of all, the contrast mapping needs to operate on the full dynamic range of the input data to visualize subtle contrast variations. Secondly, the filtering operation can reduce the number of grey levels in the output image. This can cause contouring to be visible in the image when the contrast manipulation is performed after the filtering operation.
3. The filtering operation must be performed before the zoom operation. The zoom changes the spatial frequency (in cycles/pixel) of the displayed image. If the filter operation were performed after the zoom, the effect of the filtering operation would change as a function of the image magnification or minification.

As shown schematically in FIG. 1.1, the IP 12 includes base memory address generator 122, the details of which are shown in FIGS. 3.1 add 3.5.6. It is responsible for generating the address and control information required to read the desired image data in the desired order from the base memory 10. The central component of the address generator 122 is the pixel address counter 124. The pixel address counter 124 contains the address in the base memory of where the next pixel to be processed is located. It must be 22 bits wide so that it can address the 4 million pixels present in a 2048×2048 image. As part of the IP initialization sequence, the CPU 16 loads the address counter 124 with the locations determined by offsets generated in the X Delta and Y Delta registers 126 and 128, respectively.

The X and Y Delta registers 126 and 128 are initialized to zero as part of the IP initialization sequence. The X Delta register 126 is incremented by one for each pixel transferred in a normal left to right display. If a left to right image reversal (X flip) is requested, the counter is decremented by one for each pixel transferred. Depending upon the roam and zoom requested, the last pixel required by the IP will come from a position along the line, in general not the last pixel of the line. The Y Delta register 128 contains the offset needed to position the pixel address counter 124 to the beginning of the next line to be transferred. If a top to bottom reversal (Y flip) is requested, this offset will be negative.

As mentioned above, the CPU 16 loads the pixel address counter 124 with the first pixel to be transferred. In a normal display, this will be the pixel that appears in the upper left corner of the displayed image and the X delta register 146 will count forward to the last pixel on the line. In a display with an X flip, the first pixel addressed will be the last pixel on the line and the X delta register 126 will count backwards towards the first pixel. In a display with the Y flip, the first pixel addressed will be the first pixel on the last line. In a display with both the X and Y flip enabled, the first pixel addressed will be the last pixel on the last line.

As shown in FIG. 1.1 and also in FIG. 3.5.1, image data from the base memory 10 is operatively coupled to the subtractor 100 of the IP 12. The primary purpose of this, shown in more detail in FIG. 3.2, is to form the difference between image pairs as is commonly done in intravenous angiography. The method of generating the addresses of the conjugate points in the two subtracted images has been presented above. Image data points are read in pairs from the base memory 10 and N−1 hold register 129. The input pair is then input to an arithmetic and logical unit (ALU) 130 for processing. The output of the ALU 130 is the input to the contrast enhancement LUT 102. One input to the ALU 130 can also come from a constant register 132. This allows logical or arithmetic operations to be performed between the input image data and a constant (e.g. add a constant to an image).

The output of subtractor 100 is applied to lookup table (LUT) 102 used to perform contrast enhancement functions. This table transforms pixels with up to 12 bits of dynamic range (e.g. 4096 grey levels) to an 8 bit output pixel, compatible with the rest of the IP stages. This LUT is actually used to perform three functions. The first is contrast enhancement. The CPU 16 computes a set of values that will perform the desired contrast modification and loads them into the LUT 102. If the user has selected grey scale reversal, the values loaded into the LUT 102 are computed to produce that effect. The LUT 102 is also used to transform the dynamic range of the input image to the 8 bit quantity used by the IP 12. In this way any dynamic range from 1 bit to 12 bits can be accommodated. The third function that can be performed in the LUT 102 is the conversion of unsigned binary data to 2's complement data. All of the data types referenced above are allowed by the NEMA (National Equipment Manufacturers Association) standard.

The output of the LUT 102 is applied to the spatial filter 104 shown in FIG. 3.5.2, which consists of a 32 delay finite impulse response (FIR) filter. It can be used to perform any filter function that can be accommodated in 32 delays. The most common use for this type of filter is to provide high and low pass filtering of the image data. A symmetric FIR filter is desirable for this application because it produces linear phase response which will not produre any ringing in the image. The output of the FIR filter is buffered in two memories, each of which can hold one line of filtered image data. These buffers contain two lines of data that become the input to the continuous zoom processor 106.

The continuous zoom processor 106 is designed to provide an accurate reproduction of the input image at all magnifications. Bilinear interpolation is used to compute the output pixel values. This is done to avoid the "blocking" that is apparent when pixel replication is used. The equations for the bilinear interpolation are shown in FIG. 3.3. The output grey level G is the weighted sum of grey levels present at the pixels four nearest neighbors A, B, C and D. The pipelined COZO processor 106 that solves the interpolation equation is shown in FIG. 3.4.

In FIG. 3.4, pixel data A and B are supplied from the line buffer (not shown) within the IP 12, and pixel data C and D are supplied directly from the filter circuit 104 into subtractors 202. The results of the subtractors 202 are multiplied by COZO coefficients X, and Y which are generated from an associated COZO coeffcient generator (123) in multipliers 204. Then, the outputs of the multipliers 204 are added to one another in adders 206, according to the above formulas, to generate the estimated pixel G to the display memory 14. Double COZO 106, i.e., a pair of zoom processors 106, may be provided to accomplish zoom pipeline processing in parallel on multiple picture data thereby to reduce the user's wait time for viewing of desired images, or for another purpose of performing the same COZO process on overlay graphic images stored in the associated graphic overlay plane of the base memory 10.

Magnification is performed by COZO 106 by computing more than one output pixel for each input pixel. The level of magnification is determined by the size of the X and Y multiplier coefficients. The initial values of these coefficients are loaded into the IP 12 by the CPU 16. Also the deltas that increment the X and Y coefficients on successive pixels are computed by the CPU and loaded. As each output pixel is generated, a new X and Y coefficient is computed by adding the appropriate deltas. The point where the output pixel has advanced beyond the current 4 pixel neighborhood is signaled when one or the other of the coefficient magnitudes exceeds one.

The grey level values present at the current pixel's four nearest neighbors are held in registers labeled 106.3, 106.4, 106.5, and 106.6 shown in FIG. 3.5.7. These values remain constant as long as the current pixel position remains within that current four pixel neighborhood. For a zoom of 4, four output pixels would be generated from within each 4 pixel neighborhood. Once the output pixel position advances along the line (as signaled by coefficient overflow described above) and is no longer between the current four values, new values are loaded. The current value in the B register is transferred to the A register and the current value of the D register is transferred to the C register. New data values are loaded from the input buffer memories into the B and D registers. This process continues until the entire output image has been generated.

Minification is also performed using the COZO 106. Minification is very important in this application for two reasons. First, it allows the radiologist to have many images, some in reduced format, displayed on the screens at the same time. Second, it permits the display of images that contain more pixels than are available on the output display. The full resolution of the original image can still be visualized by using the magnification zoom capability. The minification allows the radiologist to view the entire image at reduced resolution.

Minification is performed by first computing an appropriate magnification factor that falls between one and two. Then an integer divide (performed by discarding pixels) is used to achieve the desired minification. As an example, consider an image where the desired minification is 0.75. This minification is accomplished by first computing coefficients that will yield a magnification of 1.5. Then every other pixel is thrown away 106.1, performing a divide by 2, and yielding the desire minification of 0.75. A similar operation is performed on the lines 106.2 to achieve minification in the vertical direction.

The IP 12 further includes the output pixel address generator 134 for generating address data applied to the display memories 14 via the memory controller 138, as schematically shown in FIG. 1.1 and FIG. 3.5.5. The output pixel address generator 134 consists of a pixel counter and a line offset register (not shown). The address that represents the position of the upper left pixel of the output display is loaded into the pixel counter register. Pixels are then stored sequentially (four at a time) until the current line is completed. The offset register is then added to the pixel counter to address the first pixel on the next line. This cycle is repeated until the entire output image has been written.

Further, as shown in FIG. 3.5.3, the IP 12 includes the histogram processor (HP) 108 designed to compute the histogram of grey levels of an image as it passes through the IP 12. The HP 108 is positioned in the pipeline after the subtracter 100 and before the contrast mapping LUT 102. This position yields a histogram of the input image data unaffected by the image enhancement processing which follows in the IP. The histogram of any region (or regions) in the image can be computed. One of the graphics overlay bits in the base memory 10 is used to enable and disable the HP 108.

The HP 108 consists of a high speed memory and an add by one counter (not shown). The first requirement in using the HP 108 is to set all values of the histogram memory to zero. The CPU performs this operation by writing zeros into all of the memory locations. Next, the image data is cycled through the IP. The grey level value of each pixel forms the address of the corresponding bin in the high speed memory. The value at that address is read, incremented by one, and written back at the same location. This process continues for each pixel in the image that has been enabled by the graphics overlay bit.

DISPLAY MEMORY

Next described is the function and operation of the display memories 14. The display memories' main purpose is to provide the digital video information to the video display monitors surh that a continuous flicker free image is being displayed at all times on the video monitors. The displayed image is comprised of 1024 pixels by 1536 lines by 9 bits. 8 bits are used for the gray scale image presentation and the ninth bit is use as an associated graphics overlay bit. This memory array matches the 'page format' or 'portrait format' used by the display monitors. Such a display format was chosen since its aspect ratio matches 80% of the images currently generated in a radiology department which are 14" by 17" chest images on film.

The display memory 14 is also triple ported to provide fast access to the display memory buffers $14_1$ and, $14_2$. As shown in FIG. 4.1, one port 142 is dedicated to the image processor 12 which allows processed image data to be quickly transferred to the display memory buffer. A second port 144 is dedicated to the video display monitors 18. It provides the screen refresh necessary for a continuous image to be displayed on video monitors 18. See FIG. 4.1.2. The third port 146 is connected to VME Bus which allows random read/write access of the display memory buffers.

The image processor port 142 allows the image processor 12 random access to the either or both display memory buffers $14_1$ and $14_2$. This feature allows many different sized images to be placed into the display buffers, and allows an image to be moved and its size changed during the zooming and minification of that image.

The video display monitor port 144 is a high speed port used to provide a continuous stream of data for the display monitors 18 via the display controller 138. The entire contents of a display memory buffer is read out during one video frame time and displayed on a video display monitor 18 except during the movie loop program.

Each display memory board includes two $1024 \times 1536 \times 9$ bit image buffers $14_1$ and $14_2$. This dual buffer architecture allows one memory buffer to be currently refreshing the display monitor while the other memory buffer is being updated by the image processor 12 or by the VME bus 28. After the update is completed, the video display monitor 18 is switched to the updated display buffer, again via the display controller 138, allowing the user to view the completed image. This architecture provides the ability for the entire contents of one buffer to be copied into the second buffer in one video frame time. Such a feature is useful when the image processor is moving small images overlaid on top of a larger field of images.

Each display memory 14 can hold a series of images that can comprise a movie loop of up to forty-eight $256 \times 256 \times 9$ images per display memory. The viewing station of the invention has two display memories and is capable of displaying a movie loop up to ninety-six frames (see FIG. 4.1.1). In the movie loop mode the $256 \times 256$ images are zoomed in the display memory hardware 148 shown in FIG. 4.1.2 by a factor of four to provide an image area on the display monitor equivalent to a $1024 \times 1024$ image viewed at full resolution. An image pointer register is accessed by the CPU 16 via the VME bus 28 to select which $256 \times 256$ image is to be displayed. Thus the movie loop's sequence of frames and its length are totally controlled by the software. The video sync generator 150 of the display memory refreshes the video display monitor at a rate of 40 frames per second. At the end of each video frame the hardware generates an interrupt which in turn synchronizes the movie loop software with the display memory hardware. This now allows movie loops to be displayed forwards and backwards at variable frame rates from still frames to 40 frames per second. The variable frame rate is given by:

$$\text{Frame Rate} = \frac{40 \text{ Frame per Second}}{N}$$

where N is an integer and $N \geq 1$. To help in referencing how the window and level settings are mapping the active displayed image, a gray scale wedge is constantly displayed on the right hand side of the active image area on the video display monitors. Four unique markers 152 are individually enabled and placed on the gray scale by the software. As the window and level settings are changed the software can reposition the markers to reflect the new window and level settings.

DISK DRIVE

To ensure fast storage and retrieval of many large images to be used locally on the image reviewing station, a high speed disk drive 30 is integrated into the system. The disk drive 30 is a Fujitsu model M2333K unit with a storage capability of 337 Megabytes and a serial data transfer rate of 24 Megabits per second. To take advantage of this disk drive's speed and improve the Review Console's image transfer time a hard disk controller 32 in FIG. 5.1, is provided designed to interface the disk drive to the system.

The disk used to store images in the review console is a Fujitsu M2333, with the specifications:

| Storage capacity | 337.1 Mybtes unformatted |
|---|---|
| Transfer Rate | 2.458 Mbytes/sec |
| | (19.664 Mbits/sec) |
| Cylinders | 823 |
| Tracks per cylinder | 10 |
| Track capacity | 40960 bytes unformatted |
| Cylinder capacity | 409,600 bytes unformatted |
| Rotational speed | 16.66 ms/turn |
| Positioning time, track to track | 5 ms |

In order to make maximum use of disk space and shorten the length of time to transfer an image, several unique things were implemented in this controller:
1. Each track is formatted as a single sector of 40880 bytes to avoid losing time and capacity to multiple sector overhead.
2. An automatic track switch occurs once a revolution of the disk at the index pulse, avoiding processor software involved in telling the controller to do this. This enables continuous image transfer across track boundaries.
3. An automatic seek to the next cylinder occurs after the last track on a cylinder is transferred. Again, this avoids processor overhead for a seek to the next cylinder.
4. In order to cope with the rapid housekeeping involved in doing things 1,2,3 above, sequential logic is used for the control of these functions rather than the usual approaches of using a processor or a slow state machine.
5. Data is transferred to and from the VME bus via a short FIFO (16 words deep) rather than transferring to and from an on-board sector memory to avoid the transfer latency and complexity involved in such a scheme.
6. No attempt is made at error correction, since that would take additional time and require an on-board processor and sector memory. (Error correction is not as important in a large image as it is for numerical or program data.) However, a cyclic redundancy check (CRC) 190 is done on each track transferred to assure the integrity of the disk surfaces.

As a result of the disk formatting, the following specifications apply to the disk:

| Track capacity | 40880 bytes |
|---|---|
| | 20440 16-bit words (pixels) |
| Cylinder capacity | 408,800 bytes |
| | 204,400 words (pixels) |
| Disk capacity | 336.442 Mbytes |
| | 168.221 Mwords (Mpixels) |
| | 160 images $1024^2$ |
| $1024^2$ image: | 52 tracks |
| occupancy | |
| transfer time | $57 \times 16.66$ ms = .950 s |
| | (5 turns lost to cylinder seeks) |

Looking at the block diagram, the disk drive (30) itself is linked to the controller by a modified SMD interface including:
Serial data and clocks (19.60 mhz)
Status bus
Index pulse
Tag bus
Tag word control.
To initiate a data transfer, the system CPU loads:
1. Cylinder counter 162 with the start cylinder (this initiates a seek to that cylinder automatically),
2. Head counter 160 with the start track,
3. DMA address counter 172 with the address of the image/data memory on the VME bus,
4. Transfer word counter 168 with the number of words to be transferred,
5. Control word register 164 with the operation to be done: read or write; this initiates the whole transfer operation.

When the timing control 174 sees that the disk is on the proper cylinder, it proceeds to transfer tracks of data until the transfer word counter 168 decrements to zero, signalling the timing control 174 and the DMA control 170 to cease transfers and providing an interrupt back to the system CPU to tell it the transfer is completed. If no DMA transfer is done for 82 msec before the transfer is completed, the timeout counter 176 also tells everyone that the transfer is done and sets a bit in the status word 166.

The DMA controller 170 is a state machine that controls transfers from the FIFO 180 through the parallel/-serial shift register 182 to the VME bus 28. It is capable of doing 16 or 32 bit transfers; however, most memories on the VME 28 bus are not fast enough to keep up with the speed of the M2333K disk 30 when doing 16 bit transfers, so this is usually a 32 bit transfer. The DMA controller 170 handles the VME bus arbitration, acquisition and control, increments the DMA address counter 172, and decrements the transfer word counter (168).

Each track transfer is controlled by the track timing control 174. The sequence is:
1. receive index pulse from disk 30,
2. issue head count tag 160 to disk 30,
3. issue control word 164 to disk 30 (read or write),
4. wait for sync word 183 (read or output sync word 183 (write) to disk 30,
5. transfer 20440 words (16 bit) via shift register 182,
6. check CRC word 166 (read), or output CRC word 166 (write) to disk 30,
7. tell head counter 160 to increment,
8. if necessary, tell cylinder counter 162 to increment and the disk 30 to do a seek to next cylinder,
9. wait for next index pulse from disk 30.

The Cyclic Redundancy Check 166 implements the CRC-16 algorithm in discrete logic (for sufficient speed). CRC-16 uses the polynomial $X16+X15+X2+1$. If an error is detected on any track in the transfer, a bit is set in the status word (166) for the system CPU to read.

For further information on the disk/disk controller, see *M2332K/M2333K Disk Drives Engineering Specifications,* Fujitsu Limited, 1984. #B03P-4760-0101A, and Kong, Vivian "Implementation of Serial/Parallel CRC Using PAL Devices," *Systems Design Handbook,* 1st Ed. Monolithic Memories Inc. 1983, pg. 2–57.

Several speed improving measures were incorporated into the disk controller. Instead of having several sectors per track as typically seen implemented, a sector is now equal to a track. The disk controller provides automatic head switching and cylinder seeking until the entire file that was requested is transferred. The CPU only has to tell the disk controller the starting location, set in DMA address counter 172, of the image file and how many bytes it is, set in transfer word counter 168, and start the disk controller 32. The DMA controller 170 will then request to be master of the VME 28 DMA controller 170. Once receives the bus grant and becomes the bus master the disk controller 32 will transfer the image data to the base memory 10. When the disk controller 32 has transferred the entire block of image data it releases the VME bus 28 and interrupts the CPU 16 to inform the software that the data has been transferred.

By way of reiteration, further explanation of the disk it is noted that the disk 30 has ten heads. As shown in FIG. 5.1, head counter 160 controls which of the ten heads is actively reading or writing the disk 30. The cylinder counter 162 controls which of the 823 cylinders are being accessed by the selected head. The control word register 164 specifies what action the disk will perform, such as Write, Read, RTZ (return to zero), Interrupt Enable, 16 or 32 bit wide data transfer, etc. Status word register 166 tells the CPU the status of the I/O operation, such as DONE, or ERROR FLAG. The transfer word counter 168 (16 bits) is loaded with the number of words to be transferred, and DMA controller 170 and DMA counter 172 enable the disk controller to transfer data directly from the disk into the base memory 10.

INPUT EQUIPMENT

The CPU input equipment 34, otherwise known as the desk subsystem, provides an intelligent I/O subsystem to the digital viewing station. Its function is to collect input from the various sources attached to it and send the data on to the workstation over a single serial channel. The input sources available to the desk, as it has been reduced to practice, are: six shaft encoders, one trackball, three touch screens and an ASCII keyboard (FIG. 6.1). There is no architectural limitation on these input sources. The touch screens are chained through a single RS-232 channel into the system. The shaft encoders and trackball share a parallel input channel. The trackball is essentially two shaft encoders manipulated by the ball, with one encoder affected by motion along the x-axis and the other affected by motion along the y-axis.

The controlling software which executes on the desk resides in ROM and is almost entirely interrupt driven. The shaft encoders generate 512 interrupts per revolution. The software simply counts interrupts and returns the count when queried by the host system. The counter is then reset to zero. The touch screens generated an interrupt when activated and pass an ASCII string to the desk. This string is collected into a buffer, with an offset added if necessary, and passed along the host system. The keyboard generates an interrupt for each character. Keyboard input is passed to the host system immediately, with no preprocessing. While no interrupts are active, the software idles by checking to see if any touch screen strings have accumulated in the buffer, and waiting for a query from the host system.

Keyboard input is passed directly to the host system as it is received. Touch screen input consists of strings of characters which are accumulated in a buffer by the interrupt service routine. When the software is idle it checks for the presence of data in the buffer and sends it to the host. The input from the encoders and trackball accumulates into counters, one of each distinct input. These inputs are not passed onto the host until it specifically queries the desk by sending a ˆT (control T) character. To ensure that none of the counters is overlooked, the software scans them in a circular fashion starting from the counter following the previously read counter. Each counter has a flag associated with it which indicates whether the encoder has been adjusted. If a counter is empty, i.e. the encoder has not been turned, it is stepped over and the next counter checked. The first counter in sequence which has been changed will be sent to the host. At the receipt of the next query the scan will start with the succeeding counter. If all the counters are scanned and none are found to have changed, the query is remembered. Then, if an encoder is changed, the count will be sent to the host immediately.

Besides the query command (ˆT) the desk software responds to two other commands from the host system. The enable command (ˆB) will reinitialize the software and reset the encoder and trackball deltas. It is generally sent by the host only at startup time. The disable command (ˆV) disables the encoders and trackball, but does not affect the touch screens. The encoders and trackball are re-enabled by ˆT or ˆB. The output language generated by the desk is defined by the following production rules:

<desk output>→<vector>CR | <kbd>
<vector>→ ˆA<enc | tkb> | ˆE<comts> |
  ˆF<imgts> | ˆG>imgts>
<enc>→<a|b|c|d|e|f><num5>

<tkb>→g<num5>,<num5>
<comts>→<num3>,<num3>
<imgts>→<X><Y>
<num3>→[−]<ddd>
<num5>→[−]<ddddd>
<d>→<0|1|2|3|4|5|6|7|8|9>
<X>→x (where x is an integer in range of 32 to 142)
<Y>→y (where y is an integer in range of 32 to 122)
<kbd>→c (where c is an ascii character)

Note: [ ]=>enclosed item is operation. < > enclosed non-terminal symbols. Bold symbols (e.g. ˆF) are terminal symbols. ˆA, ˆF, ˆE, ˆG and CR are symbols, not pairs of characters

SOFTWARE SYSTEM

The functional capabilities of the radiologic image viewing station, and the means to utilize them, are presented to the physician by the User Interface. This interface is implemented by software executing on the host cpu system, aided by independent software executing on the desk subsystem's processor. On the host cpu the software system controls the physical resources to establish a feedback loop with the user (FIG. 7.1). The software displays command menus and text, as well as the digital radiographic images. The user manipulates the menus and images directly, by way of the touch screens, and indirectly through the encoders, trackball and keyboard. On the desk subsystem 34 the software implements an intelligent I/O processor which multiplexes the various input sources into a single serial stream for processing by the interface software on the host cpu. The system displays its command interface and images, receiving feedback from the user through the desk subsystem 34. The user activates commands and manipulates images, again through the desk subsystem 34, and receives feedback from the system through the command and image displays.

Image Control Model

The implementation of the user interface is based upon a logical model of the task of viewing pictures. In this model the control of images mimicks a desk top (display) upon which pictures (images) may be placed, possibly overlapping. We may visualize a physician sitting at this desk viewing the images (FIG. 7.2). He will want to place other images onto the desk, or remove images from the desk. Additionally, he may want to move an image about on the desk, or flip the image vertically or horizontally. Since an image may be overlapped or totally covered by other images the physician will sometimes need to select a covered image and bring it to the top for viewing. The user interface adheres to this model by providing touch screen inputs to allow the manipulation of image directly on the display screen, much like the physical handling of pictures on the desk. The command menus provide the capability to move images into and out of the display, modeling the physicians ability to move pictures to and from the desk. If we expand the original model to include a drawer in which to store pictures which are not on the desk, the physician should be able to easily get a picture from the drawer and place it on the desk. The picture drawer is implemented in the interface as a pool of available named images. A list of the image names allows quick selection of images for display. Logically this pool may be of nearly unlimited size. Extending the model one step further, the physicians picture drawer would be supplied from some source outside his office (e.g. X-ray room). The user interface similarly provides for the addition of images to the pool of named images from the external archive over the communications network. This model, however, abstracts only the aspects of image control corresponding to the physical handling of pictures by this imaginary physician. It may be extended by abstracting the pictures themselves to model the aspects of image control which concern processing, or mathematical handling, of the images. This abstraction has no physical counterpart in the desk top model, but rather details analytical tools provided by the workstation to aid the physician in attaining an accurate diagnosis from the image.

Abstraction of Images

The model above is supplemented by considering the pictures used by the physician to be named, dynamic objects. The objects themselves consist of the image data as well as associated data such as patient demographics and parameters involved in the acquisition of the data. These picture objects make up the pool of pictures distributed between the drawer and the desk top in the above model, and may have three global states. Objects in the Inactive state are those pictures in the drawer which have not been selected for viewing. The pictures which are on the desk top, but which are not currently the focus of the physicians attention, are Ready. The single picture upon which the physician is concentrating, and which he may manipulate, is in the Active state. Objects which are on the desk top, that is Ready or Active, maintain a state vector which controls specifics of the object's state. This state vector changes dynamically as the object is manipulated but is not affected by transitions between Ready and Active states. This allows the physician to shift his attention between picture objects and when he returns to a picture he previously looked at its state remains the same as he left it. The object's state vector is created when it moves from Inactive to Active, corresponding to the physicians removal of the picture from the drawer and placing it on the desk. By considering the pictures to by dynamic objects we can add power to the original model by supposing that the dynamic portions of the state vector may be initialized by any allowable value. So if the imaginary physician wants to see all pictures of a specific type (say, chest images) with the contrast reversed and placed at a specific location on the desk, he initializes the objects state vector with the appropriate values in the process of moving it from the drawer to the desk. Of course, in the implementation of this model by the user interface software the picture objects are a combination of the image and demographic data and controlling data structures. The state vector is initialized from a set of default values established for each user and used to program the image processor so the image appears on the monitor as desired. Manipulation of the Active image changes the state vector while Ready images' state vectors remain essentially static (FIG. 7.3).

The following is a discussion of primary data structures.

Disk structure and directory control track (DCT)

The disk system is viewed by the software as a linear sequence of tracks. For the system as reduced to practice these tracks are 40880 bytes in length and there are 8230 of them. The software imposes a structure on this sequence of tracks to allow for the efficient use of the disk for image storage. The structure also partitions the disk into regions used for system operations and for image data (FIG. 7.4). The disk space occupied by data structures is relatively small, leaving about 8000 tracks available for image storage. The primary data structure on the disk is the Directory Control Track (DCT) (FIG. 7.5). The DCT resides on the first track of the disk, with a backup copy on the last track. It is the key structure and maintains pointers to the location of all other data structures on the disk as well as the location of image data. It also contains the allocation bit map. When the system is powered up, the initialization code reads the directory control track into memory where it resides during system operation. Keeping the DCT memory resident provides more efficient access of data on the disk since nearly all disk accesses require looking up information on the DCT. Any activity, other than swapping, which modifies data on the disk will also cause the DCT to be updated on disk as well.

Within the DCT are two bit maps. These maps each consist of one bit for each track on the disk. The Allocation Bit map keeps track of which tracks are currently allocated and which are free to be used. The Bad Track Bitmap maintains a map of those tracks which consistently generate errors when accessed and which cannot be relied upon for data storage. When space is sought for new image data, the allocation bitmap is searched for free tracks and the corresponding bits checked in the bad track bitmap before the tracks are used. When a new image is to be stored on the disk the space is sought from the pool of free tracks. The software attempts to allocate the space sequentially from lower to higher numbered tracks. It will allow the image to be partitioned into as many as eleven segments in the current implementation. The Image Location List (ILL), another structure within the DCT, is used to image the tracks allocated to image data (FIG. 7.6).

In the ILL one entry is maintained for each image on disk. Each entry in the ILL is an Image Location Vector consisting of eleven ordered pairs specifying the starting track and extent of each segment of the image. Within the vector the pairs are ordered from lowest to highest according to the track number. The ILL is referenced when an image is read from disk. Image space may be allocated in less than eleven segments and may even consist of one contiguous segment. These vectors allow use of fragmented disk space without the need to compress the disk.

Menu Control

The following is a discussion of menu control.

The primary form of command input for the user interface is through touch screen activated command menus. The menus are drawn graphically on the command monitor as labeled rectangular boxes with smaller rectangular keys within. Each key in the menu is labeled with the command name, usually chosen to convey the function of the command (e.g. DIR for directory). Menus are managed through the use of several data structures. Each menu has a Menu Descriptor which lists information necessary for the management of the menu. This descriptor details information about the menu as a whole, such as the location of the lower left corner and the extent of the menu. This information is used to place the menu on the screen and to determine whether a touch on the command screen falls within the menu. The menu descriptor also has a pointer to a set of Key Descriptors, with one descriptor for each key in the menu (FIG. 7.7). These descriptors are similar to menu descriptors except their information describes a single key within the menu. Each key descriptor has a pointer to the procedure which implements the function of the key. The menu descriptors are defined during the development of the software and exist in an array. Menus may appear or disappear from the command screen dynamically in response to user actions. To keep track of which menus are active on the command screen a list of pointers, called the Active Menu List, is maintained (FIG. 7.8). This list is ordered by menu activation so that the most recently activated menu is at the top of the list. This allow overlap of menus without confusion. If two menus overlap and a touch hit occurs in the region of overlap, the top menu will be searched first and the appropriate procedure invoked if the hit was within a key. The hidden keys of the overlapped menu cannot be accessed without removing the covering menu.

Image Parameter Blocks (IPB)

To implement images as dynamic objects which can be manipulated by the system user, a variety of data structures are required. These structures maintain information about the image, its associated demographic information, where the image resides on disk and the state of the image. Images which are Inactive reside solely on disk, along with their associated information. When an image makes a transition from Inactive to the Active state its associated information, and information from the user's default file, are loaded into an Image Parameter Block (IPB) (FIG. 7.9). This structure maintains the state vector for the image and remains associated with the image as long as it is Ready or Active. Image parameter blocks exist in an array of free IPBs from which one is assigned when an image becomes active. The state vector maintained within the IPB is used to configure the image processor to display the image. Most user commands which affect the image (e.g. window/level adjustment) modify the state vector and cycle the image processor to redisplay the image in its new state. The initialization of the image parameter block requires information from two primary sources. One of the sources is a set of three image data lists while the second is the adaptive interface file.

Image Data Lists and Adaptive Interface File

The image data lists maintain information about the image which is divided into three classes: patient information (Patient Data List), study information (Image Control List) and physician information (Radiologist-Physical List) (FIG. 7.10). These data lists each require two tracks in the disk 30, one for a primary copy and one for a backup. The DCT maintains pointers to the location of the lists on disk. There is one entry in the list for each image on the disk. When an image transitions from inactive to active, these three lists ar read and the entries for the image are copied into the image parameter block IPB. The information may simply be necessary reference data (e.g. age, sex) or may require to process the image (e.g. # pixels, lines). The image data lists reside on disk and are read into memory when required. The lists are updated on disk when the available pool of images on disk changes.

The Adaptive Interface File provides other information for the initialization of an image parameter block. This file has entries for each user who has access to the system (FIG. 7.11). The users entry contains default parameter values which allow the user interface to be tailored somwewhat for each user (FIG. 7.12). The file resides on disk and is modified only by privileged system users. Only users with an entry in this file can log onto the system and access patient information. The file contains default values for each type of image the user may wish to view on the system. These parameters are used in determine the initial state vector for images as they are placed on the display for the first time. This tailoring prevents the user from having to adjust the system to his liking each time a new image is brought up on the display.

System Primitives and Device Support

First considering disk service, two I/O primitives are required to support the movement of image and associated data to and from the disk. These services are READ and WRITE. The current implementation supports synchronous I/O on disk operations. The capability for asynchronous I/O exists, however, the largest transfer of data are those involving images and since processing requires the entire image there is no desire to cycle the image processor while the I/O is in progress.

The length of disk read and write operations is specified in words of 16 bits and may extend from less than a track to the entire disk. The completion of the operation generates an interrupt which is handled by an interrupt service routine.

Graphics Control

Regarding graphics control, a set of primitive functions exists to support the use of the color graphics interface used for the command monitor. The functions support line and block drawing as well as screen positioning. As reduced to practice the primitives also provide the emulation of a normal video terminal in the lower half of the command display. The upper half is used to display command menus and some status information.

Display Memory Management

The display memory hardware provides two display channels, each of which has two independent buffers. A display output control procedure manages the use of these display channels to provide hidden update. Generally one buffer is displayed while the second receives update data from the image processor. After updating, the display may be instantly switched to the newly filled buffer. In each channel the buffers may be copied from one to the other in one frame time. The display management procedure uses this feature to maintain up-to-date image data in both buffers.

Regarding network communications, network communications for the system provide the capability of the user to query the Archive and request images to be set to the system for viewing. The software responsible for this interaction manages the exchange of control messages and image data. The NIM hardware provides a high speed port to the Base Memory and image data is placed directly into the base memory. Once the image has been received it may be written to disk.

COMMAND PROCESSING

The following is a description of command processing employed according to the invention, including command vectoring, control function processing, command dispatch, image activation and movement and image shuffling.

Command vectoring

Since all input to the user interface arrives through a single channel from the desk subsystem 34, it is logical to extend this centralization in software also. A single procedure, "getdesk", is used by all other procedures to get input of any form. To distinguish the various types of input which are available the procedure generates Command Vectors and returns these to the procedure requesting input. A command vector is an ordered pair in which the first element specifies the vector type while the second element is a pointer, generally to a string. The vector type identifies the source of the input (e.g keyboard, trackball, etc). Usually, the string pointed to by the second element will consist of the input received from the desk (FIG. 7.13). The use of command vectors provides centralized error checking and a means for gracefully cancelling commands which prompt for input. A procedure which invokes "getdesk" will receive a command vector when input has been received. It can simply check to vector type against the type it is expecting and cancel its operation if the type is incorrect. For example, if the user invokes a procedure which asks for several lines of keyboard input and he changes his mind halfway through its sequence of prompts, then he may simply touch the menu key for the operation he now wishes to perform. The software can see from the vector type that he has entered input other than it requires and can terminate its operation. The vector which was input may then be pushed back onto a command stack maintained by "getdesk" and will be the next command retrieved when input is again requested. One special type of vector exits in which the pointer element does not point to the input received from the desk. This special type is a Direct Command vector. Direct commands allow the user to invoke a menu key procedure by typing the key label as it appears on the menu key, but preceded with a slash (/). In this case the pointer element points to an (x, y) coordinate pair which would be within the menu key for the corresponding command. This feature allows the use of the system even if the command monitor touch screen fails (FIG. 7.14).

Control function processing

Vector types corresponding to the shaft encoder and trackball inputs are classified as control function inputs and handled by as central control procedure. For control functions the input is a delta which indicates the amount by which the position of the encoder or trackball was changed (for the trackball there are two deltas (dx, dy)). The deltas are received as strings of ASCII digits which are converted to their numeric equivalent. The vector type may then be used to send the delta to the appropriate procedure for processing. Control functions are used primarily to modify the state of the currently active image. In this case the input is used to adjust some parameter in the state vector for the image and then the processor is cycled to redisplay the image in its new state. Of the six shaft encoders, four have permanently defined uses (window, level, filter and zoom) while the other two (f1 and f2) are interpreted differently by various procedures. For instance, when a sequence of 256×256 images is viewed as a movie loop these two functions control the speed and duration of the movie. When image shuffling is in effect, they each suffle images on the display, with f1 controlling display 1 and f2 controlling display 2. The use of six functions is arbitrary and not dictated by the architecture of the system, whether hardware or software. The trackball is also used for a variety of purposes, such as selecting images from the directory and panning images. Its use depends on the procedure for which it is providing input.

Command dispatch

The invocation of command procedures utilizes command vectors of two types; command monitor touch screen and direct command vectors. The former are most frequently used. Touch screen hits on the command monitor generate a coordinate pair. The active menu list is scanned top down until the first menu is found which encompasses the coordinates. The key descriptors of that menu are then searched until a key is found which contains the coordinates. The key descriptor contains a pointer to the function to be invoked (FIG. 7.15). If the point does not fall within any menu, or if the point does not fall within a key in a menu, then the touch hit is ignored. Direct commands are invoked similarily, the difference being that the search is conducted by comparing key labels against the input string rather than checking coordinates.

Image activation and movement

The transition of images from the inactive state to active is accomplished through menu commands. These commands allow the selection of an image from the directory of images available on disk. The selection of a new image for display also causes the currently active image, if any, to change to the ready stae. Activation of ready images is accomplished most directly using the touch screens on the image displays. When a touch screen hit occurs on one of the image displays a coordinate pair is generated. The image parameter blocks are searched, from top layer to lowest, until an image is found which contains the coordinate point. If the point falls within the area of the currently active image a check is made to determine if image movement is enabled. If movement is enabled the point is taken to be the new center for the image and the display coordinates in the state vector (IPB) are adjusted an the image is redisplayed (FIG. 7.16). If movement is disabled the hit is ignored. Image movement is enabled and disabled by menu command. If the touch hit falls within any other image on the display that image becomes the active image and the currently active image moves to the ready state. This feature allows the user to change the active image simply by touching the desired image. Coupled with the menu drive command input the user is provided with a nearly typing free interface.

Image shuffling

The touch activation of images is ineffective in the situation where an image is completely covered by one or more other images. In that case when the user touches the screen the touch hit is seen as selecting the upper layer image and he cannot bring the hidden image up. This problem is solved by providing the capability to "shuffle" images among the layers, from lowest to highest or vice versa. Shuffling is enabled by menu command and once enabled allows the f1 and f2 function inputs to select the active image on the corresponding display (FIG. 7.16).

The following is a description of image processor control according to the invention, including the image processor driver (IPD), invocation of IPD, and synchronization.

Image processor driver (IPD)

A distinct and independent procedure interacts with the control registers of the image processor. This procedure is a trap handler called the Image Processor Driver (IPD). The state vector of the currently active image (i.e. its IPB) is used by the IPD to configure the image processor control registers and initiate processing. Configuration of the processor also includes loading the LUT and the filter coefficients.

Invocation of IPD

The IPD is completely independent of the remainder of the user interface software. The IPD expects the state vectors to be at a specified location in memory, and to have a specified format. Likewise, the user interface procedures expect the IPD to receive control when a specific trap (TRAP 13) is executed by software. The image processor driver is the only software in the system which requires explicit knowledge of how to manipulate the image processor. It translates data structure representing an image state vector and manipulates the image processor to generate the correct image in the display memory.

Synchronization

The image processor is capable of generating a hardware interrupt to the system upon completion of processing. This provides the capability of initiating image processing and returning control to the user interface software, concurrent with image processing, to increase the efficiency of the system. The host cpu may resume executing instruction while the processor works, with the interrupt used for synchronization. As reduced to practice, the software is synchronous and the host cpu essentially idles during image processing.

SOFTWARE EXTENSIONS

The following extensions to the software system have been envisioned and could be readily implemented with the existing hardware resources of the system, as well as the current software.

Debugging utilities

A debugging utility is partly implemented in which a privileged user may examine major data structures within the system, such as the Image Location List and the Image Parameter Blocks. Additionally, the utility provides monitoring of resource usage by displaying disk and memory space information. The utility could be extended to include the capability of modifying those structures to facilitate testing or system debugging, or recovery of mistakenly deleted image data.

Image processing in software

The image processing capabilities of the system may be expanded by software processing. The image information in the base memory is accessible to software, as are the display memory buffers. This allows software routines to process data from the base memory and write the processed image to the display. This processing could include algorithms which the processor hardware was not designed to perform, such as convolution operations, but would generally take longer to perform than processing done by the hardware.

User programming

A further extension of software image processing already envisioned, and partially implemented, would allow individual system users to write their own program to run on the system. The current directory structure maintains a small amount of space to store user code. As reduced to practice the code must be developed on another computer and its executable form sent to the system through the network. This extension also requires a software interface through which the user's program may manipulate system data structures.

Region of interest and Density measures

The graphic overlay planes built into both the base memory and the display memories allow the software to be extended to during region of interest outlines, as well as other graphic applications. The image processor can produce histograms of specific areas of images which may be selected graphically since overlay bits may be used to enable/disable histogramming. Because both the base and display memories are accessible to the host cpu, density measurement may be made from either processed or unprocessed representations of an image.

These measurement may be directed by the use of overlay graphics, for example an arbitrary curve may be drawn in the overlay and the underlying pixels plotted by grey level value.

Image annotation

An additional use of the overlays in either memory would be to provide annotation of images with text and markers. Combined with the ability to read image data from the display memories, annotation would allow the creating of processed, annotated images which may be sent to the archive for storage. This extension would be useful in teaching or the generation of annotated images for publication. A related capabiltiy is the display of reports (i.e. the written interpretation of the image). The current directory structure maintains space for such reports on disk. These reports would generally be received from the network, along with the image.

Automatic image placement

A more sophisticated image placement algorithm is envisioned in which the software seeks to optimize the placement of new images on the screen. This software would manage the blank areas on the display and attempt to fit new images into the optimal blank area, overlapping images only when necessary. The current software offers two methods of placing images: first, centered on the display; second, at the location the user specifies with a touch.

Gallery mode display

A further possible feature of the user interface is Gallery mode display. In this mode all the images belonging to a specific patient could be displayed minified, somewhat like a contact print of 35 mm film. Images could then be selected for viewing at full resolution by touching the corresponding minified image in the gallery. Two possible methods of obtaining the gallery images exist. First, the gallery may be generated on the fly by using the continuous zoom capability of the image processor, processing each image for the patient sequentially. The second method places the burden of gallery generation on the archive system, expecting gallery sets to accompany any image data sent down from the archive for display. The comparative merits of these methods have not been examined.

Obviously, numerous modifications and variations of the present invention are possible in light of the above teachings. It is therefore to be understood that within the scope of the appended claims, the invention may be practiced otherwise than as specifically described herein.

Appendix A

The following components of an embodiment of the viewing station reduced to practice are well known devices and were used.
1. 1 Mitsubishi C6919LP Color Monitor (512×512)
2. 1 Color Graphics controller VGME-512
   controller for 512×512 color monitor
   Graphic Strategies Inc.
3. 1 PKRO19 Resistive Film touch screen & controller
   Microtouch Systems Inc.
   400 W. Cumming Park
   Woburn, Mass. 01801
4. 2 PX19V651LV80164 Black & White portrait mode monitors
   (1024×1536)
   U.S. Pixel
5. 2 8000-3800-1 Infra-red touch sensors
   2 8000-0600-04 touch screen controllers
   Carroll Touch Technology Corp.
   2902 Farber Drive
   Champaign, Ill. 61821
6. 1 M2333 8-inch Winchester disk drive (340 Mbytes)
   Fujitsu America Inc.
   3075 Oakmead Village Drive
   Santa Clara, Calif. 95051
7. 1 Sys68k/Cpu-1B single board computer
   Force Computers Inc./Gmbh
   Freishuetzstrasse 92
   d-8000 Muenchen 81 West Germany
8. 1 SMVME 3100 256 kb RAM memory board
   Signetics
9. Assorted power supplies (+5 V, −5 V, +15 V, −15 V, DC etc)

What is claimed as new and desired to be secured by Letters Patent of the United States is:

1. An image viewing system comprising:
   first memory for storing raw image data corresponding to plural images to be displayed;
   image processing means coupled to said memory means for performing predetermined processing operations on said raw image data and for providing corresponding display data, said image processing means including,
   zoom means responsive to said stored raw image data for obtaining values of estimated image data at points along a line between said data by a fractional bilinear interpolating between the values of said raw image data to produce selectably continuous magnification or minification of the image;
   second memory means coupled to said image processing means for storing the display data processed by said image processing means;
   user input means for generating input signals indicative of selected images and image formats to be viewed;
   display means coupled to said second memory means for displaying images based on the display signals stored in said second memory means; and
   control processing means connected through an internal bus to said first memory means, image processing means, and second memory means for producing control signals responsive to said input signals from said user input means for controlling transfer of raw image data corresponding to selected images to be displayed from the first memory means to the image processing means, processing thereof by said image processing means, storage of the processed display signals into the second memory means, and transfer of the stored display signals to said display means for display of the user selected image.

2. An image viewing system, comprising:
   first memory means for storing raw image data corresponding to a plurality of images to be displayed;
   image processing means coupled to said first memory means for reading raw image data corresponding to selected of the images from said first memory means and performing selected processing operations on said raw image data to produce corresponding display data, said image processing means comprising zoom means for performing a fractional bilinear interpolation between values of image data representative of an image to produce selectably continuous magnification of minification of the image;

second memory means coupled to said image processing means for storing the display data;

display means coupled to said second memory means for displaying images and graphics represented by the display data;

user input means for generation input signals selecting particular images to be displayed by said display means and for selecting the processing operations to be performed by said image processing means;

control processing means coupled through an internal bus to said first memory means, said image processing means and said second memory means for producing control signals in response to said input signals for controlling transfer of raw image data corresponding to selected images to be displayed from the first memory means to the image processing means, processing thereof by said image processing means, storage of the processed display signals into the second memory means, and transfer of the stored display signals to said display means for display of the user selected image.

3. A system according to claim 2, wherein:

said first memory means comprises:

disk drive memory means for storing raw image data corresponding to a plurality of images; and base memory means coupled to said disk drive memory means via said internal bus for storing raw image data corresponding to images most recently selected for display, said base memory means having an output port coupled to said image processing means whereby raw image data corresponding to images selected for display are transferred to said image processing means; and said control processor means comprises means for controlling transfer of raw image data between said base memory means and said disk drive memory means in response to said input signals.

4. A system according to claim 3, wherein said base memory means comprises:

an array of random access memories defining plural data storage planes which are independently accessible so that graphics data and raw image data can be read from and written into selected of said data planes without affecting the raw image data stored in the other of said data planes.

5. A system according to claim 4, wherein:

said base memory comprises at least one multi-bit port for accessing the data storage planes of said array during reading and writing of raw image data from and into, respectively, said array; and said control processor means comprises a control register for defining in correspondence with said input signals which of the bits of said multi-bit port respectively define raw image data and raw graphics data and which of the bits of said multi-bit port are involved in a read/write operation.

6. A system according to claim 4, wherein said base memory means comprises:

a double buffer random access memory for transferring raw image data from said array of random access memories to said image processing means via an output port.

7. A system according to claim 6, wherein said base memory means comprises an input port for receiving raw image and graphics data from an external communications network system.

8. A system according to claim 7, wherein said first memory means comprises:

a disk having plural cylinders and plural tracks per cylinder, wherein each track is formatted as a single data sector and an automatic track switch occurs once a revolution of the disk drive at an index pulse produced by the disk drive, and wherein an automatic seek to a next cylinder occurs after data stored on the last track of a cylinder is transferred.

9. A system according to claim 8, wherein said image processing means comprises:

subtractor means coupled to said first memory means for forming a difference between image signals corresponding to corresponding pixels of corresponding images.

10. A system according to claim 9, wherein said image processing image comprises:

a look-up table coupled to an output of said substractor means for converting image data of different modalities defined by different resolutions to a common resolution.

11. A system according to claim 10, wherein said look-up table is partially addressable in response to said control signals to vary the contrast of an image to be displayed.

12. A system according to claim 11, wherein said look-up table is partially addressable by said control signals to convert unsigned binary image data to two's complement table, 13. A system according to claim 12, wherein said image processing means comprises:

variable spatial filtering means coupled to an output of said look-up table means for filtering image data in a range varying from low-pass filtering to high-pass filtering in response to said control signals.

14. A system according to claim 12, wherein said variable spatial filter means comprises:

a 32 delay finite impulse response (FIR) filter.

15. A system according to claim 13, wherein said zoom means is coupled to an output of said spatial filtering means.

16. A system according to claim 15, wherein said zoom means comprises:

means for producing interpolated image data for each pixel of a magnified image based on the weighted sum of grey levels present at each pixel's four nearest neighboring pixels, based on the following relationship:

$$G = A + X(B-A) + Y(C-A) + XY(D-C-B+A),$$

where G represents image data of a pixel of a magnified image, A, B, C and D are the grey levels of image data of the four nearest neighboring pixels and X and Y are predetermined coefficients determined in response to said control signals to produce a predetermined magnification.

17. A system according to claim 16, wherein said zoom means in order to minify an image further comprises:

means for computing said coefficients X and Y to produce a predetermined image magnification, and means for discarding predetermined pixel image data to perform a division to a selected level of minification.

18. A system according to claim 17, wherein said image processing means comprises:
a histogram generator coupled to an output of said subtractor means for computing a histogram of gray levels represented by the image data associated with an image.

19. A system according to claim 17, wherein said second memory means comprises:
a pair of random access memories interconnected in a double buffer configuration between said image processing means and said display means such that display signals are written into one of said pair from the image processing means while display signals are read out to the display means from the other of said pair.

20. A system according to claim 19, wherein said input means comprises:
a touch screen command video monitor for displaying a command menu and for producing input signals indicative of a user's touching of selected commands displayed on said touch screen command video monitor.

21. A system according to claim 20, wherein said input means comprises:
means for storing a list of images stored in said first memory means;
said touch screen command video monitor coupled to said storing means for displaying said list of stored image; and
trackball selection means for selecting an image to be displayed from the image list displayed on said touch screen command video monitor.

22. A system according to claim 20, wherein;
said display means comprises at least one touch screen display video monitor for displaying selected images; and
said input means comprises means for selecting an image for further processing and display based on a user's touching of the selected image on the display video monitor.

23. A system according to claim 22, wherein:
said command menu displayed on said command video monitor includes a command for moving the location of a displayed image on the display video monitor,
said display video monitor includes means for producing location signals indicative of the last location at which the display video monitor is touched after a user touches an image to be moved and slidingly maintains contact with the screen while changing the location of screen touching, and
said control processing means includes means for producing location control signals indicative of the location of said last location so that the image data is re-stored in said second memory means and re-displayed at said last location.

24. A system according to claim 23, wherein said command menu comprises an image shuffling command by which a user can command the control processor means to automatically sequentially retrieve from said first memory means image data corresponding to respective images previously selected by the user for display, said control processor means being programmed to control said first memory means, said image processing means and said display means to shuffle through the previously selected images such that the previously selected images are sequentially each displayed in their entirety, said input means comprising means for stopping shuffling of images when a selected of the previously selected images is being displayed by said display means.

25. A system according to claim 4, wherein said base memory means comprises an input port for receiving raw image data from an external communications network system.

26. A system according to claim 2, wherein said first memory means comprises:
a disk drive having plural cylinders and plural tracks per cylinder, wherein each track is formatted as a single data sector and an automatic track switch occurs once a revolution of the disk drive at an index pulse produced by the disk drive, and wherein an automatic seek to a next cylinder occurs after data stored on the last track of a cylinder is transferred.

27. A system according to claim 2, wherein said image processing means comprises:
first address generator means for generating under the control of said control signals address signals applied to said first memory means for reading selected raw image data from the first memory means; and
second address generator means for generating address signals for storing processed display signals into selected locations in said second memory means and for reading out display signals stored in said second memory means for transfer to and display by said display means.

28. A system according to claim 2, wherein said image processing means comprises:
subtractor means coupled to said first memory means for forming a difference between image signals corresponding to corresponding pixels of corresponding images.

29. A system according to claim 28, wherein said image processing image comprises:
a look-up table coupled to an output of said substractor means for converting image data of different modalities defined by different resolutions to a common resolution.

30. A system according to claim 29, wherein said look-up table is partially addressable in response to said control signals to vary the contrast of an image to be displayed.

31. A system according to claim 30, wherein said look-up table is partially addressable by said control signals to convert unsigned binary image data to two's complement table.

32. A system according to claim 31, wherein said image processing means comprises:
variable spatial filtering means coupled to an output of said look-up table means for filtering image data in a range varying from low-pass filtering to high-pass filtering in response to said control signals.

33. A system according to claim 32, wherein said variable spatial filter means comprises:
a 32 delay finite impulse response (FIR) filter.

34. A system according to claim 32, wherein said zoom means is coupled to an output of said spatial filtering means.

35. A system according to claim 34, wherein said zoom means comprises:
means for producing interpolated image data for each pixel of a magnified image based on the weighted sum of grey levels present at each pixel's four nearest neighboring pixels, based on the following relationship:

$$G=A+X(B-A)+Y(C-A)+XY(D-C-B+A),$$

where G represents image data of a pixel of a magnified image, A, B, C and D are the grey levels of image data of the four nearest neighboring pixels, and X and Y are predetermined coefficients determined in response to said control signals to produce a predetermined magnification.

36. A system according to claim 35, wherein said zoom means in order to minify an image further comprises:
means for computing said coefficients X and Y to produce a predetermined image magnification, and means for discarding predetermined pixel image data to perform a division to a selected level of minification.

37. A system according to claim 28, wherein said image processing means comprises:
a histogram generator coupled to an output of said subtractor means for computing a histogram of gray levels represented by the image data associated with an image.

38. A system according to claim 2, wherein said image processing image comprises:
a look-up table for converting image data of different modalities defined by different resolutions to a common resolution.

39. A system according to claim 38, wherein said look-up table is partially addressable in response to said control signals to vary the contrast of an image to be displayed.

40. A system according to claim 39, wherein said look-up table is partially addressable by said control signals to convert unsigned binary image data to two's complement table.

41. A system according to claim 2, wherein said image processing means comprises:
variable spatial filtering means for filtering image data in a range varying from low-pass filtering to high-pass filtering in response to said control signals.

42. A system according to claim 14, wherein said variable spatial filter means comprises:
a 32 delay finite impulse response (FIR) filter.

43. A system according to claim 2, wherein said zoom means comprises:
means for producing interpolated image data for each pixel of a magnified image based on the weighted sum of grey levels present at each pixel's four nearest neighboring pixels, based on the following relationship:

$$G=A+X(B-A)+Y(C-A)+XY(D-C-B+A),$$

where G represents image data of a pixel of a magnified image, A, B, C and D are the grey levels of image data of the four nearest neighboring pixels and X and Y are predetermined coefficients determined in response to said control signals to produce a predetermined magnification.

44. A system according to claim 43, wherein said zoom means in order to minify an image further comprises:
means for computing said coefficients X and Y to produce a selected image magnification, and means for discarding predetermined pixel image data to perform a division to a selected level of minification.

45. A system according to claim 2, wherein said image processing means comprises:
a histogram generator for computing a histogram of gray levels represented by the image data associated with an image.

46. A system according to claim 2, wherein said second memory means comprises:
a pair of random access memories interconnected in a double buffer configuration between said image processing means and said display means such that display signals are written into one of said pair from the image processing means while display signals are read out to the display means from the other of said pair.

47. A system according to claim 2, wherein said input means comprises:
a touch screen command video monitor for displaying a command menu and for producing input signals indicative of a user's touching of selected commands displayed on said touch screen command video monitor.

48. A system according to claim 47, wherein said input means comprises:
means for storing a list of images stored in said first memory means;
said touch screen command video monitor coupled to said storing means for displaying said list of stored image; and
trackball selection means for selecting an image to be displayed from the image list displayed on said touch screen command video monitor.

49. A system according to claim 47, wherein:
said display means comprises at least one touch screen display video monitor for displaying selected images; and
said input means comprises means for selecting an image for further processing and display based on a user's touching of the selected image on the display video monitor.

50. A system according to claim 49, wherein:
said command menu displayed on said command video monitor includes a command for moving the location of a displayed image on the display video monitor,
said display video monitor includes means for producing location signals indicative of the last location at which the display video monitor is touched after a user touches an image to be moved and slidingly maintains contact with the screen while changing the location of screen touching, and
said control processing means includes means for producing location control signals indicative of the location of said last location, re-storing the image data in said second memory means, and re-displaying the image corresponding to said re-stored image data at said last location.

51. A system according to claim 47, wherein said command menu comprises an image shuffling command by which a user can command the control processor means to automatically sequentially retrieve from said first memory means image data corresponding to respective images previously selected by the user for display, said control processor means being programmed to control said first memory means, said image processing means and said display means to shuffle through the previously selected images such that the previously selected images are sequentially each displayed in their entirety, said input means comprising means for stopping shuffling of images when a selected of the previously selected images is being displayed by said display means.

52. An image viewing system, comprising:
first memory means for storing raw image data corresponding to a plurality of images to be displayed;
image processing means coupled to said first memory means for reading raw image data corresponding to selected of the image from said first memory means and performing selected processing operations on said raw image data to produce corresponding display data;
second memory means coupled to said image processing means for storing the display data;
display means coupled to said second memory means for displaying images and graphics represented by the display data;
user input means for generating input signals selecting particular images to be displayed by said display means and for selecting the processing operations to be performed by said image processing means, comprising
a touch screen command video monitor for displaying a command menu and for producing input signals indicative of a user's touching of selected commands displayed on said touch screen command video monitor; and
control processing means coupled through an internal bus to said first memory means, said image processing means and said second memory means for producing control signals in response to said input signals for controlling transfer of raw image data corresponding to selected images to be displayed from the first memory means to the image processing means, processing thereof by said image processing means, storage of the processed display signals into the second memory means, and transfer of the stored display signals to said display means for display of the user selected image.

53. A system according to claim 52, wherein said input means comprises:
means for storing a list of images stored in said first memory means;
said touch screen command video monitor coupled to said storing means for displaying said list of stored image; and
trackball selection means for selecting an image to be displayed from the image list displayed on said touch screen command video monitor.

54. A system according to claim 52, wherein:
said display means comprises at least one touch screen display video monitor for displaying selected images; and
said input means comprises means for selecting an image for further processing and display based on a user's touching of the selected image on the display video monitor.

55. A system according to claim 54, wherein:
said command menu displayed on said command video monitor includes a command for moving the location of a displayed image on the display video monitor,
said display video monitor includes means for producing location signals indicative of the last location at which the display video monitor is touched after a user touches an image to be moved and slidingly maintains contact with the screen while changing the location of screen touching, and
said control processing means includes means for producing location control signals indicative of the location of said last location, re-storing the image data in said second memory means and re-displaying the image corresponding to said re-stored data at said last location.

56. A system according to claim 52, wherein said command menu comprises an image shuffling command by which a user can command the control processor means to automatically sequentially retrieve from said first memory means image data corresponding to respective images previously selected by the user for display, said control processor means being programmed to control said first memory means, said image processing means and said display means to shuffle through the previously selected images such that the previously selected images are sequentially each displayed in their entirety, said input means comprising means for stopping shuffling of images when a selected of the previously selected images is being displayed by said display means.

57. An image viewing system, comprising:
first memory means for storing raw image data corresponding to a plurality of images to be displayed;
image processing means coupled to said first memory means for reading raw image data corresponding to selected of the images from said first memory means and performing selected processing operations on said raw image data to produce corresponding display data;
second memory means coupled to said image processing means for storing the display data;
display means coupled to said second memory means for displaying images represented by the display data;
said image processing means comprises means for normalizing the dynamic range of said raw image data of different images having different dynamic ranges to enable at least partially non-overlapping simultaneous display by said display means of said different images with a common dynamic range;
user input means for generating input signals selecting particular images to be displayed by said display means and for selecting the processing operations to be performed by said image processing means;
control processing means coupled through an internal bus to said first memory means, said image processing means and said second memory means for producing control signals in response to said input signals for controlling transfer of raw image data corresponding to selected images to be displayed from the first memory means to the image processing means, processing thereof by said image processing means, storage of the processed display signals into the second memory means, and transfer of the stored display signals to said display means for display of the user selected image.

58. A system according to claim 57, wherein said image processing means comprises:
subtractor means coupled to said first memory means for forming a difference between image data corresponding to corresponding pixels of corresponding images.

59. A system according to claim 57, wherein said means for normalizing comprises:

a look-up table for converting image data of different modalities defined by different resolutions to a common resolution.

60. A system according to claim 59, wherein said look-up table is partially addressable in response to said control signals to vary the contrast of an image to be displayed.

61. A system according to claim 60, wherein said look-up table is partially addressable by said control signals to convert unsigned binary image data to two's complement table.

62. A system according to claim 57, wherein said image processing means comprises:

variable spatial filtering means for filtering image data in a range varying from low-pass filtering to high-pass filtering in response to said control signals.

63. A system according to claim 57, wherein said image processing means comprises:

zoom means for performing a fractional bilinear interpolation between values of image data representative of an image to produce continuously selectable magnification or minification of the image.

64. A system according to claim 63, wherein said zoom means comprises:

means for producing interpolated image data for each pixel of a magnified image based on the weighted sum of grey levels present at each pixel's four nearest neighboring pixels, based on the following relationship:

$$G = A + X(B-A) + Y(C-A) + XY(D-C-B+A),$$

where G represents image data of a pixel of a magnified image, A, B, C and D are the grey levels of image data of the four nearest neighboring pixels and X and Y are predetermined coefficients determined in response to said control signals to produce a predetermined magnification.

65. A system according to claim 64, wherein said zoom means in order to minify an image further comprises:

means for computing said coefficients X and Y to produce a predetermined image magnification, and means for discarding selected pixel image data to perform a division to a selected level of minification.

* * * * *

UNITED STATES PATENT AND TRADEMARK OFFICE
CERTIFICATE OF CORRECTION

PATENT NO. : 4,833,625

DATED : May 23, 1989

INVENTOR(S) : Henry D. FISHER, et al

It is certified that error appears in the above-identified patent and that said Letters Patent is hereby corrected as shown below:

On the Title Page, the number of drawings is incorrect, it should read 43 and not 42.

Signed and Sealed this

Twenty-fourth Day of April, 1990

Attest:

HARRY F. MANBECK, JR.

Attesting Officer

Commissioner of Patents and Trademarks